(12) United States Patent
Nygaard et al.

(10) Patent No.: US 7,777,900 B2
(45) Date of Patent: Aug. 17, 2010

(54) METHOD AND SYSTEM FOR OPTICALLY INSPECTING PARTS

(75) Inventors: Michael G. Nygaard, Fenton, MI (US); Gregory M. Nygaard, Clarkston, MI (US); George M. Nygaard, Davisburg, MI (US); John D. Spalding, Ann Arbor, MI (US)

(73) Assignee: GII Acquisition, LLC, Davisburg, MI (US)

( * ) Notice: Subject to any disclaimer, the term of this patent is extended or adjusted under 35 U.S.C. 154(b) by 324 days.

(21) Appl. No.: 11/977,117

(22) Filed: Oct. 23, 2007

(65) Prior Publication Data
US 2009/0103113 A1    Apr. 23, 2009

(51) Int. Cl.
G01B 11/08 (2006.01)
(52) U.S. Cl. .................. 356/638; 356/635
(58) Field of Classification Search .......... 356/635–638
See application file for complete search history.

(56) References Cited

U.S. PATENT DOCUMENTS

| | | | |
|---|---|---|---|
| 3,924,953 A | 12/1975 | Allard | |
| 4,315,688 A | 2/1982 | Pryor | |
| 4,532,723 A | 8/1985 | Kellie et al. | |
| 4,598,998 A | 7/1986 | Kamei et al. | |
| 4,644,394 A | 2/1987 | Reeves | |
| 4,721,388 A | 1/1988 | Takagi et al. | |
| 4,831,251 A | 5/1989 | Hanna | |
| 4,852,983 A | 8/1989 | Fein | |
| 4,906,098 A | 3/1990 | Thomas et al. | |
| 4,969,746 A | 11/1990 | McConnell et al. | |
| 4,983,043 A | 1/1991 | Harding | |
| 5,012,117 A | 4/1991 | Karafa et al. | |
| 5,164,995 A | 11/1992 | Brooks et al. | |
| 5,168,458 A | 12/1992 | Gomes | |
| 5,170,306 A | 12/1992 | Gomes | |
| 5,291,272 A | 3/1994 | Demirsu | |
| 5,383,021 A | 1/1995 | Hanna | |
| 5,521,707 A | 5/1996 | Castore et al. | |

(Continued)

FOREIGN PATENT DOCUMENTS

WO     WO 2005/022076     3/2005

OTHER PUBLICATIONS

International Search Report and Written Opinion dated Oct. 22, 2008 for the corresponding PCT Serial No. PCT/US08/072944 filed Aug. 13, 2008.

Primary Examiner—Michael P Stafira
(74) Attorney, Agent, or Firm—Brooks Kushman P.C.

(57) ABSTRACT

A method and system for optically inspecting parts are provided. The method includes the step of supporting a part along a measurement axis. The method includes scanning the part with an array of spaced planes of radiation so that the part occludes each of the planes of radiation at spaced locations along the axis to create a corresponding array of unobstructed planar portions of the planes of radiation. Each of the unobstructed planar portions contains an amount of radiation which is representative of a respective geometric dimension of the part. The method still further includes measuring the amount of radiation present in each of the unobstructed planar portions to obtain measurement signals. The method includes processing the measurement signals to obtain raw data. The method further includes providing calibration data and processing the calibration data and the raw data to obtain measurements of the part.

28 Claims, 28 Drawing Sheets

U.S. PATENT DOCUMENTS

| | | | |
|---|---|---|---|
| 5,568,263 A | 10/1996 | Hanna | |
| 5,608,530 A | 3/1997 | Gates | |
| 5,646,724 A | 7/1997 | Hershline | |
| 5,986,745 A | 11/1999 | Hermary et al. | |
| 6,055,329 A | 4/2000 | Mufti | |
| 6,252,661 B1 | 6/2001 | Hanna | |
| 6,285,031 B1 | 9/2001 | Listi et al. | |
| 6,313,948 B1 | 11/2001 | Hanna | |
| 6,959,108 B1 | 10/2005 | Bartelt et al. | |
| 2005/0174567 A1 | 8/2005 | Hanna | |
| 2006/0236792 A1 | 10/2006 | Hanna | |
| 2008/0049235 A1 | 2/2008 | Crowther | |

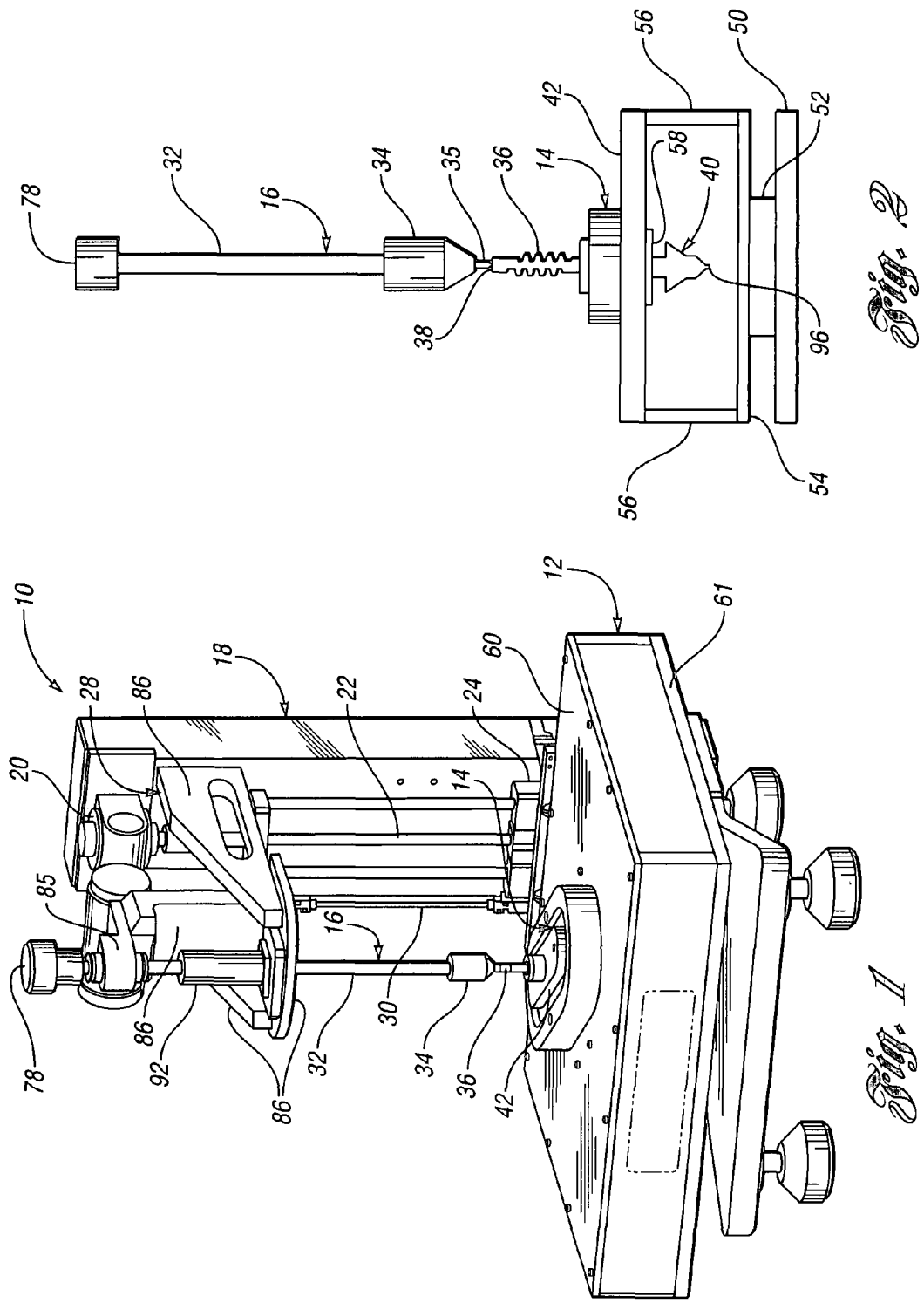

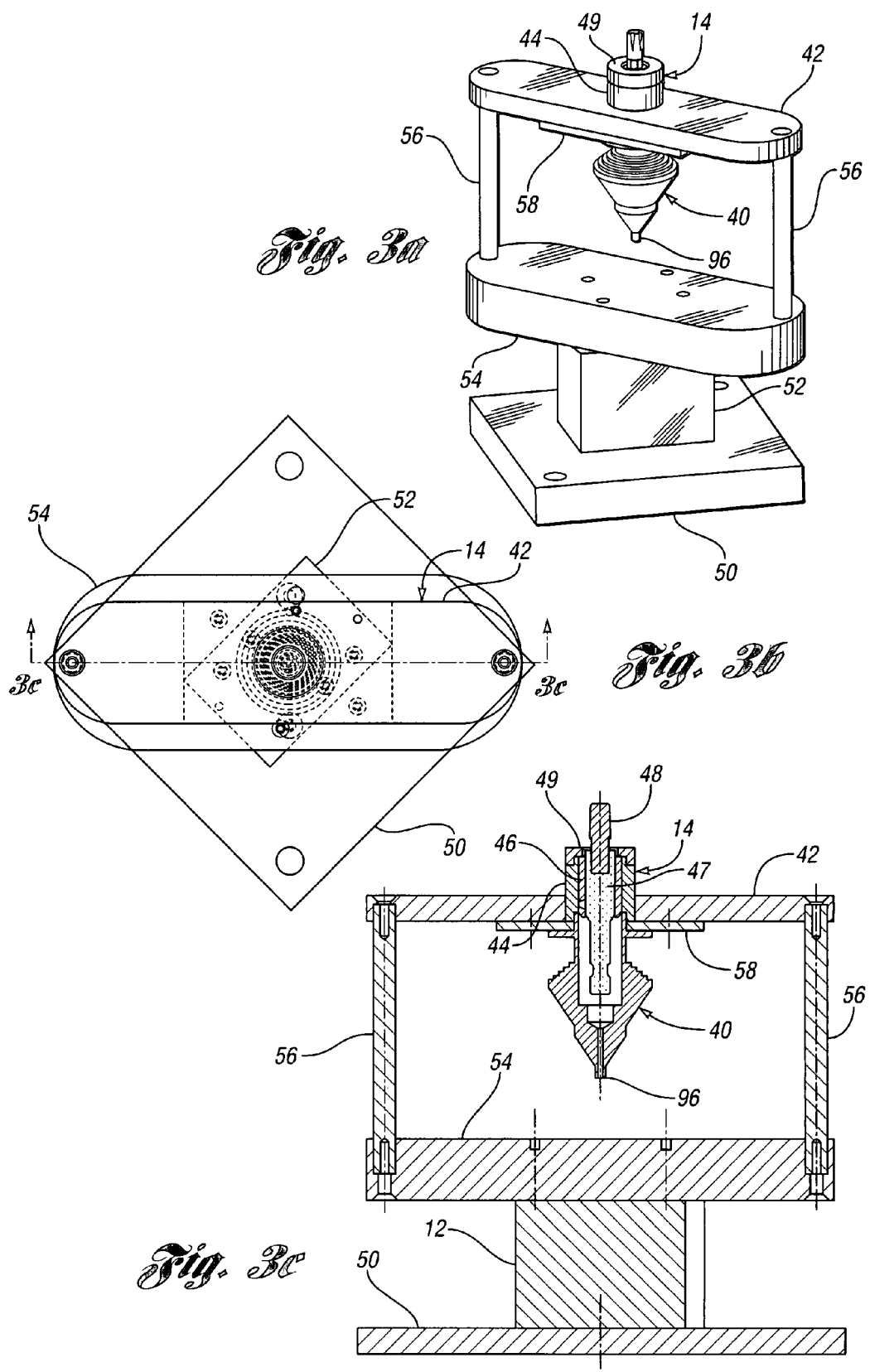

METHOD AND SYSTEM FOR OPTICALLY INSPECTING PARTS

CROSS-REFERENCE TO RELATED APPLICATIONS

This application is related to the following commonly-owned U.S. patent applications which were filed on Oct. 23, 2007:
1) Method for Estimating Thread Parameters of a Part U.S. Ser. No. 11/977,097);
2) Optical Modules and Method of Precisely Assembling Same U.S. Ser. No. 11/977,102);
3) Method and Inspection Head Apparatus for Optically Measuring Geometric Dimensions of a Part U.S. Ser. No. 11/977,010);
4) Apparatus for Quickly Retaining and Releasing Parts to be Optically Measured U.S. Ser. No. 11/977,091);
5) Calibration Device for Use in an Optical Part Measuring System U.S. Ser. No. 11/977,114); and
6) Method and System for Generating Calibration Data For Use In Calibrating A Part Inspection System U.S. Ser. No. 11/975,977).

BACKGROUND OF THE INVENTION

1. Field of the Invention

This invention relates to methods and systems for optically inspecting parts.

2. Background Art

Traditional manual, gauging devices and techniques have been replaced to some extent by automatic inspection methods and systems. However, such automatic inspection methods and systems still have a number of shortcomings associated with them.

WO 2005/022076 discloses a plurality of light line generators (72) which generate associated beams of light (26) that intersect a part (14) to be inspected. Each beam of light (26) illuminates at least one side of the part (14) with a line of light occluded by the part (14), and at least three light responsive sensors (104) provide for generating a signal (24) responsive to an occlusion of a corresponding line of light on a corresponding side of at least one side of the part (14). Each of the light responsive sensors is responsive to an occlusion at a different azimuthal location. A processor (28) analyzes the signals (24) in relation to a measure of relative location of the part (14) from a motion (18) or position sensor. The part (14) may be released from a clamp (52) to drop through the beams of light (26), or the beams of light (26) may be moved relative to the part (14).

U.S. Pat. No. 6,313,948 discloses an optical beam shaper for production of a uniform sheet of light for use in a parts inspection system having a light source including a coherent light generator, a diffractive beam shaper, and lens elements.

U.S. Pat. No. 6,285,031 discloses an inspection system for evaluating rotationally asymmetric workpieces for conformance to configuration criteria. The system has a track for causing the workpieces to translate through a test section. The test section includes a plurality of electromagnetic energy sources. The plurality of electromagnetic energy sources are oriented with respect to the track such that the workpieces occlude the plurality of electromagnetic energy sources upon passing through the test section. The test section further has electromagnetic energy detectors for receiving the electromagnetic energy to provide output signals related to the intensity of the occluded electromagnetic energy incident on the electromagnetic energy detectors, and a signal processor for receiving and processing the output signals.

U.S. Pat. No. 6,252,661 discloses an inspection system for evaluating workpieces for conformance to configuration criteria. The system includes a track for causing workpieces to translate through a test section. The test section includes a light source for producing a uniform sheet of light. The light source is oriented with respect to the track such that the workpieces occlude the uniform sheet of light upon passing through the test section. The test section further has a video system for receiving the occluded uniform sheet of light, providing output signals related to the intensity of the occluded uniform sheet of light incident on the video system, and a signal processor for receiving and processing the output signals.

U.S. Pat. No. 6,959,108 discloses an inspection system wherein workpieces to be inspected are consecutively and automatically launched to pass unsupported through the field of view of a plurality of cameras. As a workpiece passes through the field of view of the cameras, a sensor is activated which communicates with a computer system to activate the cameras to capture an unobstructed image, or image data, of the workpiece. The image data is then analyzed by a computer program to verify whether the image data indicates that the workpiece does not meet established criteria and therefore is considered defective. If the image does not meet the established criteria, the workpiece is rejected and segregated from workpieces which have not been identified as defective.

U.S. Pat. No. 5,608,530 discloses a laser for producing a beam of radiation which is then refined in cross-sectional dimension by use of plano-cylindrical lenses. The refined beam of radiation falls incident on a part to be measured. The unobstructed portion of the beam is then bifurcated by a pair of reflective surfaces which produce non-parallel radiating beams. Each resulting beam comprises the unobstructed portion of radiation which has passed radially opposed halves of the part. The magnitude of radiation present in each non-parallel radiating beam is then measured.

U.S. Pat. No. 4,831,251 discloses an optical device for discriminating threaded workpiece by the handedness by their screw thread profiles. The device present a pair of light beams which pass generally tangent to the workpiece at angularly displaced positions. The light beams are inclined to follow the helix direction of a given handedness of a workpiece. Upon axial advancement of a workpiece through the device, a chopped output from the photodetectors indicates that the handedness of the threads matches the inclination of the light beams. The oppositely threaded workpiece, however, provides a generally constant DC output. With appropriate signal processing electronics, an automatic system for discriminating workpieces by thread handedness is provided.

U.S. Pat. No. 5,383,021 discloses a non-contact inspection system capable of evaluating spatial form parameters of a workpiece to provide inspection of parts in production. The system causes parts to be sequentially loaded onto an inclined track where they pass through a test section. The test section includes a length detection array for measuring the length of the workpiece, which includes a source generating a sheet of light oriented in the longitudinal direction of the workpiece. The profile of the parts are evaluated by one or more light sources also creating a sheet of light oriented transversed to the longitudinal axis of the parts. Single channel photodetectors are provided for each of the sources which provides an analog output of the extent to which each sheet of light is occluded by the part. These outputs are analyzed through appropriate signal processing hardware and software to generate length and profile data related to the workpiece geometry.

U.S. Pat. No. 5,568,263 discloses a non-contact inspection system capable of evaluating spatial form parameters of a workpiece to provide inspection of parts in production. The system causes parts to be sequentially loaded onto an incline track where they pass through a test section. The test section includes a length detection array for measuring the length of the workpiece, which includes a source generating a sheet of light oriented in the longitudinal direction of the workpiece. The profile of the parts are evaluated by one or more light sources also creating a sheet of light oriented transverse to the longitudinal axis of the parts. First and second pairs of single channel photodetectors are provided for each of the light sources which provides a pair of analog outputs of the extent to which each sheet of light is occluded by the part, as well as an ability to eliminate noise or scintillation caused by a point source of light, for example with a laser light source. These outputs are analyzed through appropriate signal processing hardware and software to generate length and profile data related to the workpiece geometry.

U.S. Pat. No. 4,852,983 discloses an optical system which simulates the optical effect of traveling over a large distance on light traveling between reference surfaces.

U.S. Patent Application Publication No. 2005/0174567 discloses a system to determine the presence of cracks in parts. The presence of cracks is determined through the use of an imaging device and illumination source. The part is moved along a track where it is sensed by a position sensor to initiate the inspection. The illumination source projects a sheet of light onto the part to be inspected. The line formed by the intersection of the sheet of light and the part is focused onto the imaging device. The imaging device creates a digital image which is analyzed to determine if cracks are present on the part.

U.S. Patent Application Publication No. 2006/0236792 discloses an inspection station for a workpiece including a conveyor, a mechanism for rotating the workpiece, and a probe. The conveyor includes a fixture for locating the workpiece and the conveyor is configured to translate the workpiece in a linear manner. A mechanism, such as a belt, engages the workpiece thereby rotating the workpiece within the fixture. The probe is configured to indicate if the workpiece conforms to quality criteria. To facilitate inspection while the conveyor translates the workpiece, the probe is attached to a stage where the stage is configured to move the probe synchronously with the workpiece over an inspection region.

U.S. Pat. Nos. 5,168,458 and 5,170,306 disclose methods and systems for gaging threaded fasteners to obtain trilobular parameters.

Other U.S. patents related to the invention include: U.S. Pat. Nos. 4,315,688; 4,598,998; 4,644,394; 4,852,983; 4,906,098 and 5,521,707.

SUMMARY OF THE INVENTION

An object of the present invention is to provide an improved method and system for optically inspecting parts.

In carrying out the above object and other objects of the present invention, a method for optically inspecting parts is provided. The method includes supporting a part along a measurement axis. The method further includes scanning the part with an array of spaced planes of radiation so that the part occludes each of the planes of radiation at spaced locations along the axis to create a corresponding array of unobstructed planar portions of the planes of radiation. Each of the unobstructed planar portions contains an amount of radiation which is representative of a respective geometric dimension of the part. The method still further includes measuring the amount of radiation present in each of the unobstructed planar portions to obtain measurement signals. The method includes processing the measurement signals to obtain raw data. The method further includes providing calibration data and processing the calibration data and the raw data to obtain measurements of the part.

The step of scanning may include the step of linearly moving the array of spaced planes of radiation relative to the part.

Further in carrying out the above object and other objects of the present invention, a system for optically inspecting parts is provided. The system includes a support for supporting a part to be inspected along a measurement axis. The system further includes a head apparatus which includes a plurality of radiation sources for directing an array of spaced planes of radiation at the part so that the part occludes each of the planes of radiation at spaced locations along the axis to create a corresponding array of unobstructed planar portions of the planes of radiation. Each of the unobstructed planar portions contains an amount of radiation which is representative of a respective geometric dimension of the part. The head apparatus further includes a plurality of receiver modules for measuring the amount of radiation present in each of the unobstructed planar portions to obtain measurement signals. The apparatus still further includes a movable stage subsystem coupled to the head apparatus for translating the head apparatus relative to the part so that the spaced planes of radiation scan the part supported by the support. The apparatus includes a signal processor for processing the measurement signals to obtain raw data and a storage for storing calibration data. The apparatus further includes a data processor for processing the raw data and the calibration data to obtain measurements of the part.

The stage subsystem may linearly move the head apparatus relative to the device.

The number of planar portions may be twice the number of the planes of radiation.

Each of the planes of radiation may scan the part from a different azimuthal direction relative to the axis.

The planes of radiation may have a substantially uniform azimuthal spacing relative to the axis.

None of the planes of radiation may be coplanar.

The planes of radiation may be equally spaced.

The radiation may be laser radiation.

The laser radiation may be visible.

Adjacent pairs of unobstructed planar portions created from the same planes of radiation may be coplanar.

The step of providing may include the step of supporting a calibration device having a central axis and a plurality of regions which are rotationally symmetric about the central axis. The step of providing may further include scanning the device with the array of spaced planes of radiation so that the device occludes each of the planes of radiation at spaced locations along the central axis to create a corresponding array of unobstructed planar portions of the planes of radiation. Each of the unobstructed planar portions contains an amount of radiation which is representative of a respective geometric dimension of the device. The step of providing may still further include the step of measuring the amount of radiation present in each of the unobstructed planar portions to obtain device measurement signals and the step of processing the device measurement signals to obtain the calibration data.

Still further in carrying out the above object and other objects of the present invention, a system for optically inspecting parts is provided. The system includes a support structure for supporting both a calibration device having a central axis and a part to be inspected along a measurement axis at spaced locations. The system further includes a head apparatus including a plurality of radiation sources for successively directing an array of spaced planes of radiation at the device and the part so that the device and the part occlude each of the planes of radiation at spaced locations along their respective axes to create a corresponding array of unobstructed planar portions of the planes of radiation. Each of the unobstructed planar portions contains an amount of radiation which is representative of a respective geometric dimension of either the device or the part. The head apparatus further includes a plurality of receiver modules for measuring the amount of radiation present in each of the unobstructed planar portions to obtain device and part measurement signals. The system still further includes a movable stage subsystem coupled to the head apparatus for translating the head apparatus relative to the device and the part so that the spaced planes of radiation scan the device and the part supported by the support structure. The system includes a signal processor for processing the measurement signals to obtain raw data and calibration data. The system further includes a data processor for processing the raw data and the calibration data to obtain measurements of the part.

The axes may be substantially coaxial.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic perspective view of a part inspection system including measurement hardware;

FIG. 2 is a schematic, side elevational view of a part holder base (with a side plate of a container removed) and an upper tooling unit with a part held between the units and a calibration fixture or device mounted colinear with the part;

FIG. 3a is a perspective schematic view of the part holder base with a drive bit supported thereon and the calibration device suspended therefrom;

FIG. 3b is a top plan view of the base of FIG. 3a;

FIG. 3c is a sectional view taken along lines 3c-3c of FIG. 3b;

FIG. 4a is a side elevational view of the calibration device or cone of FIG. 3a;

FIG. 4b is a top plan view of the cone of FIG. 4a;

DETAILED DESCRIPTION OF THE PREFERRED EMBODIMENTS

The overall system described herein is often referred to as "Laser Lab." Laser Lab is a trademark of the assignee of this application. It is to be understood that numerous inventions are described herein, only some of which are claimed herein. The other disclosed inventions are claimed in the applications noted in the Cross Reference to Related Applications part of this application. It is also to be understood that a number of words and phrases are explained in a Glossary portion of this application. The Glossary explains but does not unduly limit the words and phrases contained therein.

Laser Lab—Physical Overview

The Laser Lab system (i.e., FIG. 1) includes several physical subsystems or units.

A PC tower unit (i.e., FIG. 8) contains a computer and a number of additional control electronics modules. It has a rear panel with connectors for light curtain/safety electronics, motor control, linear encoder, measurement signals, and optical head control. The PC tower unit hosts the application program which presents a user interface to an operator of the Laser Lab system.

Part holder and upper tooling units (FIGS. 1, 2 and 7) secure or receive and retain a part in place for measurement. The upper tooling unit includes a stainless steel rod with a spring loaded tip that can move up and down to accommodate a wide variety of part sizes. The part holder unit has a base to support the part or unit under test (UUT) and a calibration cone or device (i.e., FIGS. 3a-4c). The calibration cone is used to measure the relationship between a light sensor output and the physical measurements represented by the outline dimensions of the cone. The calibration cone or device is not strictly speaking a cone but rather includes a number of frustums (i.e., portions of cones) and cylinders.

Figure 5:
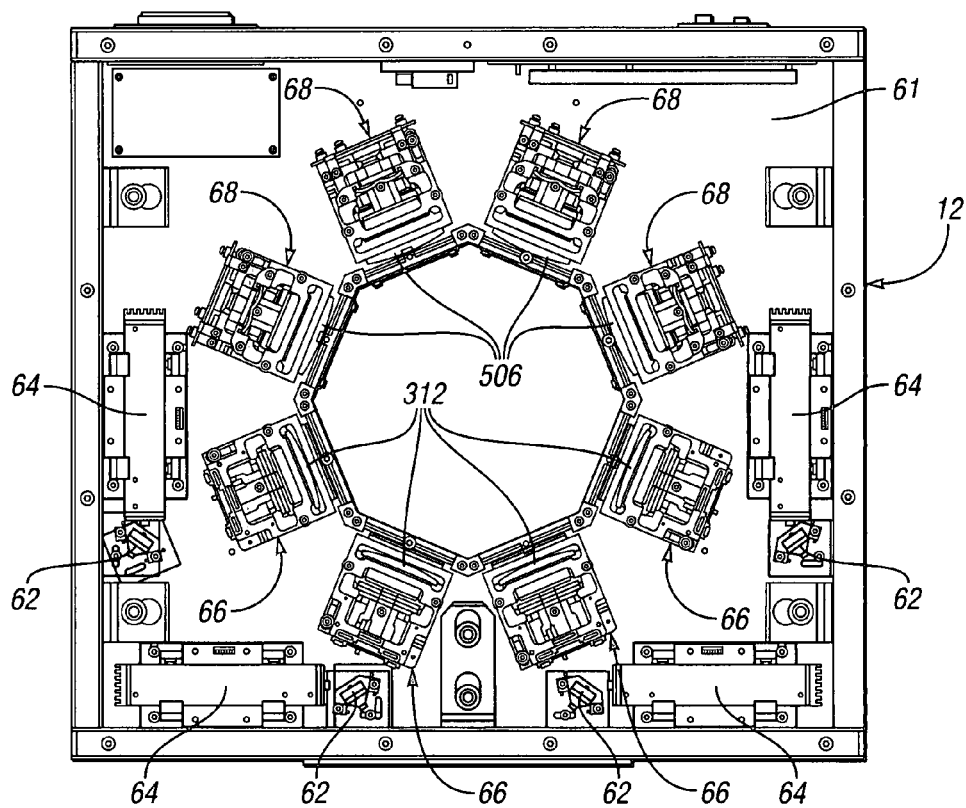
FIG. 5 is a top plan view of an optical head with its top cover plate removed in order to provide an interior view of the optical head.
Figure 8:
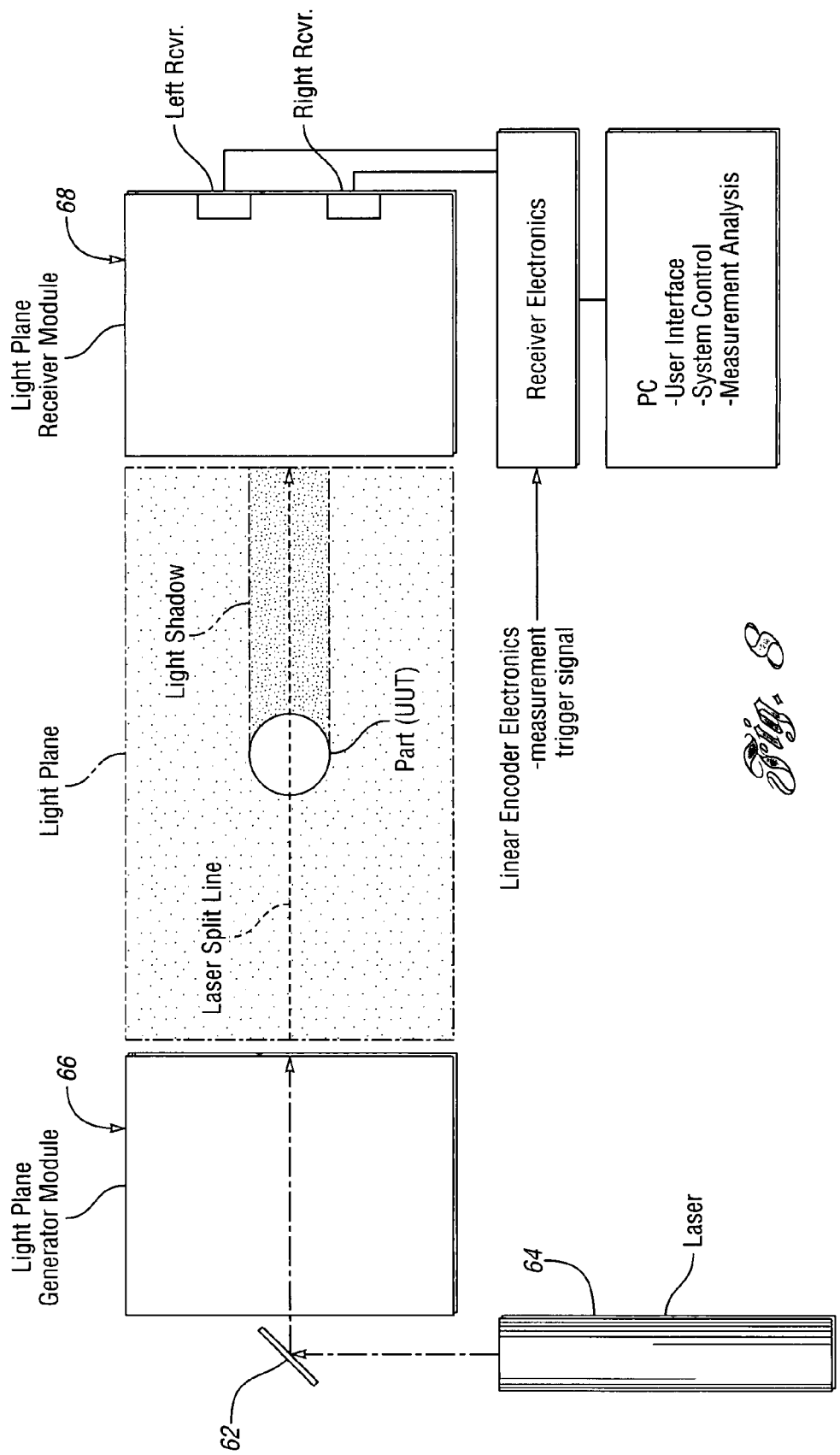
FIG. 8 is a schematic block diagram which illustrates basic beam line subsystem components wherein a laser generates a laser beam, a mirror reflects the laser light beam, and a light plane generator module generates a laser light plane which is directed or projected onto a part.
Figure 12:
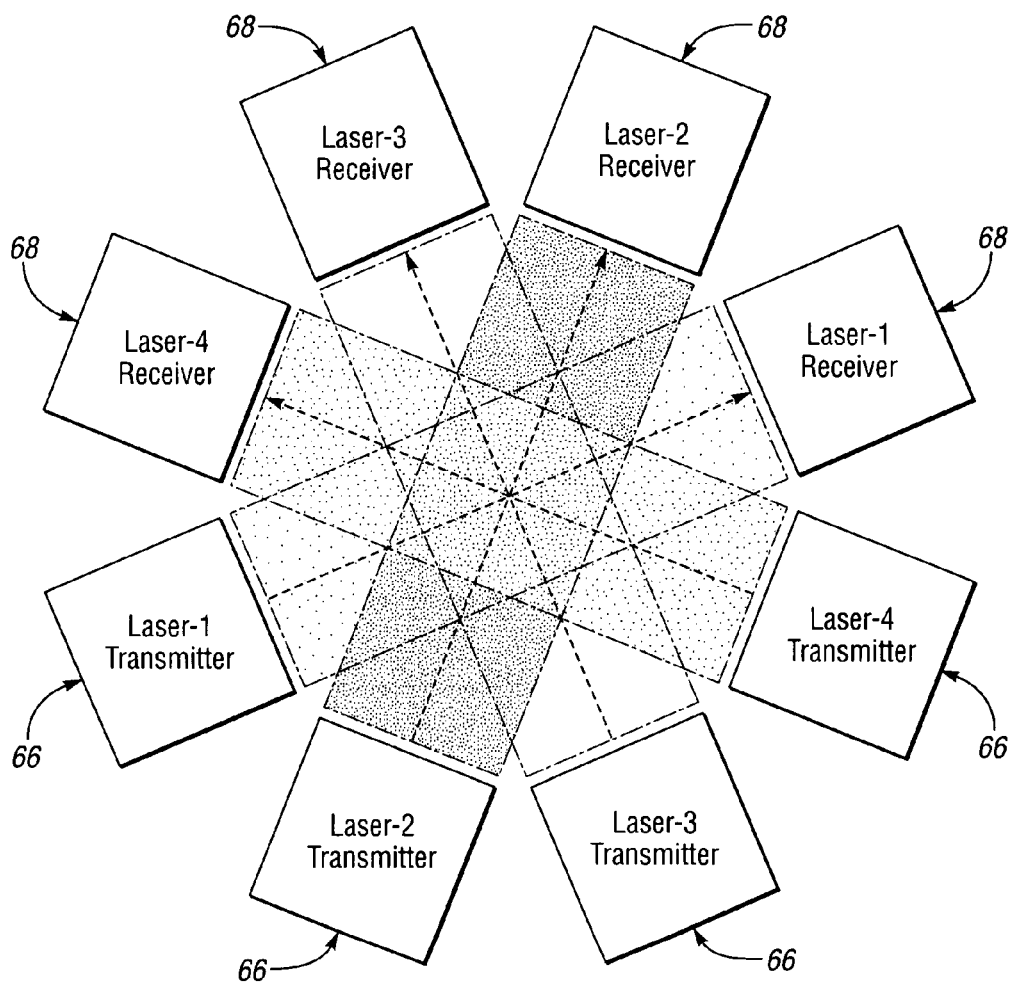
FIG. 12 is a schematic block diagram of various laser transmitters and receivers contained within the optical head.

An optical head (i.e., FIGS. 1, 5 and 10) is a sealed system containing a number of components including optical measurement components (i.e., FIGS. 5 and 12). A set of (4) laser beam lines (one of which is shown in FIG. 8) generate and measure 4 planes of light.

A slide/base unit (i.e., FIGS. 1 and 10) moves the optical head vertically up and down to make part measurements. On every scan the optical head's (8) sensors measure shadow images of both the calibration cone and of the part (UUT) (i.e., FIGS. 8, 9 and 13). Each complete scan thus contains both calibration data and measurement data, yielding a system that is especially immune to time variations in measurement conditions.

Referring again to the drawing figures, FIG. 1 is a schematic perspective view of the Laser Lab system, generally indicated at 10, including the basic measurement hardware of the system 10. Shown are the optical head, generally indicated at 12, the part holder/upper tooling units, generally indicated at 14 and 16, respectively, and the base/slide unit, generally indicated at 18, which, as also shown in FIG. 10, includes a motor 20 coupled to a lead screw 22 which, in turn, is coupled to a saddle 24 slidably supported by a bearing. The saddle 24 is coupled to the optical head 12 to move the optical head 12 linearly along a vertical stage axis 28 (i.e., FIG. 9). Movement of the stage is sensed by a linear encoder 30 which will be described in greater detail hereinbelow.

FIG. 2 is a schematic, side elevational view of the part holder and upper tooling units 14 and 16, respectively. The upper tooling unit 16 includes a rod 32 which is manually movable along a central axis of the rod 32 in up and down directions by an operator of the system 10. The upper tooling unit 16 also includes a spring-loaded part clamp 34 having a tip 35 which retains a part 36 to be inspected at one of its end surfaces 38. Also illustrated in FIG. 2 are a calibration cone or device, generally indicated at 40, and a base or top plate 42 of the part holder/base unit 14.

FIG. 3a is a perspective schematic view of the part holder base unit 14. FIGS. 3a-3c show the calibration cone 40 and a part holder assembly including a support 44, a collar 46, a bit holder 47 into which a Torx bit 48 (i.e., Tx40) is inserted for engagement with a recessed portion of the end surface. A thread plug gage (instead of a recess bit for a bolt) may be provided. The end user screws on a nut all the way to the end of the plug gage. This ensures the threads of the nut are good. Then the system 10 measures the rest of the outer diameter characteristics of the nut.

A cap 49 covers the assembly. FIGS. 3a-3c also show various mechanical pieces or parts including a mounting plate 50, a riser 52, a bottom plate 54, the top plate 42, an adapter plate 58 for suspending the cone 40 at the lower surface of the top plate 42 and a pair of posts 56 for supporting the top plate 42 at a spaced position above the bottom plate 54.

Figure 4A:
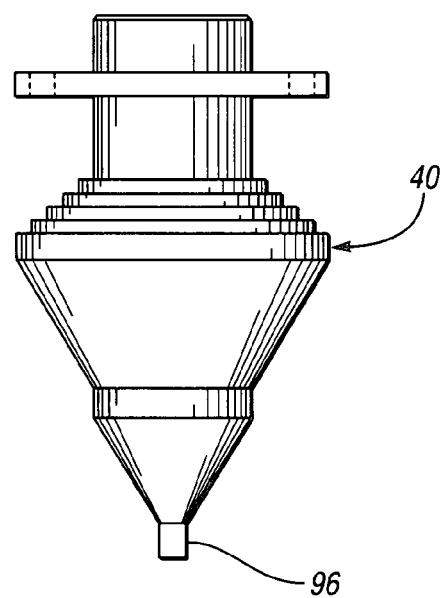

FIG. 4a is a side elevational view of the calibration cone 40. As described in detail below, the calibration cone 40 has a precisely manufactured shape that is utilized in measuring the relationship between raw digitized sensor signals and calibrated physical dimensions. Typically, the cone 40 is sent to a certified laboratory which inspects the cone 40. The laboratory then provides a long form certification that is traceable to NIST.

Figure 4B:
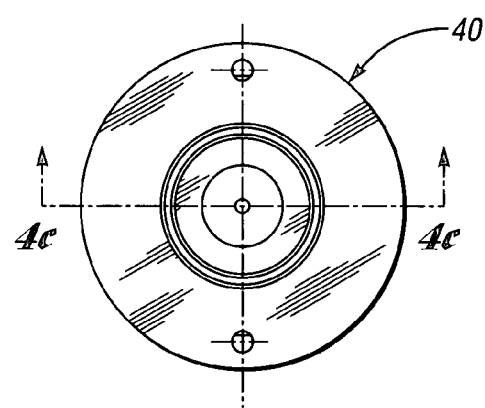
Figure 4C:
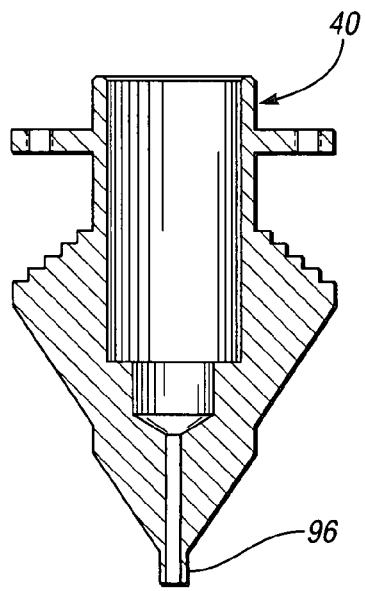
FIG. 4c is a sectional view taken along lines 4c-4c of FIG. 4b.

FIG. 4b is a top plan view of the cone 40 of FIG. 4a and FIG. 4c is a side sectional view of the cone 40 taken along lines 4c-4c of FIG. 4b.

FIG. 5 is a top plan view of the optical head 12 with its top cover plate (60 in FIG. 1) removed in order to provide an interior view of the optical head 12. The head 12 is attached to the saddle 24 to move therewith. Shown adjustably mounted on the bottom base plate 61 of the head 12 are laser steering mirrors 62, 4 lasers 64 for generating laser beams, preferably having a wavelength of 650 nm, light plane generator or transmitter modules, generally indicated at 66, for converting the generated laser beams into corresponding light planes, and light plane receiver modules, generally indicated at 68.

The calibration cone has a central hole, preferably about 1/16", that is utilized extensively during assembly of the cone/part holder sub-assembly to the slide base unit as illustrated in FIG. 4c.

At that time, a thin rod ("calibration fine centering rod") is inserted through the cone's central hole when the optical head is in the "down" position. The rod defines the center of the calibration cone more precisely than the constant diameter region-O which has a 1/8" diameter. When the head is in the "down" position the light planes pass below the cone, nominally unblocked.

To use the rod, the part holder (44 in FIG. 3c) is removed from the cone/part holder assembly. Then the rod can be inserted from the top, through the plate 42, and through the cone 40, until it touches the bottom plate 54. The rod is long enough that when it is fully inserted, touching bottom plate 54, a length extends above plate 42, sufficient to manipulate the rod by hand, moving it up or down.

Moving the "calibration fine centering rod" into and out of the light planes allow one to determine if the light plane center line passes through the rod. One observes the laser sensor outputs as the rod moves into and out of the beam. When both left and right sensor outputs show a slight reduction from the effect of the rod blocking the light beam, then the light beam center line passes through the centering rod.

The calibration cone is manufactured with special instructions to fabricate the central hole so that there is a "slip fit" of the "calibration fine centering rod" in the calibration cone's central hole. One rod is paired with each calibration cone, by the cone fabricator.

The use of the "calibration fine centering rod" makes it possible to measure whether or not the cone/part holder center is aligned with the optical head's 4-beam intersection point.

To move the cone/part holder with high precision and complete the alignment/centering operation, four fine-pitch "pusher screws" are utilized. Each "pusher screw" is mounted to the triangular base of the slide/base unit (FIG. 1). There is one "pusher screw" for each of the four directions of movement of the cone/part holder plate 50 on the triangular base, North, East, South, and West.

After the cone/part holder assembly is centered to the optical head beam center, the four "pusher screws" are tightened, maintaining the base plate 50 position via compression. Then the "pusher screw" locking sleeves are tightened. Then the base plate 50 hold down screws are tightened. The "pusher screw" locking sleeves can also be secured with an appropriate glue. The above-noted alignment process centers the calibration cone precisely, with respect to the beam center of the optical head.

Figure 6:
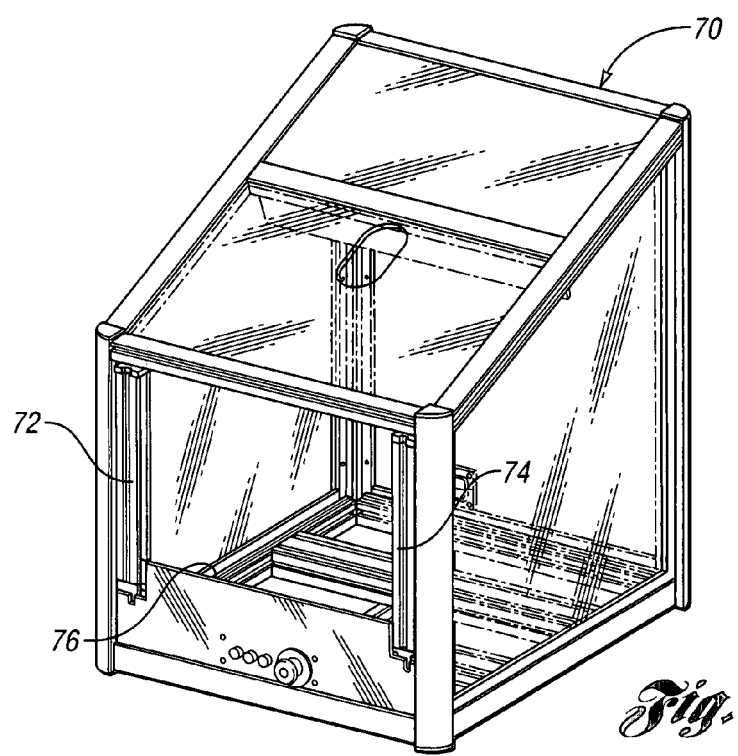
FIG. 6 is a schematic perspective view of a safety enclosure which may enclose the basic measurement hardware of FIG. 1.

FIG. 6 is a schematic perspective view of a safety enclosure, generally indicated at 70, which encloses the Laser Lab basic measurement hardware of FIG. 1 which sits inside the enclosure 70. A light curtain is generated by a light curtain transmitter 72 and is received by a light current receiver 74 to guard a physical access opening 76 to the Laser Lab. The enclosure 70 and its hardware monitor circuitry (not shown) guarantee that the moving optical head 12 will be stopped before a user can physically make contact with it.

Figure 7:
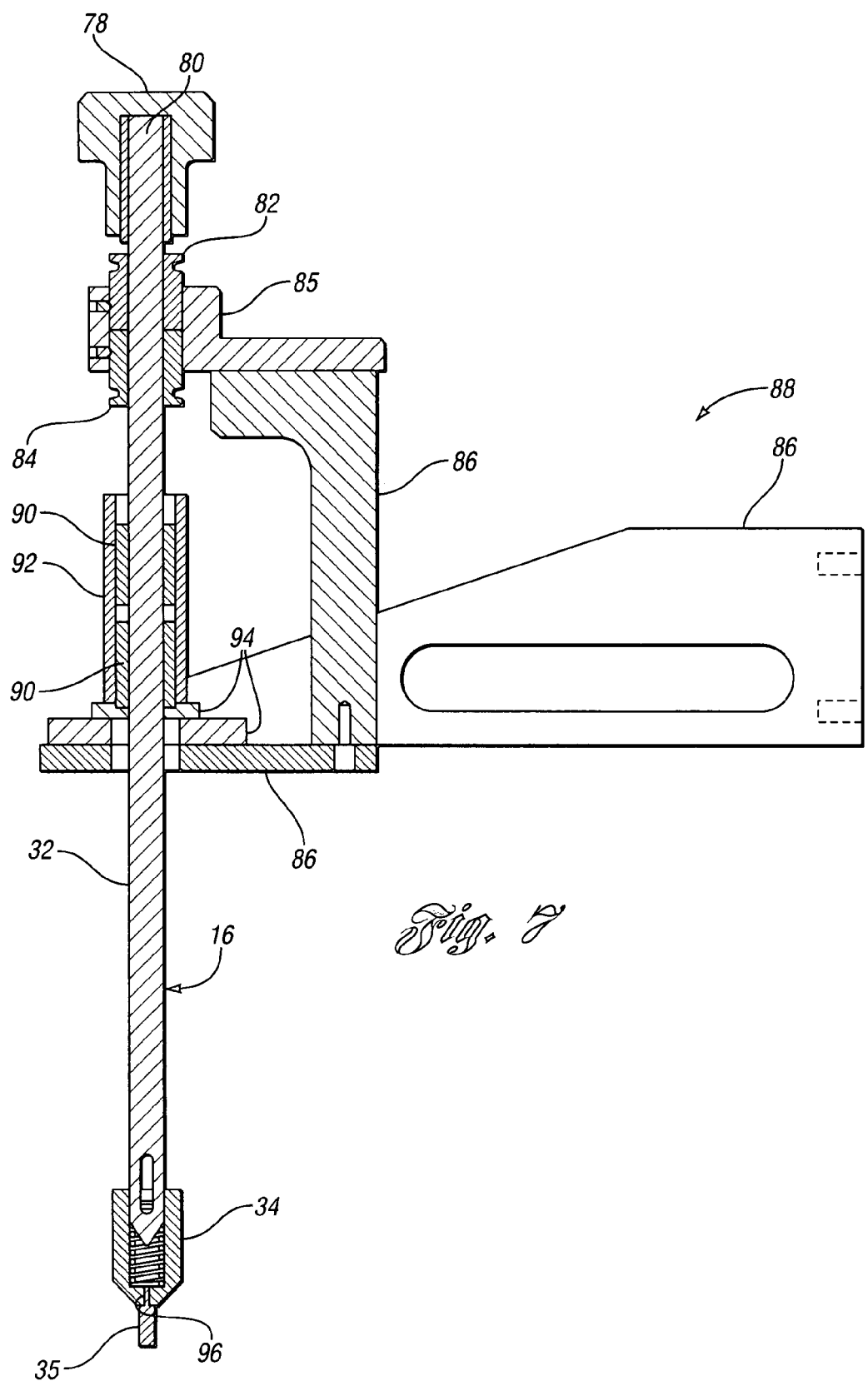
FIG. 7 is a side elevational view, partially in cross-section, of the upper tooling unit of FIG. 2.

FIG. 7 is a side elevational view, partially in cross-section, of the upper tooling unit 16. The long rod 32 of the tooling unit 16 can be moved up/down by almost 9" (for example) to accommodate a wide range of UUT sizes when an operator manually grips a rod handle 78 mounted at a proximal end 80 of the rod 32. The operator can release an upper or a lower friction release clamp 82 and 84, respectively, of the tooling unit 16. Support brackets 86 of a support structure, generally indicated at 88, hold the upper tooling unit 16 to the base/slide unit 18. Rod guides 90 supported by a guide support 92 which, in turn, is supported by the support brackets 86 and plates 94, hold the rod 32 precisely and also allow it to slide smoothly up/down. Raising the top release clamp 82 allows the rod 32 to move down, while lowering the bottom release clamp 84 allows the rod 32 to move up. The spring loaded part clamp 34 has a threaded hole 96 for threadably receiving and retaining one of a number of possible tips such as the tip 35 that contacts the part 36 to be inspected.

Laser Lab—Basic Measurements Overview

The Laser Lab is a system for measuring the dimensions of a variety of manufactured parts and/or assembled parts such as parts manufactured in the fastener industry. These parts are typically formed from cylindrical stock by roll and impact die forming methods or by cutting with lathes. The final part can have forms that are built up from basic shape units, such as circular or tapered cylinder, threaded cylinder, or additional simple shapes such as Trilobe cylinder or hex cylinder.

Substantially all of the measurements obtained with the Laser Lab system are based on two basic components: (1) the height of a surface from the light plane split line, and (2) the positions along the optical head's stage axis corresponding to the various heights.

In addition, the Laser Lab system performs multiple measurements from (4) different measurement directions. However, it is to be understood that, depending on the part, the measurements can be taken from as few as two measurement directions. In some cases, as many as five measurement directions may be needed. This capability of being able to obtain multiple measurements from multiple directions allows the Laser Lab to explicitly utilize 3-D shape information, especially in the measurement of threaded cylinders and non-cylindrical shapes.

Surface Height Relative to the Measurement Axis

In this section the measurements made by a single laser are described with reference to FIG. 8. The subsystem that makes these measurements is called a beam line. (4) beam lines are contained in one optical head as shown in FIG. 5.

The light plane generator module 66 of FIG. 8 creates a light plane from a single laser beam generated by the laser 64. The part creates shadowed and unshadowed regions in the light plane. The light plane receiver module's left and right receiver (Rcvr) components (i.e., optical detectors) convert the amount of light on the left and right sides of the laser split line into separate left and right electrical signals, respectively, which are digitized by receiver electronics when the receiver electronics receives a trigger or sampling signal from encoder electronics as described herein.

The PC analyzes the digitized signals from the receiver electronics and computes left and right sensor heights. The measurement computation utilizes a sensor height calibration (described later herein) to convert the raw digitized sensor signals into calibrated heights, measured in mm.

Figure 9:
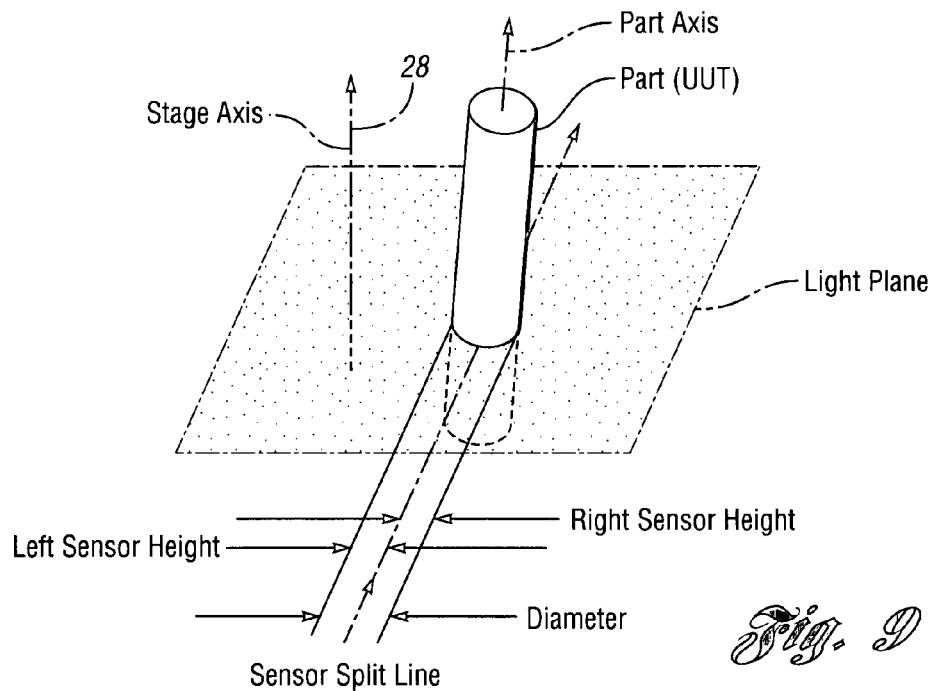
FIG. 9 is a schematic perspective view of a cylindrical part which is intersected by a projected laser light plane.
Figure 10:
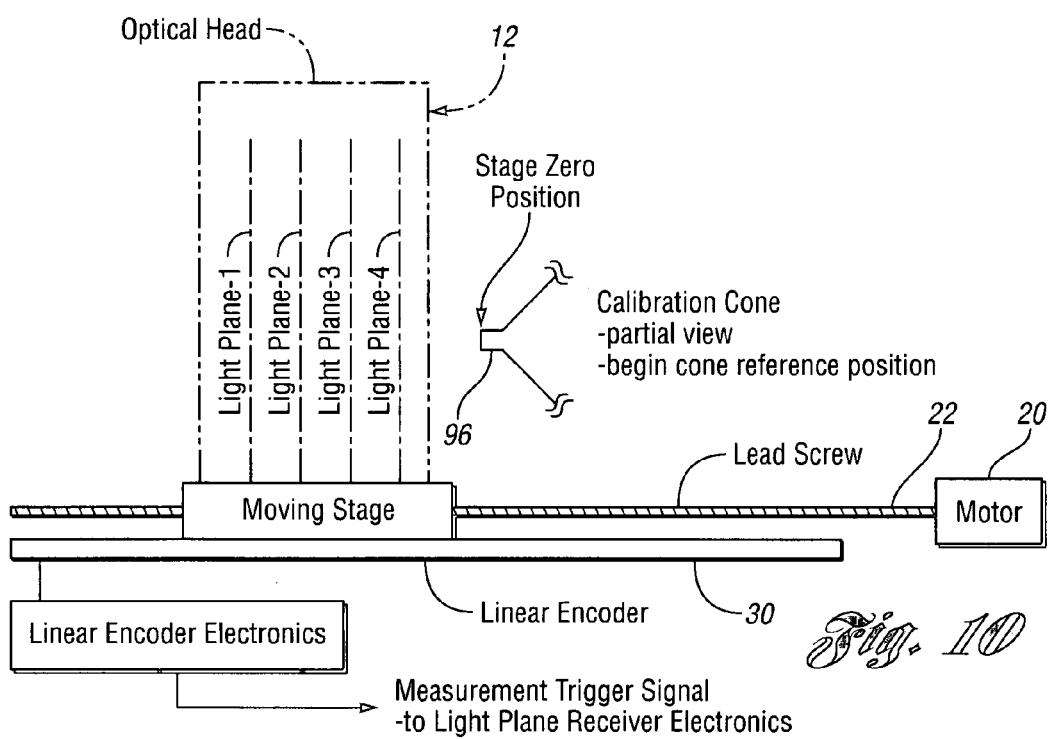
FIG. 10 is a schematic view, partially broken away, of various position measurement system components together with the optical head which is mounted on a stage to move therewith just prior to scanning the calibration device or cone.

The surface height measurement is further illustrated in FIG. 9. The left and right sensor heights are the amount of light blockage in the light plane, on both left and right sides. The light plane is nominally, but not exactly, perpendicular to both the stage axis 28 and the part axis.

Naming of Signals

In what follows the measurements that are based on light detections in the left or right receivers are referred to as left or right sensor signals or measurements, depending on the context. With (4) laser beam lines there are (8) sensor signals in the system 10. When referring to these signals in the entire system 10 the laser number is added to specify the beam line. Thus names for the sensor signals range from laser-1, left sensor through laser-4, right sensor.

As previously mentioned, FIG. 8 is a block diagram which illustrates the basic beam line system components including the laser 64 which generates a laser beam, the mirror 62 which reflects the laser beam and the light plane generator module 66 which generates a light plane which is projected at the part (UUT). The part blocks a portion of the light plane. The components also include the light plane receiver module 68 having left and right receivers or photo detectors. However, it is to be understood that instead of two detectors, a line scan camera, an LCD camera or other optical detector device may be provided.

FIG. 9 which is a schematic perspective view of a cylindrical part which is intersected by a projected laser light plane illustrates light plane measurement geometry.

Stage Position of the Optical Head

The optical head 12 generates (4) spaced apart laser light planes and is translated up and down by the moving stage system illustrated in FIG. 10. The light planes are projected perpendicular to the Z-axis defined by the movement of the stage (i.e., the stage axis 28). The linear encoder 30 preferably produces one measurement trigger signal pulse every 4 μm of stage movement. The signal is sent to the receiver electronics module. At the receiver electronics module, each measurement trigger signal pulse causes each sensor signal (8) to be digitized and stored into the PC's memory.

This combination of the linear encoder electronics, the measurement trigger signal, and the receiver electronics creates a sequential record of sensor digitized raw signals when the stage moves from bottom to top. The resulting record can be interpreted as a record of light blockage by either a part or the calibration device at a known series of positions, spaced 4 μm apart. In a preferred system the total linear length of stage movement is about 235 mm.

The position measurement system described above measures position intervals, but generally not repeatable positions. The moving stage is stopped near the top and bottom travel limits by electronic limit switches (not shown). Reaching the top or bottom travel limit switch by the stage causes the motor 20 to stop. However the actual stopped position is only approximate, since the limit switches are not precision instruments calibrated to the encoder 30 and since the distance the stage requires for stopping depends on the speed of travel. In practice this results in an uncertainty in the stopping position that can be as large as 500 μm.

To make a predictable starting position a light blockage signal is analyzed to extract the index position of the beginning of the calibration cone 40 in each sensor's digitized raw signal. The beginning of the cone 40 is preferably formed by a 0.125" diameter cylinder 96 of the cone 40 about 0.2375" long. The raw sensor signal is at a high level as each light plane moves towards the beginning edge of the cone 40, followed by a sharp step decrease in the response, and finally followed by a constant response along the length of the cylinder 96. The analysis software locates the midpoint of the sharp step in the response and use that index position to set the position zero for the sensor stage axis position. An example of the raw sensor signal is shown in FIG. 11.

It is found in practice that this technique can reduce the positional uncertainty of fixed positions on the part or on the cone 40 to an amount (5 μm) that is much less than the uncertainty in the stopping position (~300 μm).

FIG. 10 is a schematic view, partially broken away, of various position measurement system components together with the optical head 12 which is mounted on the stage to move therewith to scan the calibration cone 40 (and later the part). As previously mentioned, the motor 20 is coupled to the lead screw 22 which drives the moving stage and, consequently, the optical head 12 in a direction along the stage axis 28 dependent on the direction of rotary motion of the lead screw 22. The linear encoder senses the linear position of the moving stage along the stage axis 28 and provides a corresponding output signal to the linear encoder electronics. The electronics generate a trigger signal about every 4 μm of stage movement along the stage axis. The trigger signal is received and processed by the receiver electronics as previously described.

Figure 11:
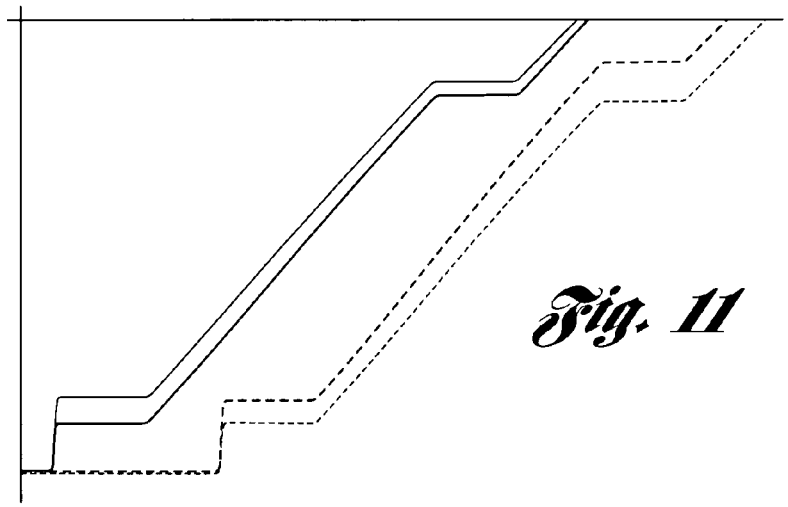
FIG. 11 are graphs of various raw sensor signals generated when the beginning edge of the calibration cone is scanned.

FIG. 11 illustrates graphs of various raw sensor signals generated at the beginning of the calibration cone 40 (i.e., the cylinder 96). Shown are the signals from sensors laser-1, left, laser-1, right, laser-4, left, and laser-4, right. The raw sensor signals are plotted with the highest values at the bottom of the graphs with values decreasing upwards. The left most step in the laser-1, left response represents a jump of about 2650 digitization units in the raw sensor response.

The plane of laser light from laser-4 is blocked by the calibration cone 40 before the plane of laser light from laser-1 on this upward moving scan. That is because the light plane for the laser-1 is the lowest in the optical head 12 as shown in FIG. 10.

Multiple Beam Optical Head

As previously mentioned, the optical head 12 contains (4) beam line subsystems. The subsystems are aligned on a common central axis. Looking directly down on the optical head 12 the beam line light plane split lines preferably intersect at a common point as shown in FIG. 12. The angles of the beam lines, relative to the front of the optical head base plate, are 22.5, 67.5, 112.5, and 157.5 degrees.

Figure 13:
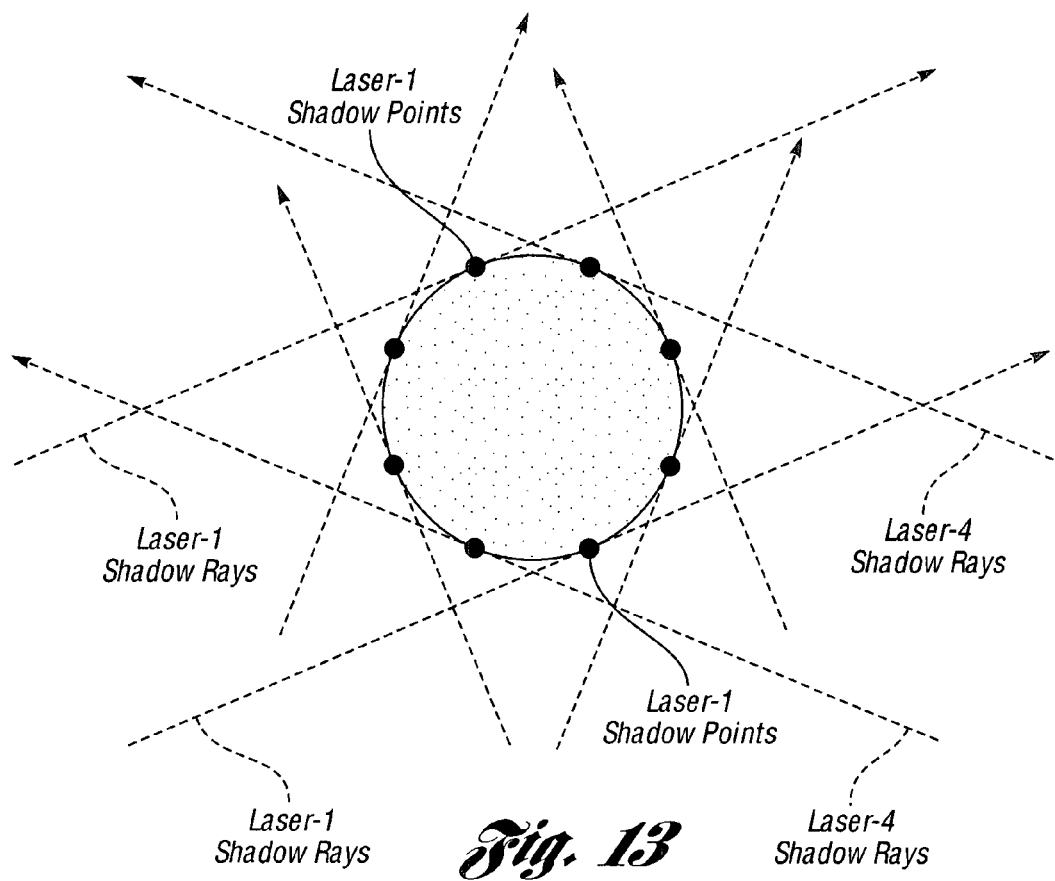
FIG. 13 is a top plan schematic view of a part illuminated by multiple planes of laser light with various tangential shadow rays and points.

This arrangement, combined with the mechanical scanning of the light planes, results in (8) outline images of the part, one per sensor. FIG. 13 shows the geometry of a typical situation when light from the (4) beam lines (light planes) intersects a part with a circular cross section. For each beam line, two shadow rays graze (are tangent to) the surface of the part, marking the left and right limits of the part's shadow. The points of intersection between the shadow rays and the part's surface are called shadow points.

Figure 14:
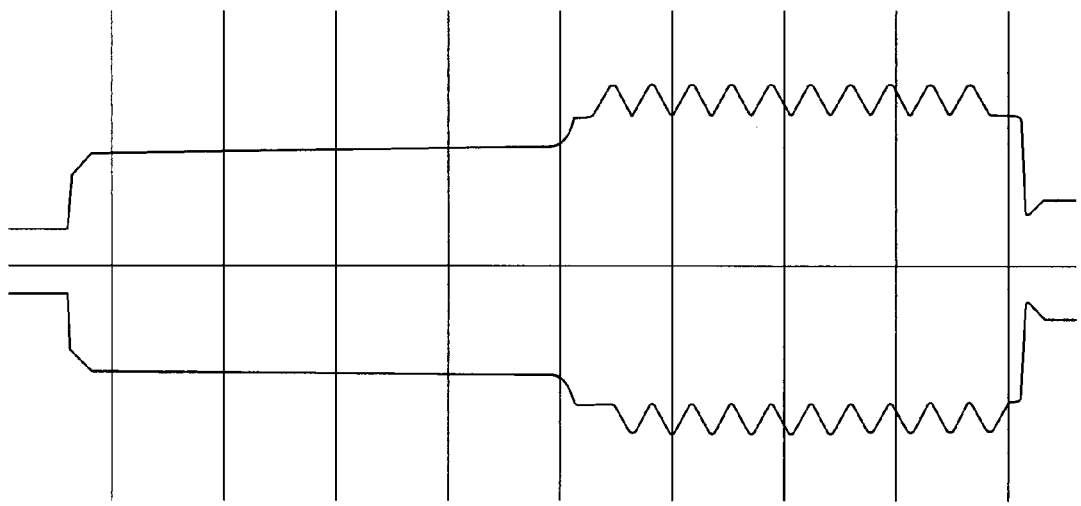
FIG. 14 is a graph of sensor height data created with a threaded part such as a standard thread plug go gage.

The calibrated distance between the shadow points and the light plane split line is the sensor height as shown in FIG. 9. FIG. 14 shows the sensor height plotted for both the left and right sensors of laser-1 for a full scan of a threaded part. This plot is essentially an orthographic projection of the part, in a viewing direction aligned with the laser-1, laser split line vector.

As previously mentioned, FIG. 12 is a top plan schematic view of the modules 66 and 68 of the optical head 12 with its top plate 60 removed. The laser split line for each transmitter module 66 is indicated as a dashed ray which has an arrow head which illustrates the direction of travel of the light beam and the plane of laser light.

FIG. 13 is a top plan view of a cylindrical part which is scanned by 4 planes of laser light including shadow rays which are tangent to the part at shadow points.

FIG. 14 is a graph of sensor height data created from a threaded part such as a standard thread plug go gage. Shown is laser-1 data; the left sensor data is plotted on the top half of the image, the right sensor data is plotted on the bottom half of the image.

Calibration Cone

The calibration cone 40 is a device which has a precisely manufactured shape or outer surface which is scanned to obtain calibration data which, in turn, is used to convert sensor raw digitized signals to calibrated sensor height measurements. The cone 40 is a rotationally symmetric with several distinct regions, each designed to perform a different calibration function.

Figure 15:
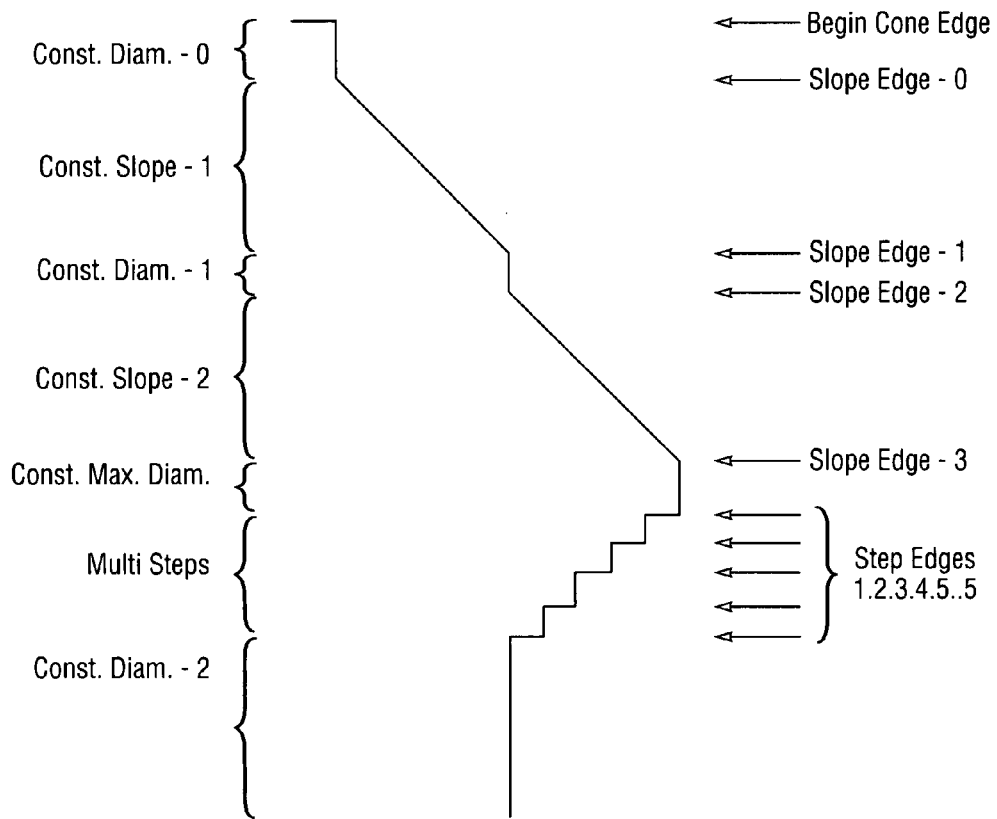
FIG. 15 is a symbolic sketch of the calibration cone's profile with various usage regions.

A symbolic sketch of the calibration cone's form is shown in FIG. 15. The calibration cone is designed with "usage regions", or specific shapes designed to accomplish specific calibration goals. These regions are listed in Table 1 below. Each "usage region" is designed to allow a specific piece of calibration information to be extracted from the scanned data set. The following sections briefly describe these pieces of calibration information.

Stage Position Alignment of Different Sensors

Each of the lasers 64 is mounted in the optical head 12 at a different height offset to the base plate 61 of the optical head 12 as described with reference to FIG. 10. The height offsets are not as precise as desired and depend on detailed optical and mechanical adjustments of the optical head 12 and its optical modules 66 and 68. The height difference between adjacent channels might be as large as 500 μm. The only way to make sure that the calibrated sensor stage positions refer to the same physical objects at the same stage positions is to measure a common physical position.

The precise location of the middle of the "begin cone edge" marks the common zero (0) of each laser sensor's calibrated stage position.

Sensor Height Zero Position Alignment of Different Sensors

It is important to select a common zero position in a plane that is perpendicular to the stage axis 28 and aligned parallel to the light planes in the optical head 12. The position zero that is selected in the calibration process is the intersection of the light planes with the center of the small cylinder 96 at the beginning of the calibration cone 40 (i.e., FIG. 10).

A light plane split line defines a natural zero for the sensor height measurement, but the (4) light plane split lines do not necessarily intersect in a single point as illustrated in FIG. 12. The optical head alignment process only ensures that the light plane split lines intersect within a 1/16" (1587.5 μm) cylinder.

Adding the position offset described above makes the lines defining the position zero of each sensor's calibrated height intersect at the center of the small cylinder 96 at the beginning of the calibration cone 40. Measuring the center, after calibration, typically gives a central location that is less than 1 μm from (0,0).

Calibration Cone Aspect Vector, Relative to Stage Axis

The calibration cone's central axis is not necessarily exactly aligned with the axis 28 of the stage motion, due to tolerance stackup on a long path from cone 40, to part holder, to base plate, to slide support, etc., and finally to the slide.

By measuring the sensor heights of the center of two calibration cone regions, "const diam-1" and "const diam-2", the inclination of the calibration cone's aspect vector relative to the stage axis 28 can be determined.

Typical measured angles for the calibration cone aspect vector relative to the stage axis 28 are in the range (0 . . . 1 degree) or (0 . . . 17.5 mrad).

Light Plane Angle, Relative to Calibration Cone

The laser light planes are not exactly perpendicular to the calibration cone aspect vector. In order to know the angle between the light planes and the calibration cone 40, the "multi-step" region is analyzed. Signal processing software can very accurately measure the position of each one of the set of 5 step edges in the "multi-step" region. The distance between the 5 step edges is precisely known. With this information the angle of the light plane relative to the cone aspect vector can be computed. This angle is important in determining exactly how the light plane intersects the calibration cone 40 and thus in extracting calibration information from the data.

Typical measured angles of the light plane relative to the calibration cone 40 are in the range (0 . . . 75 degree) or (0 . . . 13.1 mrad).

Sensor Height Calibration

The output of the laser scanned measurement is a record of the sensor digitized raw signals for each sensor. To make sensor height measurements in physical coordinates the raw signals need to be converted to sensor heights.

Two regions on the calibration cone, "const slope-1" and "const slope-2" provide this information. For example, the diameter of the intersection between a laser light plane and "const slope-1" region varies between 0.125" and 0.750". The exact diameter can be computed by knowing the distance between the laser light plane and the beginning of the "const slope-1" region, since the region is manufactured to high precision.

Based on the diameter of intersection and the laser sensor outputs, calibration tables may be constructed to convert digitized raw signals to calibrated sensor heights.

Measurement of the Sensor "No Blockage" Signal Level

The raw signal level with no cone 40 or UUT in the light plane sensor beam is also measured. For small parts it is often required to extrapolate the sensor raw signal to sensor height conversion table to smaller heights than are measured on the cone. The extrapolation is carried out with less accuracy than more direct measurements, but the extrapolation is very useful, especially for parts that are only slightly smaller than the begin cone cylinder 96 ("const diam-0" region) of the cone 40 or parts that are offset from the calibration cone central axis.

The "no blockage" signal level is also required in order to correctly find the beginning of the cone 40.

Finally, excessive variability of the "no blockage" signal level is a signature of variability of the light output of the laser 64 in a beam line. This variability of the "no blockage" signal level is monitored to generate a signal which indicates that the apparatus which generates the beam line requires repair or is temporarily unable to carry out high precision diameter measurements.

This measurement goal does not involve measurement of the calibration cone 40. However, it is required to interpret calibration cone analysis. It is made possible by the physical design of the part holder base as illustrated in FIG. 3a, and by the alignment of the bottom position of the optical head 12 on the base/slide to the part holder base.

TABLE 1

Figure 26:
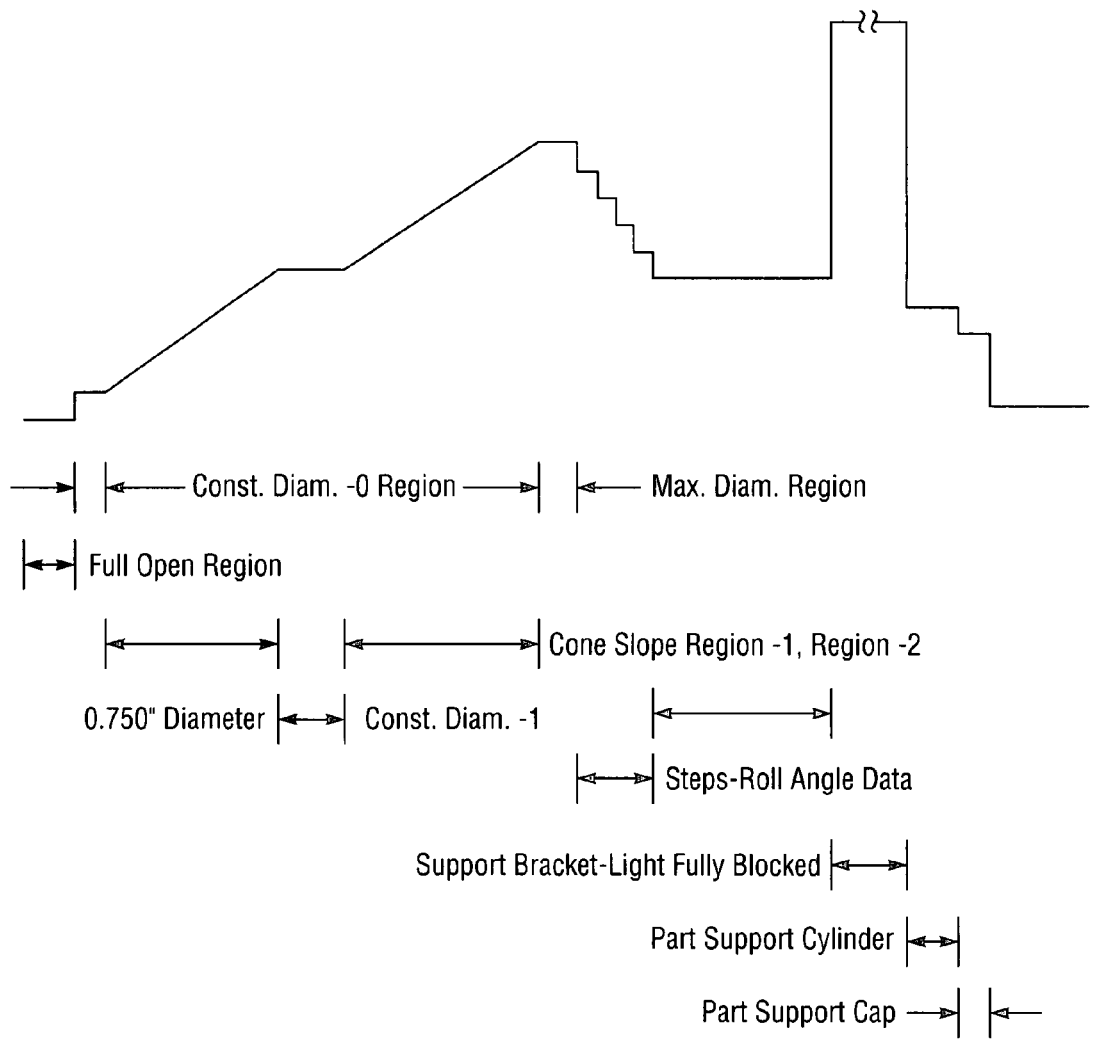
FIG. 26 is a sketch, partially broken away, similar to the sketch of FIG. 15 which shows a schematic outline of the sensor signal produced by the calibration cone and various support structures.

Calibration Cone - Usage Regions (i.e., FIGS. 15 and 26)

| Region | Description |
|---|---|
| begin cone edge | Begin cone step edge.<br>Measurement of the precise step edge position makes |

TABLE 1-continued

Calibration Cone - Usage Regions (i.e., FIGS. 15 and 26)

| Region | Description |
| --- | --- |
| | it possible to align measurements made with different laser sensors. The precise edge location is each sensor's stage axis zero (0) coordinate. |
| const diam-0 | Constant diameter region-0, diameter 0.125". The central axis of this region, projected to the sensor is the common physical sensor height zero (0) coordinate. |
| const diam-1 | Constant diameter region-1, diameter 0.750". The central axis of this region is utilized for estimates of the 3-D cone aspect vector, relative to the stage axis 28. |
| const diam-2 | Constant diameter region-2, diameter 0.750". The central axis of this region is utilized for estimates of the 3-D cone aspect vector, relative to the stage axis 28. |
| const max diam | Constant maximum diameter region, diameter 1.500". Marks the boundary between the constant slope region and the multiple step region. |
| const slope-1 | Constant slope region-1. Measurements in this region establish the raw sensor output corresponding to diameters in the interval 0.125" and 0.750". |
| const slope-2 | Constant slope region-2. Measurements in this region establish the raw sensor output corresponding to diameters in the interval 0.750" to 1.500". |
| multi step | Multiple step region. Measurements of the precise step edge positions of the (5) equal height edges allow a rough estimate to be made of the angle of the Laser Light Plane relative to the cone aspect vector. |
| slope edge-0,1 | Slope edges 1 and 2. The edge positions mark the boundaries of the const slope-1 region. |
| slope edge-2,3 | Slope edges 2 and 3. The edge positions mark the boundaries of the const slope-2 region. |

Other embodiments of the calibration cone 40 are possible while still meeting the general measurement goals of the Laser Lab system 10.

Calibration Measurement Goals

These are goals that calibration analysis of the cone data meet:
1) stage position alignment of different sensors
2) sensor height zero position alignment of different sensors
3) calibration cone aspect vector, relative to stage axis 28
4) light plane angle, relative to the calibration cone 40
5) sensor height calibration
6) measurement of the "no blockage" signal level.

In another embodiment of the calibration cone 40, changes to overall minimum and maximum width of the cone 40 can be made.

The calibration cone's "point design" allows one to extract calibration data relevant to measuring parts in the diameter range 0.125" to 1.500".

The system can be designed for smaller or larger parts wherein width measurement limits could be changed. A small compact system for measuring a range of smaller diameters could utilize a calibration cone 40 with minimum and maximum diameters of 0.065" and 0.500" for example.

In another embodiment, changes to overall length of the cone 40 can be made.

The calibration cone's "point design" is specified as a compromise between ease of analysis and physical compactness. The lower the slope in the "const slope" regions, the more precise the data that is extracted. This is due to two reasons. First, dividing up a sloping region into "bins" and then determining the raw data to height conversion factor within an individual bin is more accurate when the mechanical diameter varies least within the bin.

Second, inaccuracies in determining the light plane twist angle or light planes that are not flat are multiplied into inaccuracies in the raw data to height conversion factors by the mechanical slope of the const slope regions in the calibration cone 40.

In yet another embodiment, changes to slope in "const slope" regions can be made. As noted in the above-noted discussion, lower slopes in the "const slope" regions translates to more accuracy in the sensor raw data-to-height conversion factor tables.

A "point design" directed towards the goal of smaller parts and towards a more compact system design might have a cone 40 with the same length, but 3× smaller width dimensions. This would allow more precision in measuring smaller parts with smaller width light planes.

In another embodiment, the cone 40 can be supported either "point down" or "point up". The mounting direction does not matter, the calibration measurement goals can be met with either orientation. However, the mounting method should still allow a region of "no blockage" sensor signal to be measured during each up/down scan.

In yet another embodiment, different number of steps in "multi-step" region can be provided. The number of steps in the "multi-step" region can be varied and the dimensions of the steps can be changed.

The calibration analysis that determines the light plane twist angle uses the difference in position between steps detected in the left and right sensors. Having more steps makes the determination more precise.

In another embodiment, changes to the number, position, or diameter of the "constant diameter" regions can be made. The calibration cone aspect vector is measured by analysis of the central axis of two constant diameter regions, "const diam-1" and "const diam-2". Each region is the same diameter. Determination of the location of their 3-D center allow determination of the central axis of the calibration cone 40, from the two 3-D center points. It is important that both regions be the same diameter, to minimize the effect of diameter measurement errors on the calibration cone axis vector.

The regions could be a different diameter, either smaller or larger. There could also be more than two regions. Then a line could be fit through 3 or more 3-D points to determine the calibration cone axis vector. It is important that there be at least two regions, one region does not typically determine the calibration cone axis vector.

Laser Lab Calibration Analysis Overview

What is now described is a process oriented overview of the Laser Lab calibration procedure. In this procedure raw sensor data and geometric descriptions of the calibration cone 40 are utilized to produce calibration data. This data set can be used later to produce calibrated sensor data from raw sensor data, as described in the "data processing" section, below.

Calibration Goals

As previously mentioned, the following is a partial list of the measurement process goals that are met by the design of the mechanical calibration cone 40 and also by the calibration data analysis procedure:

G-1: stage position alignment of different sensors
G-2: sensor height zero position alignment of different sensors
G-3: calibration cone aspect vector, relative to stage axis 28
G-4: light plane angle, relative to calibration cone 40
G-5: sensor height calibration Data Processing After a laser lab scan of a UUT, (8) sensor digitized raw signals are stored, one each for the left and right sensors, repeated for each of (4) light planes. Each of these digitized raw sensor signals is a single "vector" or indexed list. The sensor raw signal vector has an "index" for every sample stored on the laser lab scan of the UUT; index 1999 refers to the 1999-th sample taken during the scan. The value in the vector at index 1999 is the value of the 1999-th raw signal sample.

Production of Calibration Data

After the raw sensor signal vectors are stored in memory of the computer or PC, the vectors are analyzed to extract calibration information. This information is extracted from the part of the digitized raw sensor signals that contains the image of the calibration cone 40. The extracted information results in a number of tables and parameters, collectively called "calibration data".

Production of Calibrated Sensor Data

Once calibration data has been successfully calculated it is utilized to produce a new set of vectors called "calibrated sensor data". The new calibrated sensor data vectors contain two pieces of information at each "index": the pair (calibrated stage position, calibrated height).

Calibrated Stage Position

Stage position for the N-th index in the calibrated sensor data vector is the distance (in mm.) from the beginning of the calibration cone 40 to the position where the raw sensor signal at the N-th index was taken.

First the raw sensor stage indices (the index of the raw sensor signal vector) are multiplied by the stage linear encoder spacing (4 µm in the current system), producing raw sensor stage positions. Then the raw stage positions are referenced to the position of the beginning of the calibration cone 40.

Finally the raw stage positions are corrected for laser tilt. The tilt correction depends on the height of the sensor data point. If the laser plane is slightly tilted, then any non-zero sensor height also represents a slight change of stage position since the light plane, stage axis coordinate system is not orthogonal. After the correction the calibrated sensor height, calibrated sensor stage position coordinate system is orthogonal. Having an orthogonal coordinate system makes later measurement analysis much simpler.

Calibrated Sensor Height

Calibrated sensor height for the N-th index in the calibrated sensor data vector is the distance (in mm.) from the center of the calibration cone's beginning cylinder 96 to the shadow ray that produced the raw sensor signal at the N-th index.

As discussed herein above, the observations in the non-orthogonal stage position, light plane coordinate system are corrected for the effects of laser tilt.

Decimation to a Uniform Sampling Interval

The corrections for laser tilt result in a vector of calibrated sensor data where the stage position distances between adjacent index positions in the vector can vary around an average value of 4 µm.

Since uniformly sampled data is much easier to work with for measurement analysis, the calibrated sensor data vector is decimated or sampled to uniformly sampled calibrated sensor data vector for measurement processing. In the current system the data is decimated to the original linear encoder sample spacing of 4 µm.

Figure 16:
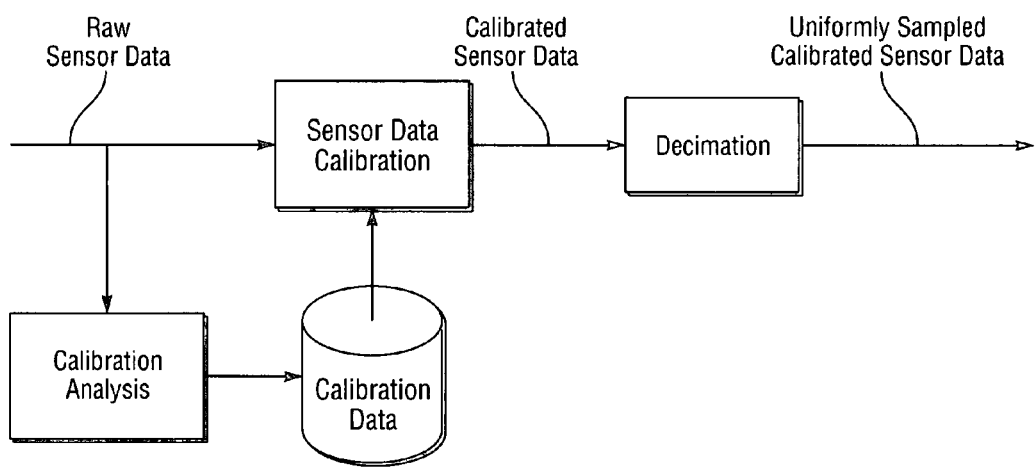
FIG. 16 is a schematic block diagram which illustrates raw sensor data processed with calibration data to obtain calibrated sensor data.

FIG. 16 is a schematic block diagram which illustrates sensor data processing. The figure shows the processing of raw sensor data with calibration data to obtain uniformly sampled calibrated sensor data.

Calibration Analysis

Calibration analysis refers to the analysis of the raw sensor data vectors containing an image of the calibration cone 40. The output of the analysis is a set of tables and parameters called "calibration data".

Rough Edge Processing

Rough edge processing discovers the presence and rough parameterization of the signal edges in the raw sensor data.

Rough edge processing attempts to find the "pattern" of edges that identify the calibration cone 40 in the raw sensor data vector. This pattern is schematically illustrated in FIG. 15.

Two types of edges are found. The first type of edge, a "step edge", represents a vertical segment on the calibration cone 40. A step edge detector finds one edge corresponding to the begin cone edge and (5) edges corresponding to the locations of the vertical segments in the calibration cone's multi-step region.

A second type of edge, a "slope edge" represents the location where two straight segments join with each segment having a different inclination to the vertical. A slope edge detector looks for slope edges only in locations where there is not a step edge. All step edges are also slope edges. The slope edge detector finds a first unique slope edge at the location where "const diam-0" region meets "const slope-1" region, and in (3) other places.

Rough Edge Processing—Outputs
  rough locations for step edges.
  rough locations for slope edges.
  confirmation that the calibration cone edge pattern is present in the data.

If the rough edge processing step does not find the calibration cone edge pattern, then the calibration analysis process is stopped.

Precise Edge Processing

Precise edge processing finds the exact locations of step edges in the calibration cone edge pattern. Precise edge processing utilizes outputs from rough edge processing to determine initial estimates for the edge locations, which it then refines.

A detailed description of precise edge processing is located in Appendix B.

Precise Edge Processing—Outputs
  precise location for begin cone step edge.
  precise locations for (5) edges in "multi step" region.

The knowledge of the set of (8) begin cone step edges, one for each sensor, completes calibration goal G-1: stage position alignment of different sensors. This data is stored in the calibration data and utilized to convert raw sensor data to calibrated sensor data.

Data Binning

At 4 µm per sampled point, there can be too much data to be effectively analyzed for certain calibration processes. Data binning is the process of dividing up a set of sampled points, grouping the set into a smaller set of "bins", each bin containing a number of adjacent sampled points.

For the tables relating the raw sensor data to calibrated sensor heights binning is utilized. For example, the "const diam-1" region on the calibration cone 40 is about 12 mm long, ranging from 3.810 mm to 15.558 mm along the cone axis. This would be about 3000 data points without binning. At the nominal bin size of 0.2 mm this works out to about 60 bins.

Another advantage of binning is that the data within the bin can be averaged and checked for consistency.

Finally, the data bins are not constructed within a "guard" region within 0.2 mm. of a detected edge. For the "const diam-1" region the edges "slope edge-1" and "slope edge-2" mark the boundaries of the region and the "guard" region assures us that the boundary data bin contains only data from the uniformly sloping region.

Data Binning—Outputs

Four sets of data bins are produced, for each of (8) sensors:
two sets of data bins for the regions "const slope-1" and "const slope-2".
two sets of data bins for the regions "const diam-1" and "const diam-2".

The "const slope-n" data is used in the construction of the sensor height calibration table. The "const diam-n" data is used as input data to the process that finds the position of the calibration cone's 0.750" diameter cylinder, for the cone aspect angle estimation process.

Laser Roll

Laser roll processing finds the angle between a light plane and the calibration cone 40 in each laser's calibrated sensor coordinate system.

For each laser the precise edge locations for the (5) edges in the "multi step" region are obtained, one set for the left sensor and another set for the right sensor. The difference between the left sensor and the right sensor edge positions can be used as input to a least squares estimate of the laser roll angle.

The detailed method of estimation is described in Appendix B.

The estimate of the laser roll angle assumes that the light plane is flat.

Laser Roll Processing—Outputs (4) laser roll angles, relative to calibration cone 40, projected to each laser's coordinate system.

The estimate of (4) laser roll angles completes calibration goal G-4: light plane angle, relative to calibration cone 40. These angles are stored into the calibration data.

Sensor Blockage and Tilt

The primary goal of the sensor blockage and tilt process is to generate a calibration table that relates the sensor raw signal values to the calibrated sensor heights.

Achieving the primary goal is made difficult because the calibration cone 40 may be mounted at an angle that may not be parallel to the stage axis 28. If the cone angle is not parallel to the stage axis 28 then the interpretation of exactly where the light plane hits the calibration cone 40 depends on the angle between the calibration cone 40 and the stage axis 28.

To solve this problem an iterative process was created.

First, the sensor calibration tables were created, assuming the cone angle and stage axes 28 are parallel. Then using the newly created sensor calibration table an estimate of the cone angle was made. The process is repeated (4) times. The iterative process has been found to converge in all cases. It is recommended that the mechanical alignment of the cone aspect angle to the stage axis 28 be less than (1 degree).

This process is documented in more detail in Appendix B.

Sensor Blockage and Tilt—Outputs

The sensor blockage and tilt calibration process has two outputs.

(8) sensor raw data to calibrated sensor height tables, stored in a calibration object.
a 3-D estimate of the angle between the calibration cone aspect angle and the stage axis 28.

The (8) calibrated sensor height tables complete calibration goal G-5: sensor height calibration. The 3-D cone aspect angle meets calibration goal G-3: calibration cone aspect vector, relative to stage axis 28.

Sensor Height Table Extrapolation

The tables that correlates raw sensor data to calibrated sensor heights may need to be extended. Sometimes a small part with a center offset has a sensor height that is smaller than the minimum height in the table. There are also gaps in the data, due to the presence of "guard" regions, as discussed herein.

Data gaps are addressed by a linear interpolation method.

For sensor heights that are smaller than the minimum sensor height in the sensor height calibration table the table is extrapolated to a zero height. The last 10 points in the sensor height calibration table are fit to a line. Then additional points are added to the sensor height calibration table between the table's minimum height and a height of zero.

The same process is carried out to extrapolate the sensor height calibration table to the maximum sensor height allowed (0.750").

Sensor Height Table Extrapolation—Outputs

The outputs of the process are additional sensor height calibration table entries, generated from linear extrapolations to zero height and to maximum height.

Sensor Height Table—Zero Height Position

For each sensor calibration table an offset is computed to ensure that the sensor height is zero when the sensor views the calibration cone's begin cone cylinder 96 (const diam-0 region).

Sensor Height Table—Zero Height Position—Outputs
sensor height zero offset for (8) sensors This data meets calibration goal G-2: sensor height zero position alignment of different sensors.

Thread Signal/Data Processing

Introduction

What follows is a description of the structure of the thread parameter estimation process. This process provides one embodiment of the standard thread measurement "feature" in the system 10.

Thread Signal Processing

Thread signal processing is the process of estimating the following thread parameters:
1) pitch
2) major diameter
3) minor diameter
4) functional diameter
5) lead deviation
6) pitch diameter.

The input data to the process is "calibrated part data". This data set consists of (8) vectors, one for each photodetector or sensor. Each vector consists of an indexed table of elements, each containing a (z,h) pair. Each (z,h) pair measures the position of the UUT's shadow ray in a coordinate system that represents each sensor's view of the UUT. z is a measurement of calibrated sensor stage axis position, and represents the distance along the stage axis between the current data point and the stage position where the light plane hits the beginning of the calibration cone. h is a measurement of calibrated sensor height and represents the distance between the middle of the beginning cylinder of the calibration cone and the shadow ray, perpendicular to the stage axis.

As the thread signal processing proceeds, a number of intermediate data products are produced in early processing stages that are further analyzed in later stages. These include:
- rough pos/neg crossing locations
- rough crest locations
- wire position search intervals
- left/right flank lines
- wire positions
- precise crest/root locations
- 3-crest average/median measurements of major diameter, minor diameter, pitch diameter
- 3-D crest cylinder axis
- wire position projections on the 3-D crest cylinder axis
- 3-D crest cylinder diameter
- 3-D crest root-mean-square distance between crest data and fit.

These intermediate data products are analyzed to produce final estimates of the thread parameters. For example major diameter is estimated as twice the radius of the 3-D crest cylinder. The 3-D crest cylinder axis then depends on the precise crest/root locations. The crest/root locations then depend on the search intervals based on rough crest locations and pos/neg crossings, and on data from the original calibrated part data.

Processing Restrictions

Inspection Region

The thread processing occurs between stage position limits called an inspection region. In the Laser Lab template editor, the user specifies the inspection region by manipulating the upper and lower stage position limits, overlaid on an image of the part.

These limits utilize the calibrated sensor stage position so that measurements by different lasers are aligned to the approximately similar physical positions on the part.

The estimation of thread parameters is specified to be an average estimate over all the data within the inspection region. In practice, some of the intermediate data products are estimated outside of the inspection region in order to allow estimation of all thread parameters within the full region. For example, a wire position within the inspection region may require a thread crest outside the inspection region.

Measurement Assumption for the Inspection Region

The following requirements guide the user's placement of the inspection region on the image of the part. At present the analysis software does not detect a failure of any of the listed requirements directly.

The first assumption is that the thread parameters be constant throughout the inspection region. This enables the software to average the estimates from different positions within the inspection region and not be concerned with partitioning or segmenting the data into different regions for special processing.

This requirement excludes the following types of data from the inspection region:
- the beginning or end of a threaded region, with thread crests less than full height.
- a threaded region with a taper.
- a threaded region with a notch or extensive damage.

A second assumption is that the inspection region contains at least 4-6 thread pitches. This amount of data is required to construct several of the intermediate data products with the required accuracy. The intermediate data product that is most closely tied to this requirement is the 3-D peak cylinder described herein.

A third assumption is that the thread be manufactured with a 60-degree flank angle. Thread processing implicitly utilizes this parameter in several places. One of the most direct usages is the conversion of lead deviation into functional diameter. Other flank angles or other thread form shapes would require different procedures.

A fourth assumption is that the thread has a cylindrical cross section. Non-cylindrical threads would require the 3-D peak cylinder to be suitably generalized. Incorrect fit to a non cylindrical cross section would lead to incorrect lead deviation measures in the current implementation.

A fifth assumption is that the thread has a single helix. Currently double threads are not supported.

The software does not check the assumptions. Failure to meet the requirements will typically lead to bias in the thread measurement, or in a failure to successfully measure the inspection region.

In practice these requirements limit the measurement of the following objects:
- non-standard thread types, especially self-tapping screws.
- small threaded regions with 2 or 3 pitches.
- Taptite trilobe threaded regions.

Rough Crossings

The thread model described hereinbelow is a sampled representation of one sensor's thread profile, for exactly one pitch. The thread model starts at the midpoint of a rising thread flank and ends one pitch later.

Figure 17:
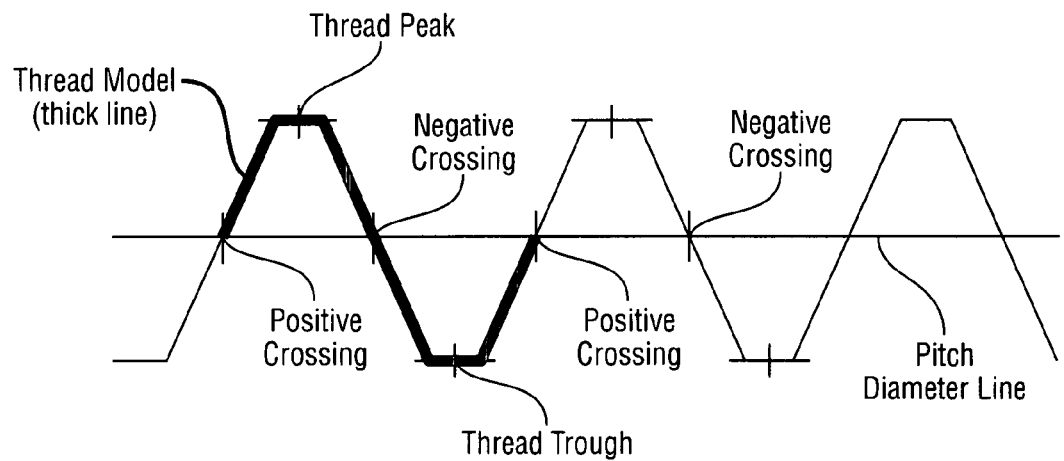
FIG. 17 is a thread model superimposed on a graph which illustrates rough thread peaks, troughs (or more correctly "crests" and "roots") and crossings obtained by the intersection of a pitch diameter line with flank lines.

Using a correlation detector the thread model is matched to data within the inspection regions, producing thresholded detections within the inspection region, that are called crossings. FIG. 17 shows a sketch of a thread model matched to the sensor data.

Figure 18:
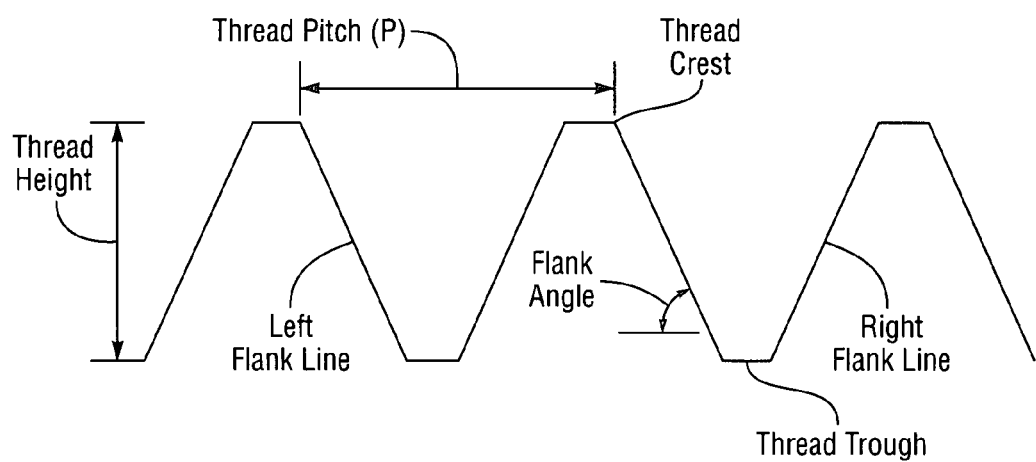
FIG. 18 is a graph similar to the graph of FIG. 17 wherein selected thread concepts are illustrated.

Later processing "refinements" noted herein may make the crossings more accurate. The refinements also separate the crossings into positive crossings (right flank line in FIG. 17) and negative crossings (left flank line in FIG. 17). FIG. 18 illustrates selected concepts of a thread form. The thread model is a lateral sequence of points that represent a best estimate of the outline of one cycle of the thread form.

Rough Crest and Root Positions

A crest/root detector extracts rough crest and root positions between the matched adjacent pairs of positive and negative crossings.

Pitch Estimate

A pitch estimate is required for step set gage wire diameter. The estimate is required to be accurate enough to unambiguously select a unique gage wire from the set appropriate for the measurement. The current process utilizes a two-stage process.

This process may be simplified as described herein.

First Estimate

Crossing data is analyzed and averaged over all sensors to create a thread pitch estimate, the "crossing pitch".

Second Pitch Estimate

The steps: set wire gage diameter, wire position search intervals, measure flank lines and measure 3-point diameters noted hereinbelow are completed in a first iteration. Then the wire positions are averaged over all sensors and positions to compute a pitch estimate.

Set Gage Wire Diameter

Gage wires are utilized in physical thread measurements of pitch diameter in the prior art. Two wires are placed in adjacent threads on one side of the UUT, and a single wire is placed on the other side of the UUT. A micrometer measures the distance between the reference line established by the two adjacent gage wires and the reference point established by the other gage wire. A tabulated correction formula converts the micrometer distance to an estimate of the pitch diameter.

Gage wire sizes are thus selected prior to the thread measurement. To do this one estimates the thread pitch as previously described and then one selects the closest gage wire in a set to the pitch estimate. The gage wire set utilized is the one appropriate to the type of measurement; currently there is one set for the metric coarse thread sequence, and another for a similar English thread set. The gage wire sets are chosen at part template edit time, by making a selection in a pull down list.

Wire Position Search Intervals

One places "virtual" gage wires onto the calibrated sensor data throughout the inspection region. In order to place the "virtual" gage wires we must identify search intervals for each wire to be located.

A requirement of the following processing steps is that the wire positions in the inspection region have no gaps. Another requirement is that a wire position search interval consist of two valid thread crests, one valid thread root between the two thread crests, and valid positive/negative crossings between the crest/root pairs.

One then searches the set of positive/negative crossings and crest/root positions for the set of wire position search intervals to analyze. The result is a set of intervals, one set per sensor.

Measure Flank Lines

Figure 19:
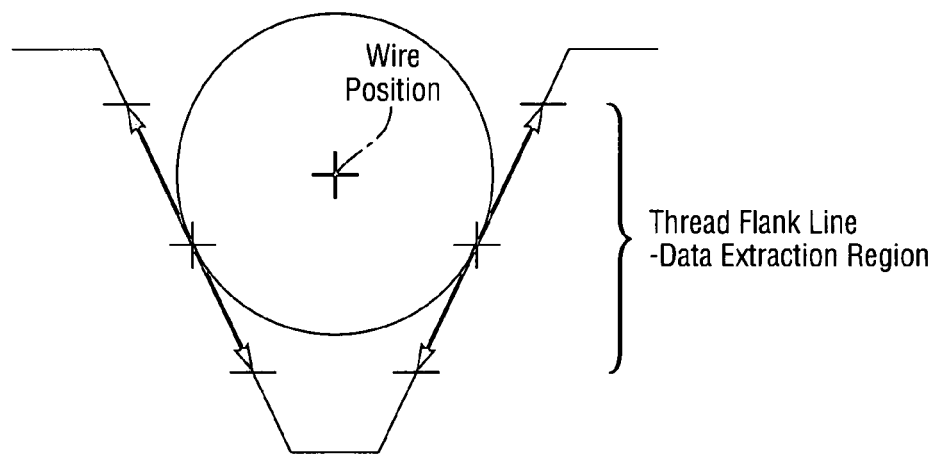
FIG. 19 is a single thread form which illustrates thread flank lines, a thread flank line data extraction region and a wire position.

FIG. 19 shows a sketch of a portion of calibrated sensor data in a single wire position search interval.

The specification of a valid wire position search interval means that the form of the calibrated sensor data is approximately as shown in FIG. 19. This form was used to create a plan to robustly extract flank line data.

For the left flank line (example) we analyze all data between the rough positions of the left crest and the central root. One then determines the height limits of a flank line data extraction region that covers 70% (a configurable parameter) of the height interval between left crest and central root. This data is extracted into a data set and fit to a line, becoming the left flank line.

The procedure avoids the non-linear regions near the left crest and central root. In addition a "flank line valid" flag is computed, based on the RMS distance between the left flank line and the data within the left flank line data extraction region. If the RMS distance between the flank line and the data points in the flank line data extraction interval is larger than 10 μm per point (a configurable parameter), then the flag is set to invalid.

The process is repeated for the right flank line and then for all wire position search intervals.

Measure Wire Positions

The wire positions are calculated, given the left and right flank lines and the wire size. As shown in FIG. 19, the virtual wire is tangent to each flank line and the resulting position is calculated with a simple geometric formula.

The position has a valid flag that is true when both flank lines are valid, and false otherwise.

Measure 3-Point Diameters

The 3-point technique is a method to measure the minor, major, and pitch diameters without explicitly utilizing 3-D information. All computations are carried out in the 2-D laser sensor coordinate system.

For example, consider the major diameter. It is defined as the diameter of a cylinder that contains all the inspection region's thread crests.

In this method, the top of a thread crest in calibrated sensor (stage position, height) coordinates forms an elementary measurement. The elementary measurements are combined into triplets for further analysis. Only crests from the two sensors of a single laser are combined.

Two adjacent thread crest positions in sensor-1 are combined with the thread crest position in sensor-2 that is closest to the average position of crests in the first sensor. The two crests in sensor-1 form a reference line. Then the distance from the reference line to the crest in sensor-2 is computed. This is the 3 crest distance for that crest triplet.

In this manner, the 3-crest distances from all adjacent crest triplets are computed, for all laser data. The 3-crest distances are all added to a data vector. The 3-crest diameter measurement is either the average or the median of all the 3-crest distances within the 3-crest data vector.

3-Point Minor Diameter

The 3-point minor diameter computes 3-point distances using precise root locations in the sensor data. The 3-point minor diameter is the average of the 3-point distance vector.

3-Point Major Diameter

The 3-point major diameter computes 3-crest distances using precise crest locations in the sensor data. The 3-point major diameter is the median of the 3-point distance vector.

3-Point Wire Pitch Diameter

Figure 20:
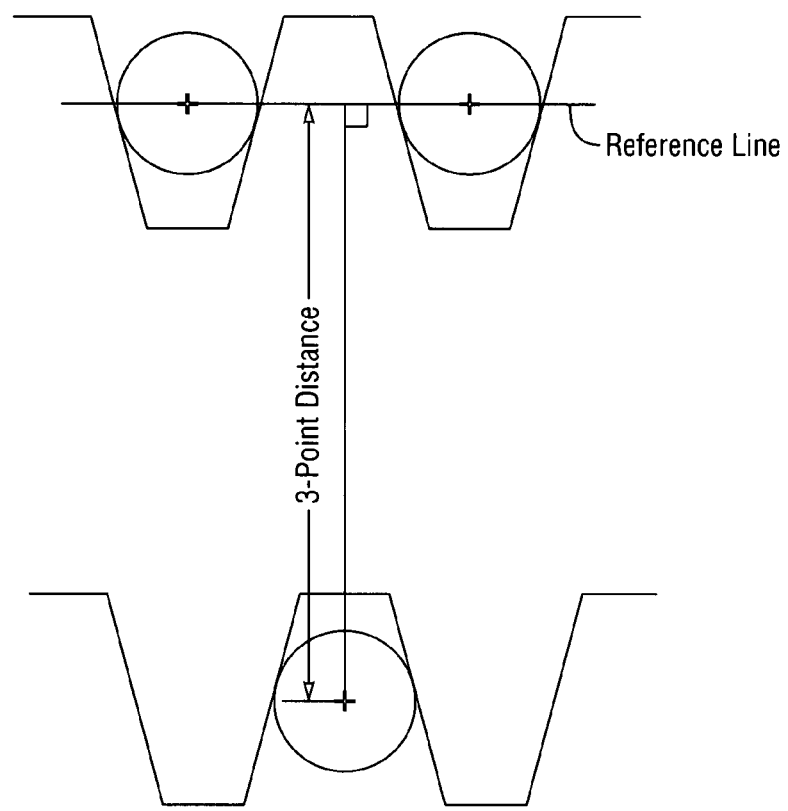
FIG. 20 is a schematic diagram which illustrates a 3-point distance measurement between a reference line defined by a pair of virtual wire centers on one side of a threaded part and a single wire center on the opposite side of the part.

The 3-point pitch diameter computes 3-point distances using the wire positions computed in the sensor data. The 3-point wire pitch diameter is the median of the 3-point wire pitch diameter. FIG. 20 is a schematic view which illustrates a 3-point distance method, applied to thread wire positions. Shown are two wire positions in the top thread form with a reference line drawn between them. Also shown is a single wire position on the bottom thread form with the 3-point distance indicated.

Figure 21:
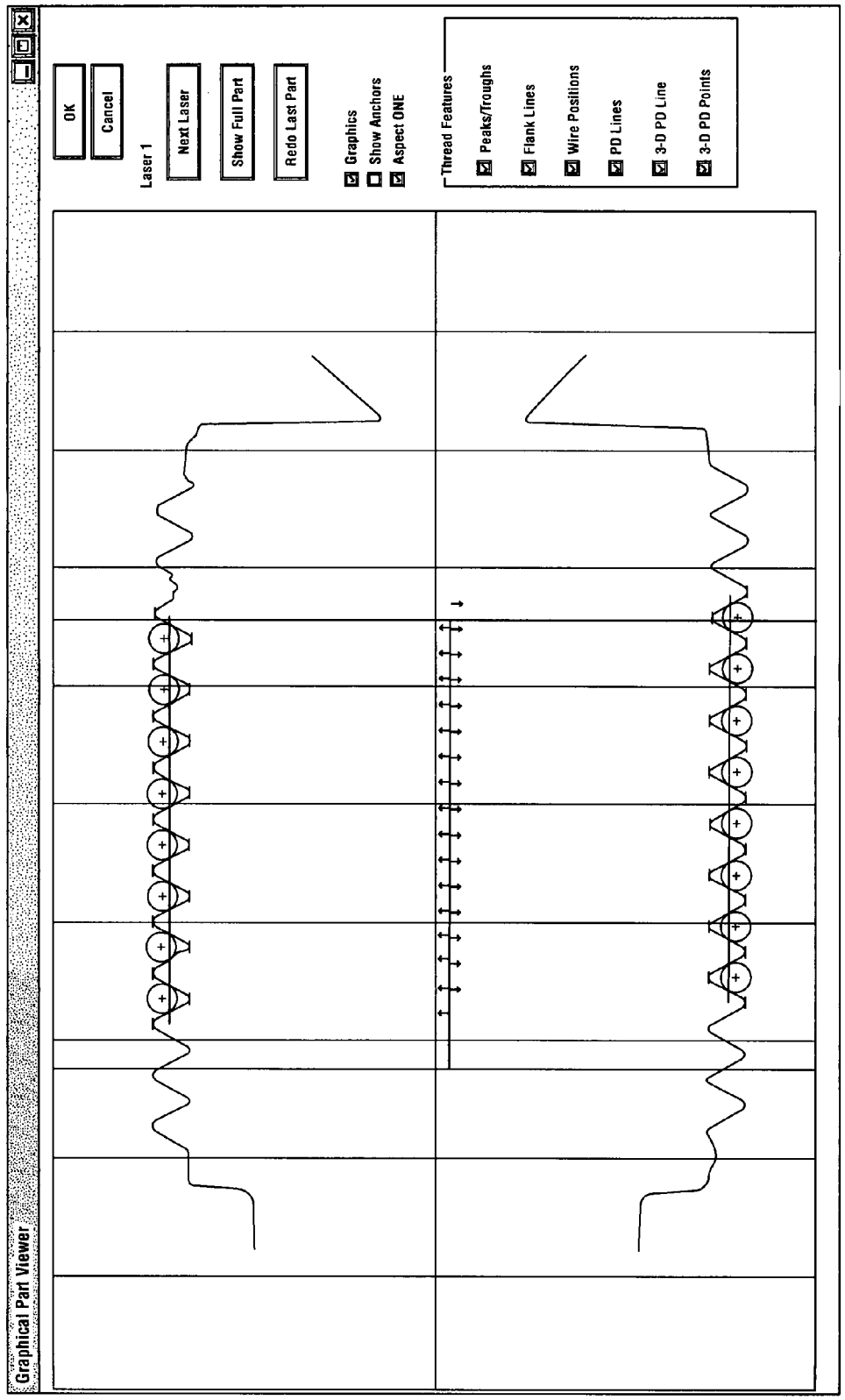
FIG. 21 is a screen shot of a graph of sensor height data with virtual wires in roots and with intermediate data illustrated.
Figure 22:
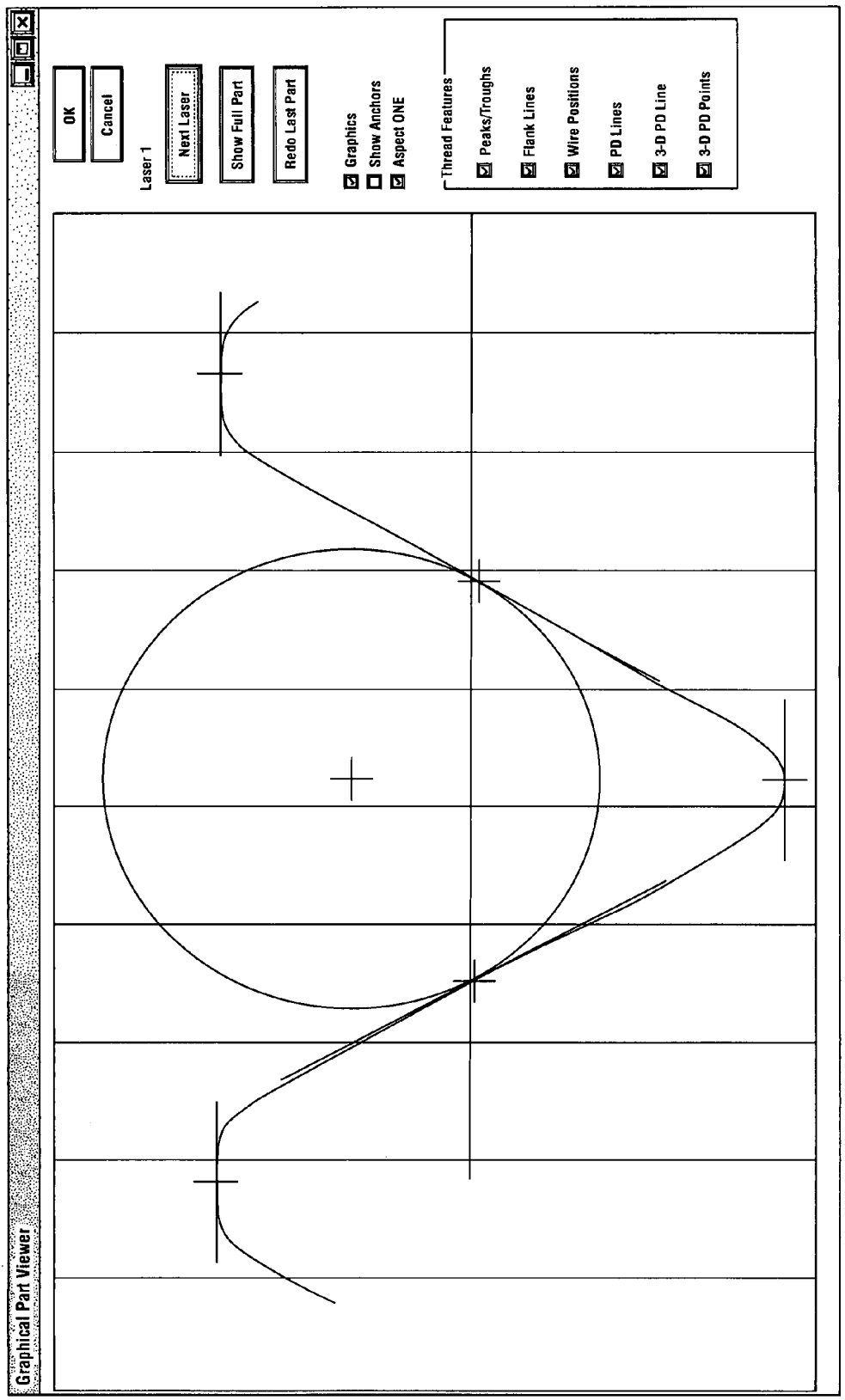
FIG. 22 is a screen shot which illustrates an enlarged thread pitch with intermediate data.

FIGS. 21 and 22 are screen shots from a user interface of a PC which illustrate intermediate data extracted from a M16× 1.5 thread plug gage. FIG. 22 is an enlarged view with its focus on a single thread pitch.

Measure 3-D Crest Cylinder

The measured thread crest position data is analyzed to obtain a 3-D cylinder with least squares methods. A mathematical description of the method is given in Appendix C.

The 3-D crest cylinder fit has several output parameters of interest:
the RMS distance between the crest position data and the fitted shape.
the 3-D location of the cylinder's central axis.
the radius of the cylinder.

Project Wire Positions onto 3-D Crest Cylinder Axis

Measured wire positions can be combined with the 3-D location of the 3-D crest cylinder's central axis. An imaginary disk, perpendicular to the cylinder axis that goes through the measured wire position marks a position on the 3-D crest cylinder axis.

A data set consisting of the projections of all sensor wire positions is constructed.

For a perfect helical thread and for perfectly measured wire positions the spacing between the positions in the projected wire positions should be exactly P/8, where P is the pitch of the thread. The (8) sensors each give a view that is rotated ⅛ revolution between adjacent sensors.

For a right handed thread, the wire positions project onto the axis at increasing positions in the order L1L, L2L, L3L, L4L, L1R, L2R, L3R, L4R, and then L1L, . . . , etc.

The output intermediate data is a vector, sorted from minimum to maximum sensor stage position of the projected wire positions. In addition each wire position data item is annotated with labels that specify the laser and sensor that produced the data item and other labels containing additional information.

Thread Parameter Estimation

Thread parameter estimation utilizes the intermediate data products and may also correct them based on a model of the measurement, prior to producing a final thread parameter estimate.

Wire Pitch

Thread pitch is estimated from the wire center intermediate data. For each sensor data set the adjacent pairs of wire positions are used to calculate an adjacent wire pitch, one per adjacent wire positions. For all lasers, each wire pitch is added to a wire pitch vector.

The wire pitch estimate is the median of the elements in the wire pitch vector.

Major Diameter

Thread major diameter is typically reported as the diameter of the 3-D crest cylinder.

If the 3-D crest cylinder fit was unsuccessful, the major diameter is estimated in a different way, detailed below. The cylinder fit can fail due to several factors listed here:

part inclined at too great an angle with respect to the stage axis.

thread crest positions do not fit a cylinder, the RMS fit-to-data distance is too large.

When the cylinder fit fails the major diameter is estimated from the 3-point major diameter data. This case is special because a previous condition (cylinder fit) has already failed. We found in practice that the cylinder fit most often failed when the threaded region was too short or the inspection extended beyond the end of the threaded region.

Because of this bias we found that a simple median of the 3-point major diameter data would typically be too low, most of the good 3-point data was concentrated at the highest measurements. In this case the major diameter estimate is the value such that 20% of the 3-point data is higher and 80% of the 3-point data is lower.

Calibration Correction

Major diameter is also corrected by a final end-to-end calibration of the total system. The reported major diameter is often too low, with bias ranging from −20 μm to 0.

After diameter calibration we expose the system to a set of measured thread plug gages. One then plots their major diameter bias as a function of diameter and fit a simple segmented line to the bias results. These bias fits then are entered into the system calibration file and are used to correct the measured major diameter with the measured bias.

Minor Diameter

Thread minor diameter is estimated with the 3-point minor diameter distance vector. The minor diameter value is the average of the elements in the distance vector.

Pitch Diameter

Pitch diameter estimation uses two sets of intermediate data products, the wire positions and the 3-D crest cylinder fit.

The pitch diameter estimate calculation is presented in a step-by-step list below:

a) Compute the pitch diameter contact points with the thread flanks by calculating the intersection of the wire shape with the left or right flank lines.

b) Average the left and right points of intersection, and compute the distance (radius) from the average point to the 3-D crest cylinder fit axis. This is the pitch diameter radius for each wire position.

c) Calculate the average value of the pitch diameter radius for each sensor.

d) Correct each sensor's average wire position radius for the part projection angle, using the angle of the 3-D crest cylinder axis to the stage axis, projected into each sensor's coordinate system.

e) Add left and right sensor corrected pitch diameter radius estimates to produce an estimate of the pitch diameter for each laser.

f) Average the laser estimates to produce the system pitch diameter estimate.

Correction for Part Projection Angle

The computation of pitch diameter is complicated by projection effects. The laser light performs an almost perfect orthographic (shadow) projection of the thread's shape. However the projection is not the same thing as the thread cross section, which is specified in thread design documents. The cross section is the thread shape if it were cut by a plane going through the thread's central axis.

The difference is caused by the thread lead angle, which is in the range of 1-3 degrees for many typical threads. The lead angle means that the thread cross section is most accurately viewed in shadow when the viewing direction coincides with the direction of the lead.

It is impossible to position the thread so that a shadow view of the thread is simultaneously aligned with the top and bottom threads. For the example of a thread with a 3 degree lead angle, tilting the thread to align the top of the thread with the viewing angle will make the angle between the lead and the viewing angle for the bottom thread about 6 degrees.

A correction factor was developed for this effect. If one knows the tilt of the thread with respect to the viewing angle then you can correct the observed pitch diameter radius for the expected bias caused by the projection angle. This correction is precomputed and stored in a table.

For each sensor the tilt of the thread with respect to the viewing angle can be obtained from the 3-D cylinder fit axis. Separate corrections are applied to the left and right sensors.

Calibration Correction

Pitch diameter is also corrected by a final end-to-end calibration of the total system. The reported pitch diameter is often too high, with bias ranging from +5 μm to +35 μm.

After diameter calibration, one exposes the system to a set of measured thread plug gages. One then plots their pitch diameter bias as a function of diameter and fit a simple segmented line to the bias results. These bias fits then are entered into the system calibration file and are used to correct the measured pitch diameter with the measured bias.

Lead Deviation

The lead deviation estimate uses the wire pitch and the locations of the wire positions as projected onto the 3-D cylinder fit axis.

For an ideal helical thread, the wire position projections should result in a regular pattern along the 3-D cylinder fit axis. The projection of the first laser-1, left, wire position should lie about (⅛) pitch from the projection of the first laser-2, left, wire position. Lead deviation is the deviation of that pattern from the ideal, measured as a maximum distance of any projected wire position from the ideal pattern.

The computation of the lead deviation estimate follows a step-by-step procedure:

a) Create a wire position projection vector, containing all the data.

b) Sort the wire position projection vector in order of position along the 3-D cylinder fit axis.

c) Convert the wire positions of the elements of the vector into degrees, by multiplying by the factor (360/pitch) and then reducing the element values modulo 360.

d) Calculate an offset value so that the maximum absolute value of the degree-valued element positions is minimal. For example with a lead deviation of 0.010 mm for a 1 mm pitch thread, the absolute value of at least one degree-value element position would be 3.60 degrees. (0.010 mm/1 mm equals (1/100) and 360/100 is 3.60.)

e) Convert the value from degrees to mm. and report as the lead deviation estimate.

Note that all lead deviation estimates are positive.

Calibration Correction

Errors in measurement mean that the physical measurement of a perfect thread will have a positive lead deviation.

To attempt to correct for this effect, one measures the lead deviation for a set of thread plug gages and plotted them as a function of gage diameter. The most common form observed is a constant lead deviation of 0.010 mm. to 0.020 mm.

This value observed in calibration with thread gages is taken to be a bias. This amount of bias is entered into the system calibration file and used to correct the measured lead deviation for this measurement bias.

Functional Diameter

Functional diameter is currently defined in practice by the fit of a special fit gage over the thread. The special fit gage is essentially a nut that is split in two by a plane cut through the central axis of the nut. The two halves of the fit gage are held in a fixture that measures the distance between the two halves. There is one special fit gage for every thread type.

Functional diameter is defined as the pitch diameter when the special fit gage is clamped tightly over a thread plug setting gage. When one puts a different UUT into the fit gage the fit gage may expand slightly, due to a summation of effects involving the differences between the UUT and the thread plug setting gage used to setup the functional diameter measurement. The functional diameter measurement is then the thread plug setting gage's pitch diameter plus the additional separation between the two fit gage pieces.

Functional Diameter—Laser Lab Estimator

In the Laser Lab, our functional diameter measurement method is an approximation of the fit gage method. We do not perform a full 3-D analog of the physical fit gage. Instead we have made an approximation that involves the use of lead deviation and the shape of the thread form.

If we imagine the thread form as perfect and also having a 60 degree flank angle then lead deviations should cause the thread form fit gage pieces to move apart. A single lead deviation either up or down the thread form axis will cause a single split piece of the fitting gage to move outward. The amount of outward movement for a 60 degree flank angle will be equal to $(\sqrt{3})$ (lead deviation). The movement provides a clearance for both positive and negative movements of the lead, relative to a perfect helical shape.

The Laser Lab estimator for functional diameter, (FD) is given below:

$$FD=PD+\sqrt{3}(\text{LeadDeviation}).$$

Learning the Thread Model

The thread model is a learned sequence of points that represent a best estimate of the outline of one cycle of the thread form. The thread model is calculated when the inspection region is specified, at template edit time.

The measure template routine uses a pattern match algorithm with a sine wave pattern to identify periodicity in the inspection region data. This process determines an approximate thread pitch. The process also calculates a starting point in the data vector for the first beginning of the matched pattern, which is an approximation to the first midpoint of a right flank line.

With the pitch and the starting point in hand, the measure template routine can then calculate an average thread model. Starting with the first sample point in the matched pattern, points that are 1,2,3, . . . , N pitches later in the inspection region are averaged to form the first point of the thread model. The process is repeated for all the rest of the points in the first matched pattern. The thread model is then stored in the template for later use.

The following is a description of the structure of the trilobe or trilobular estimation process.

Trilobe Signal Processing

Trilobe signal processing analyzes calibrated part data within the inspection region and produces intermediate data products that are analyzed by the trilobe parameter estimation process described hereinbelow. Eight values are produced in trilobe signal processing, four laser-n diameters and four laser-n centers.

| Intermediate Data Product | Description |
|---|---|
| Laser-n diameter | Distance from left shadow ray to right shadow ray |
| Laser-n center | Midpoint of interval spanned by left and right shadow rays. |

Trilobe Blank Signal Processing

For the trilobe blank, the laser diameter and center are estimated as simple averages of calibrated sensor data within the inspection region.

The laser-n diameter is the average of the mean left sensor height and the mean right sensor height.

The laser-n center is the difference of the mean right sensor height and the mean left sensor height.

Trilobe Threaded Region Signal Processing

For the trilobe threaded region, one wants to estimate the parameters of a trilobe cylinder that touches all the thread crests within the threaded region.

This process can be subdivided into three parts:

obtain thread crest locations from thread region global object estimate sensor height from sensor thread crests, robustly compute laser-n diameter and center from sensor heights.

One obtains thread crest locations from the thread region object, keeping only thread crests that are within the inspection region, and that also have height at least 95% of the median crest height. For a valid inspection region there would then be 5-10 thread crest points per sensor for typical usage of the trilobe feature.

To estimate the sensor heights one needs an estimation process that is robust enough to tolerate several invalid thread crests. A preferred process uses a "robust" line fit procedure to obtain a line fit through the thread crests that will not be influenced by 1 or 2 invalid crest data items. Once the "robust" line is found, the sensor height estimate is the "robust" line's height at the midpoint of the inspection region.

Robust Line Fit Procedure

The robust line fit is a simple parameter sampling process. For every pair of points in the data set to be fit, an evaluation line is produced. A figure of merit for every evaluation line is produced and is the RMS distance per point between the data and the evaluation line. The RMS distances are sorted and the evaluation line with the median RMS distance is chosen.

This procedure is computationally costly but can work correctly with up to 49% of the data as "outliers."

Potential Issues with Trilobe Region Signal Processing

Inspection Region Taper May Bias Results

The estimation process is model-based and the model is a trilobe "cylinder." Thus, a taper in the threaded region, such as near a thread point, would provide data that the model fitting process would not be capable of analyzing accurately.

Trilobe Threaded Region Crests Should Be Accurately Located

The thread region processing that locates the thread crest input data for the threaded trilobe estimation process is very general and may misfit crest shapes that do not match the thread region "crest model."

Trilobe Parameter Estimation

Trilobe parameter estimation utilizes the intermediate data products, laser-n diameter and laser-n center, to compute the following trilobe parameters:

| Trilobe Parameter | Description |
| --- | --- |
| C | Radius of circumscribed or circumscribing circle (V-anvil micrometer maximum diameter) |
| D | Orthographic projection diameter (Diameter with standard calipers) |
| E | Radius of inscribed or inscribing circle (V-anvil micrometer minimum diameter) |
| K | Trilobe "out of round" parameter (i.e., degree of lobulation) $K = E - D = D - C$ $2K = E - C$ |
| Angle | Rotation angle (between 0 amd 60 degrees) Angle = 0 when Trilobe flat is parallel to x-axis, and lowest point in y Angle = 60 degrees when trilobe flat is parallel to x-axis, and highest point in y |
| xCenter, yCenter | The centerline coordinates of the trilobe shape. |

"D" Parameter

The trilobe D parameter can be estimated as the average of the laser-n diameter measurements in the four lasers.

All the values should agree, within the margin of sensor errors.

If one measures a perfect trilobe shape gage, the differences between the laser-n diameters and "D" are diagnostic of measurement accuracy and bias. The RMS distance between the laser-n diameters and "D" is a measure of diameter measurement uncertainty. The maximum difference between "D" and laser-n diameter is a measure of the maximum per sensor diameter measurement bias.

Iterative Computation of K, Angle, xCenter, yCenter Parameters

The computation of the K, Angle, xCenter, and yCenter parameters uses only the laser-n center intermediate data product. The four laser-n center data items are exactly enough items to compute the four unknown trilobe parameters, there is no redundancy.

A direct four parameter search process is difficult. The search was simplified to an iterative two parameter search with the following analysis.

If one assumes that the (xCenter, yCenter) centerline coordinates of the trilobe shape are known, one can estimate K, Angle with an exhaustive search process, described hereinbelow. Once one has estimates of D, K, and Angle, one has a complete description of the trilobe shape.

With the trilobe shape description one can calculate the different projections of the trilobe shape onto the left and right sensors. With the left and right sensor projections of the trilobe shape one can use the laser-n center data to estimate the trilobe centerline coordinates, xCenter and yCenter.

Finally, with the trilobe centerline coordinates one can change the origin of the coordinate system specifying the laser-n center data so that the origin of the next set of laser-n center data is at the trilobe centerline coordinate estimate. Then the process is repeated with the transformed laser-n center data as input. In this process, the K, Angle search progress is presented with data that eventually has a centerline that is very close to (0,0). At that point, one knows all the trilobe parameters, K, Angle, D, xCenter, and yCenter.

Here is a short description of the process.

```
Repeat
{
    Perform K, Angle search.
    Determine xCenter, yCenter.
    Recenter Laser-n Center coordinate system.
}
until (centerline correction is very small).
```

K, Angle Search

The K, Angle search is carried out by exhaustive enumeration. A 2-dimensional grid is constructed with 1-dimension being the possible discrete values of K in the interval (0. . . kmax) and the other dimension being the possible discrete value of angle in the interval (0 . . . 60) degrees. At each grid point K, Angle, xCenter, yCenter are used to calculate the laser-n center values that would have produced those values and then an RMS distance between the calculated and actual laser-n center values.

In a preferred implementation, the discrete grid is sized 25×25 resulting in 625 K, Angle parameter values and 625 RMS values. The minimum RMS grid value selects the K, Angle output value.

K, Angle Fine Search

The K, Angle search is increased in precision by a subdivided search. A rectangular region of K, Angle space equal to a 2×2 grid in the original K, Angle discrete grid is subdivided into a 25×25 grid and searched.

Then the process is repeated a second time, subdividing the fine grid in the same manner.

The result is a more accurate K, Angle calculation at much less cost than a brute force search through a 3906×3906 grid. (The cost is about 3× times a 25×25 grid search.)

Determine xCenter, yCenter

Once K and Angle are known a new estimate for the trilobe centerline coordinates can be obtained.

(1) Estimate sensor height difference caused by trilobe shape, for all four lasers. This difference is a function of the difference between the laser and trilobe shape angles.

$$\Delta H(\text{laser,trilobe}) = f(K, \text{Angle} - \text{laserAngle}).$$

(2) Correct the sensor height difference for the trilobe contribution.

$$\Delta H(\text{laser}) = \Delta H(\text{laser,data}) - \Delta H(\text{laser,trilobe}).$$

(3) Compute the trilobe centerline coordinates by a least squares fit of the corrected sensor height differences.

$$(x\text{Center}, y\text{Center}) = g(\Delta H(1), \Delta H(2), \Delta H(3), \Delta H(4)).$$

Convergence Criteria

One says the iteration converged when the difference between the estimates of K from the current and the previous iteration is less than a predetermined parameter (nominal value 0.0001).

Computation of Derived Parameters

The derived parameters can be computed from the estimated parameters D and K:

$$C = D - K.$$

$$E = D + K.$$

Code Implementation Notes

These notes are to guide future improvements in the code.

Trilobe Thread Parameter Estimation—Differences from Standard Thread Processing

Trilobe region thread estimation has some differences from standard thread processing.

Most of the differences arise from the fact that standard thread processing utilizes a cylinder of circular cross section whereas trilobe thread processing utilizes a cylinder with a trilobe cross section.

List of Features

Calibrated Sensor Stage Axis Position Zero by Analysis of Begin Cone Edge Signal The scanning optical head system described above produces a sampled image of the amount of light and shadow in a particular sensor's beam. A sample is produced each 4 μm of stage travel. The absolute stage position is not precise or repeatable, as also discussed.

In order to make the stage position coordinates refer to a common physical position, the sensor signal is analyzed to find the position of the step edge that marks where the sensor passes the beginning of the calibration cone 40 at the cylinder 96.

Once the sensor stage positions are all referenced to the common begin cone position, the positions of all other features are repeatable to high accuracy from scan to scan.

Calibrated Sensor Height Position Zero by Analysis of Begin Cone Center Position The calibration process that relates sensor digitized raw signals to sensor heights calibrates the relative sensor blockage between the 0.125" cone minimum diameter and the 1.500" cone maximum diameter.

After the table relating the raw signals to sensor heights is constructed, the table is used to compute the center of the cone 0.125" beginning cylinder 96. That position is used as an offset to make the calibrated sensor heights read out zero at the center of the 0.125" cone cylinder 96. This process establishes a common (x,y) center reference coordinate for each of the (4) light planes.

Calibration Cone Design

Measure 3d Alignment to Stage Axis with Analysis of Two Constant Diameter Regions The calibration cone 40 has two regions of 0.750" diameter that define a cylinder in space that is concentric with the calibration cone's central axis. By measuring the position of the 0.750" cylinder as seen by the sensors, the calibration software determines the alignment of the stage axis 28 and the calibration cone axis.

It is important that the regions measured to define the calibration cone aspect vector have the same diameter. That means that errors in the sensor height calibration have a minimal influence on the accuracy of the aspect vector computation.

Calibration Cone Design

Measure Light Plane Angle with "Multi-step" Region

The calibration cone's "multi-step" region contains (5) precisely positioned mechanical steps. These steps are utilized to compute the roll angle of the light plane with respect to the calibration cone's central axis.

Signal processing software measures the precise location of each of the (5) steps. When the light plane has a roll angle with respect to the calibration cone 40, the difference in position between the step positions computed from a laser's left and right sensors is proportional to the sine of the roll angle.

The analysis software utilizes the data from all (5) steps in a least square minimization procedure that computes the roll angle.

Calibration Cone Design

Use Continuous Constant Slope Sensor Height Calibration Region, Allowing Arbitrary Interpolation Previous experimental designs of calibration cones used stepped edges for the purpose of relating raw digitized sensor signals to calibrated sensor heights. If the sensor response varied between the height of two adjacent steps then the calibration process would not directly measure the variation and the resulting calibration might make mistakes at intermediate diameters.

The present design provides data at all sensor heights, in the diameter range 0.125" to 1.500".

Light Plane "Layer Cake"

Reduce Cross Talk

As previously mentioned, the (4) laser light planes are arranged parallel to the bottom plate 61 of the optical head 12, in a regularly spaced array of heights. Adjacent laser light planes are preferably separated by about 2.5 mm. The arrangement is shown schematically in FIG. 10.

This "layer cake" arrangement was chosen specifically to eliminate or reduce "cross talk" between different laser beam lines. For example, light from beam line-1 might scatter from the surface of the UUT and go into the sensor for beam line-2.

The primary means of interference is due to scattering from cylinders that are aligned with the stage axis 28, a geometry similar to the geometry of FIG. 9. (Also see Appendix A.)

When the laser light planes are at different heights, light from laser-2 (for example) which is scattered by the UUT, arrives at the sensor for laser-1 at a height of 2.5 mm relative to the expected light from the laser-1 light plane. This scattered light can be blocked by a light plane receiver aperture slit as described in Appendix A with reference to FIG. 24 (i.e., telecentric apertured stops).

Light Plane Receiver Aperture Slits

Reduce Cross Talk

The light plane receivers 68 each have linear slit apertures, about 1.5 mm high, that accept light from its corresponding light plane generator. Each aperture slit is mounted in the optical head 12 at a different height, matched to the height of its corresponding light plane. Light from different light plane generators or transmitters 66, scattered by the UUT, is effectively blocked, thereby increasing measurement accuracy.

Light Plane Receiver Aperture Pinholes

Reduce Forward Scattered Light

Each light plane receiver 68 includes photodiodes which are each fitted with circular apertures that make the light plane receiver 68 "telecentric". This aperture pinhole accepts light rays from the nominal angle of incidence and/or from angles of incidence that are only slightly different (<1-2 degrees). This means that light beams that enter the light plane receiver 68 at larger angles of incidence will be blocked by the pinhole mask and not recorded by the measurement circuitry. Appendix A describes this.

The pinholes reduce systematic measurement errors caused by shiny cylindrical parts. For those parts forward scattered light will tend to systematically reduce the diameter measured because scattered light that would be blocked by a rough dark surface finds its way into the light plane receiver 68.

Light Plane Generator Module

Alignment Method to Ensure Low Beam Divergence

The Laser Lab measurement system 10 has a requirement that the light rays from each light plane generator module 66 be parallel and not divergent.

The apparent diameter of a 0.500" [12.7 mm] cylinder should not change by more than 0.0001" [0.0025 mm] as the cylinder center is moved (+/−)0.0394" [1 mm] from the center of the measurement area. This requirement couples a required measurement accuracy bias (0.0001" [0.0025 mm]) with an estimated accuracy of part placement by customers (+/−0.0394" [1 mm].).

This requirement places limits on the alignment accuracy of the light rays within the light plane, or its divergence. In the worst case, the beam through the center of the cylinder is at an angle of zero, the left shadow ray is at an angle of −ϕ, and the right shadow ray is at an angle of +ϕ. This would mean the maximum misalignment angle for any shadow ray in the light plane is less than 1.3 mrad.

Figure 31:
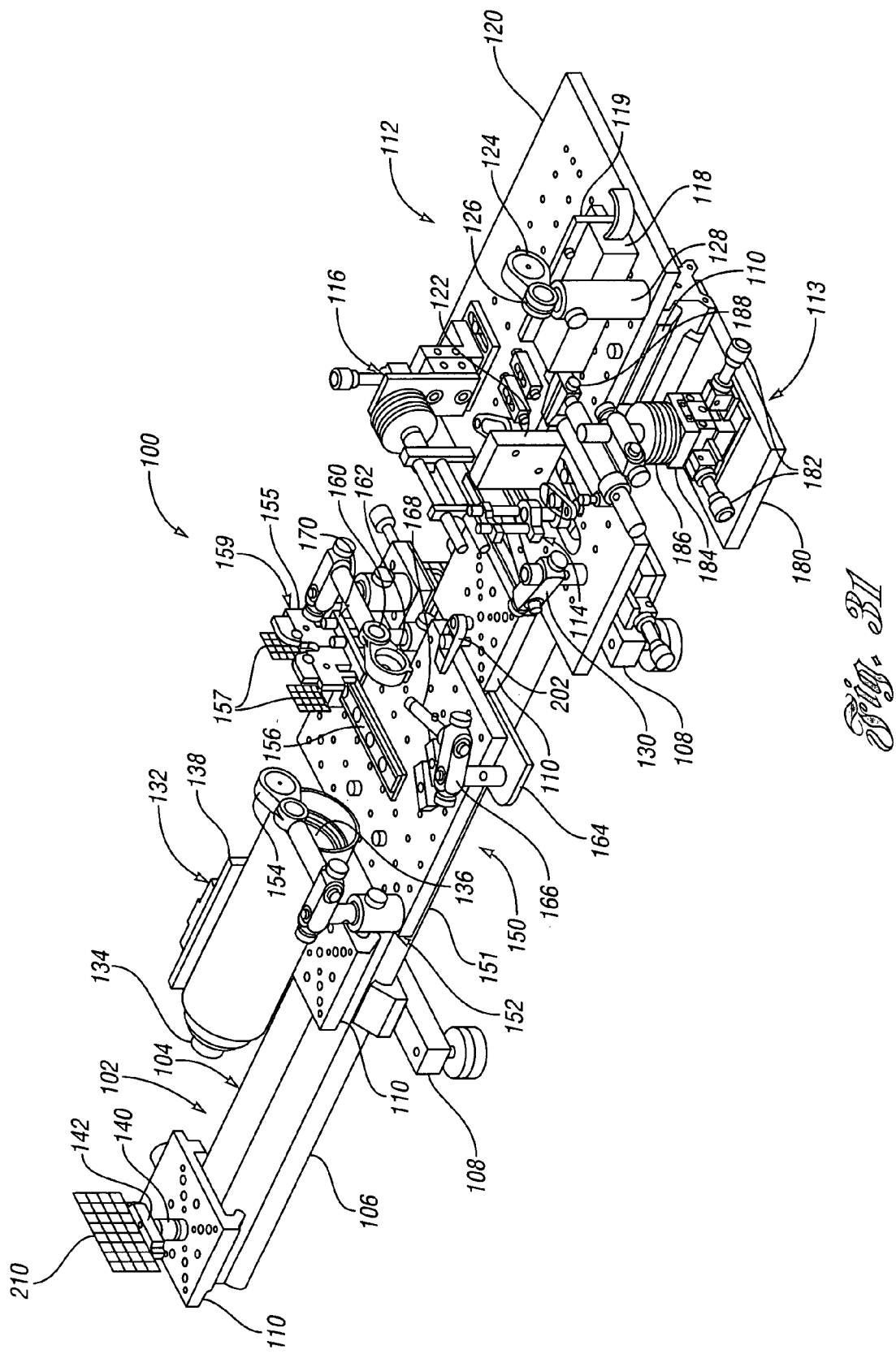
FIG. 31 is a schematic perspective view of an adjustment fixture for assembling optical modules.

These maximum misalignment angles translate to an accuracy of focus when manufacturing or assembling the light plane generator module 66. An align and focus instrument or alignment fixture, generally indicated at 100 in FIG. 31, provides a high precision mechanical adjustment of the position of lens 316 (i.e., FIG. 37) so that the beam divergence is minimized when constructing each light plane generator module 66. Once the adjustments are complete, the adjustments can be permanently fixed in place by tightening adjustment screws and by gluing the mechanical attachment points to prevent movement. A fuller description of the alignment method is provided in Appendix D.

Light Plane Generator

Alignment Method to Ensure High Light Beam Flatness

The Laser Lab measurement system 10 also has a requirement that the light plane be generally flat. It was discovered that if the optical elements of the light plane generator module 66 were misaligned then the light plane's image on a flat target would be curved, rather than straight.

A curved light plane would make the light plane-to-calibration cone angle calibration described above invalid. A curved light plane would also make the sensor height calibration described above inaccurate. The curve in the light plane would make predicting the diameter of the calibration cone 40 as a function of stage position much less accurate and make the sensor height calibration much less accurate.

The align and focus method as noted above and as described in Appendix D is designed to allow the light beam flatness of the light plane generator module 66 to be effectively minimized during module production. It was found that the angular and rotational alignment of the lens 310, 312 and 316 to the module base plane was an important variable. These alignments when performed sequentially allow the light plane generator module 66 to be setup to meet the flatness requirement, at which point the adjustments are permanently fixed in place by tightening adjustment screws and gluing mechanical attachment points to prevent movement.

Figure 37:
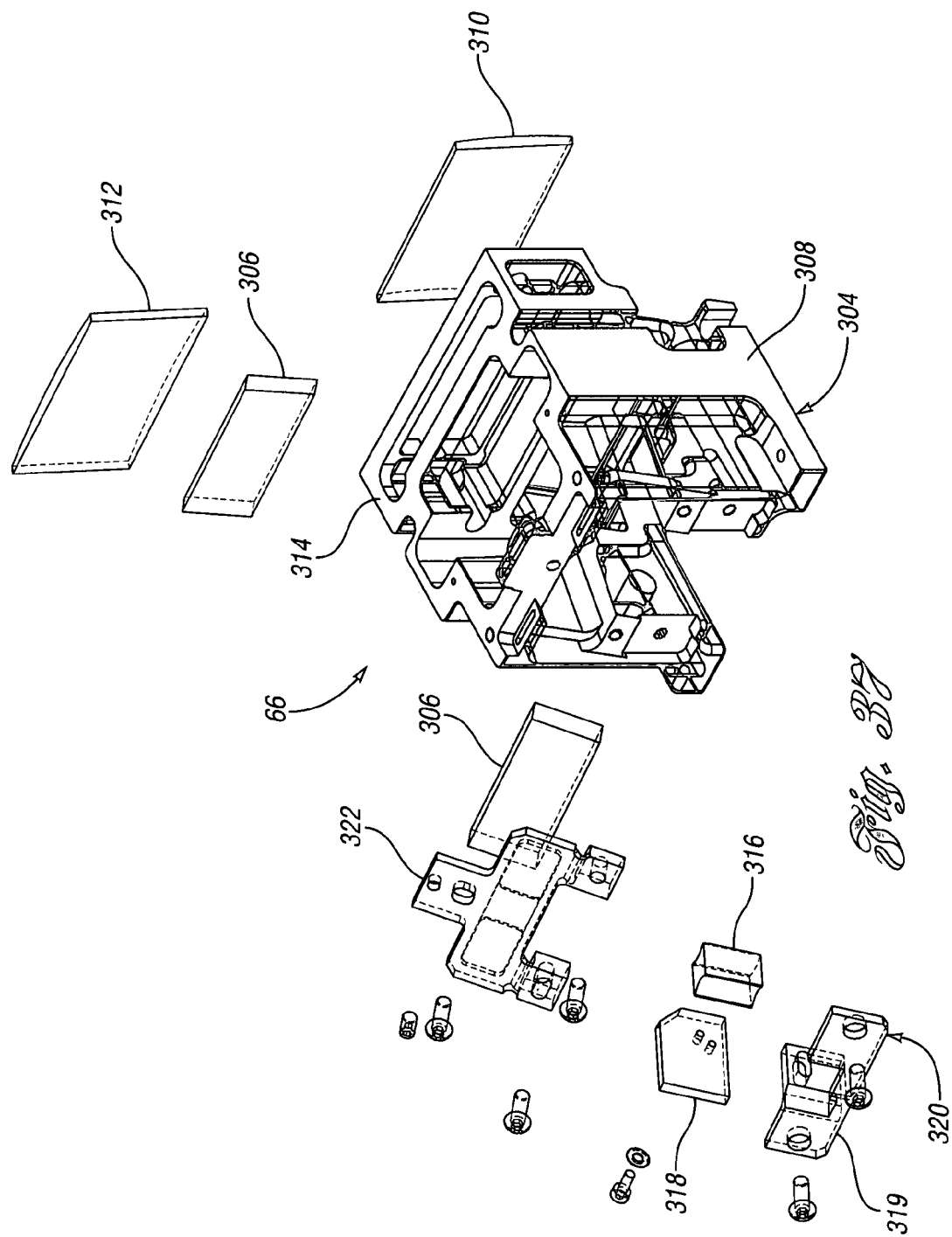
FIG. 37 is an exploded perspective view of a typical transmitter module including its transmitter mount and its supported set of optical components.
Figure 38:
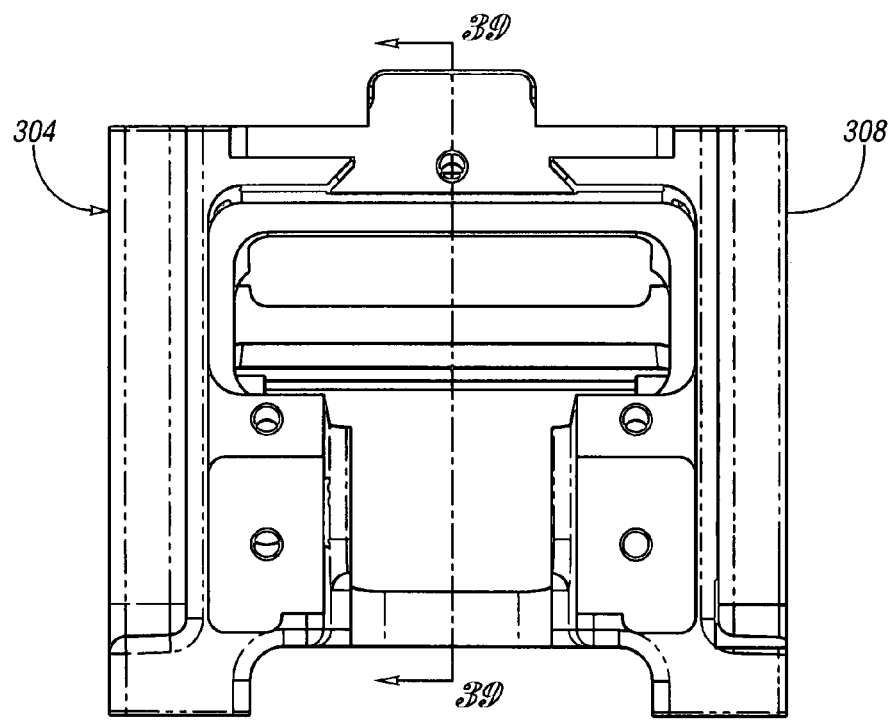
FIG. 38 is a back view of the transmitter mount of FIG. 37.

Flatness is eliminated primarily by the adjustment of the lens 316, FIG. 37, the "first cylinder lens." The align and focus instrument contains a rotating arm, with a clamp 188, FIG. 31.

The rotating arm's clamp holds the plate 318, FIG. 37, attached to the first cylindrical lens 316, during alignment of the transmitter module.

Rotation of the clamp 188 causes the laser line image at the target 210 to transition between line shapes on the target of curved upwards, flat, and curved downwards.

A secondary adjustment is by rotating the lens 316. This adjustment primarily affects the inclination of the laser line image at the target 210, not the curvature. The inclination is adjusted to make the laser line image horizontal.

The adjustment of lenses 316 and 312 is inter-dependent.

Light Plane Receiver

Alignment Method

The light plane receiver modules 68 also have alignment requirements. The optical elements of the modules 68 are precisely positioned so that they precisely focus the light from their respective light plane generator module 66 within the pinhole apertures of the detectors (i.e., FIG. 24).

The receiver module 60 accepts the light from all possible light rays within the light plane at approximately the same efficiency, so the generator/receiver subsystem (i.e., 66 and 68, respectively) will have a smooth light acceptance profile, as a function of distance across the light plane. This is a requirement from the sensor height calibration process.

The light plane receiver modules 68 and the light plane generator modules 66 are capable of working together when mounted on the optical head base plate 61 at standard hole positions.

The receiver light plane split line is centered within the light plane. The align and focus method allows for the proper assembly and subsequent testing of the light plane receiver module 68 and its components as described herein.

Referring now to FIGS. 37-44, there is illustrated a common mirror lens mount, generally indicated at 304, of the transmitter modules 66. Preferably, the mount 304 is manufactured from a single piece of low expansion al-mag alloy to ensure dimensional stability over a wide temperature range. The mount 304 is precisely machined to ensure that the various reference surfaces of the mount 304 are properly positioned with respect to each other.

FIG. 37 is an exploded perspective view of the mount 304 together with its various supported mirrors 306, a first cylindrical lens 316, a second cylindrical lens 312 and a third cylindrical lens 310. The mount 304 includes an integrally formed lens holder 314 for the second cylindrical lens 312. The third cylindrical lens 310 is mounted on a front reference surface 311 of the mount 304. The second cylindrical lens 312 is held within its holder 314 which is at least partially defined by a reference surface 313 as best shown in FIG. 61. The first cylindrical lens 316 is held within an adjustable mounting assembly, generally indicated at 320, which includes a base plate 319 and a lens mount 318.

Figure 39:
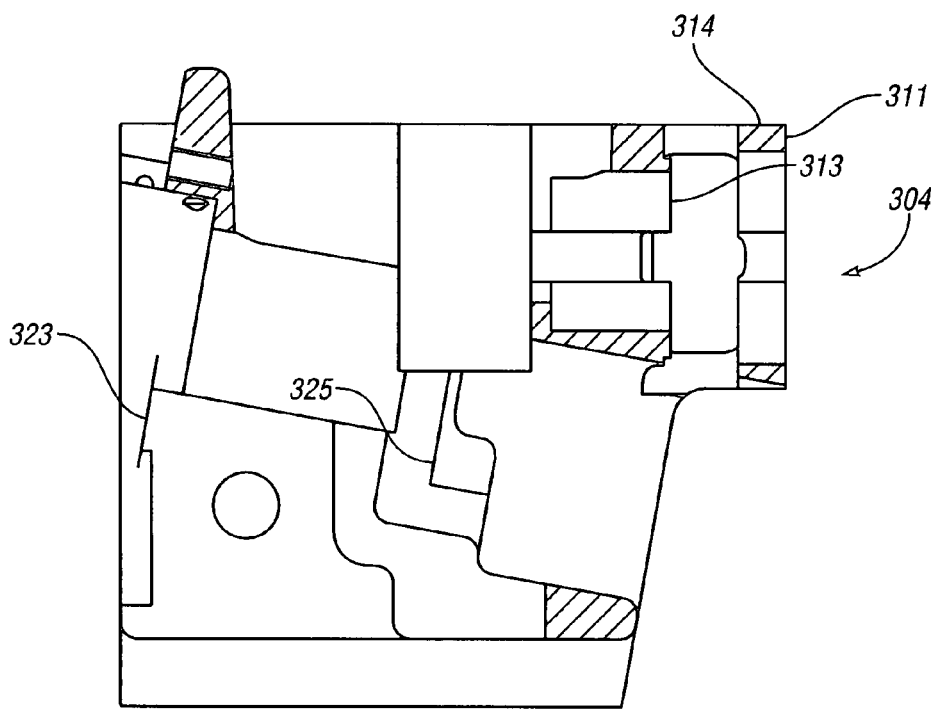
FIG. 39 is a sectional view of the transmitter mount taken along lines 39-39 of FIG. 38.
Figure 40:
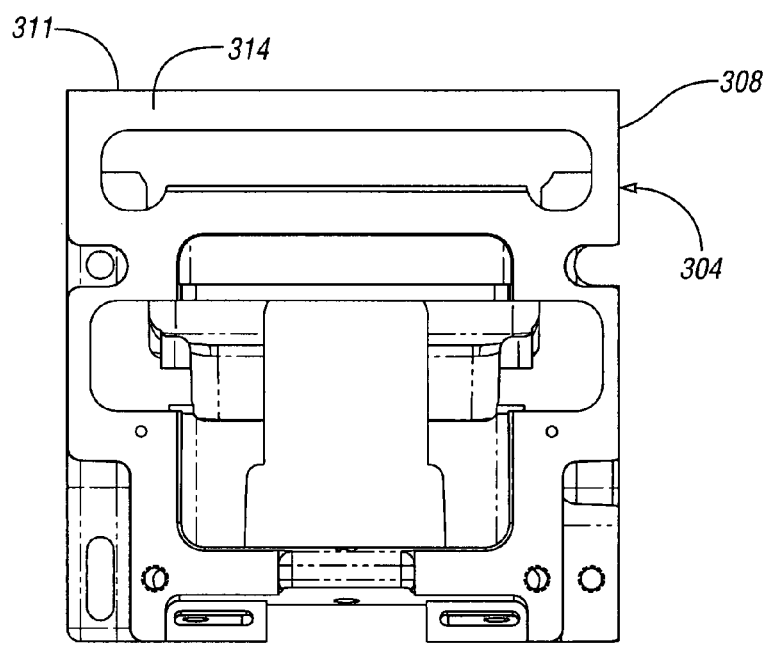
FIG. 40 is a top plan view of the transmitter mount.
Figure 41:
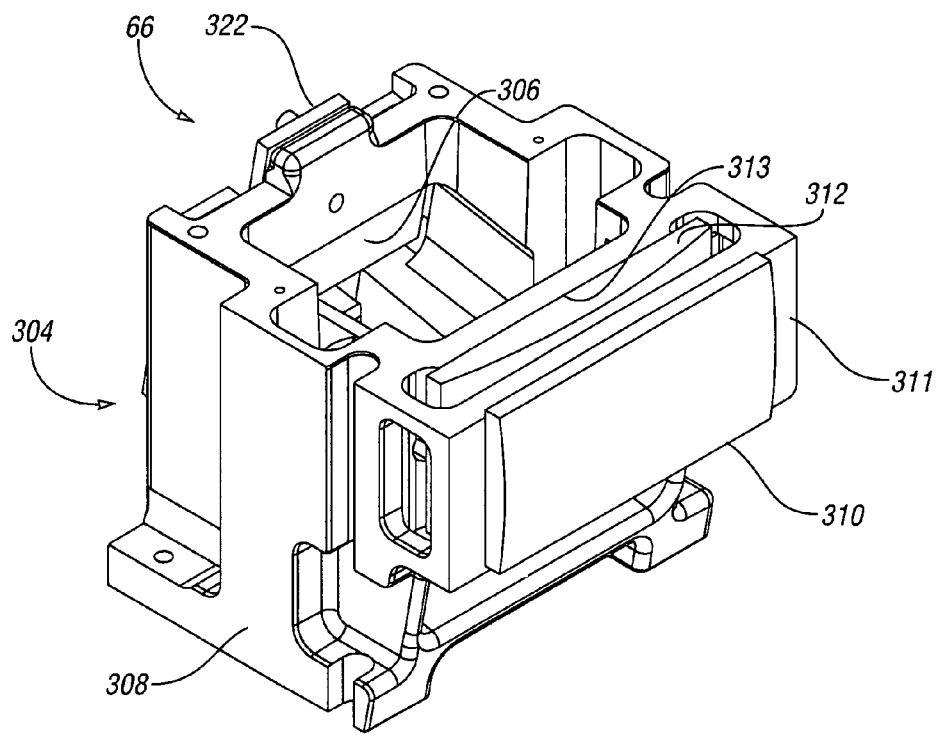
FIG. 41 is a schematic perspective view of the assembled transmitter module.
Figure 42:
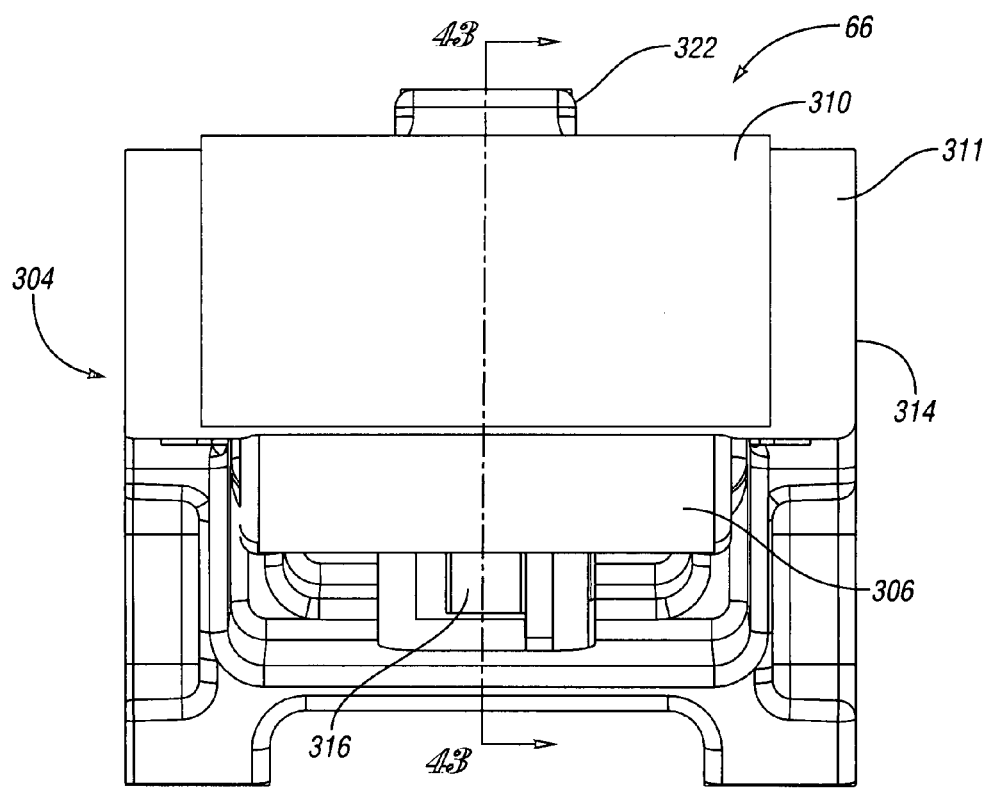
FIG. 42 is a front view of the assembled transmitter module.
Figure 43:
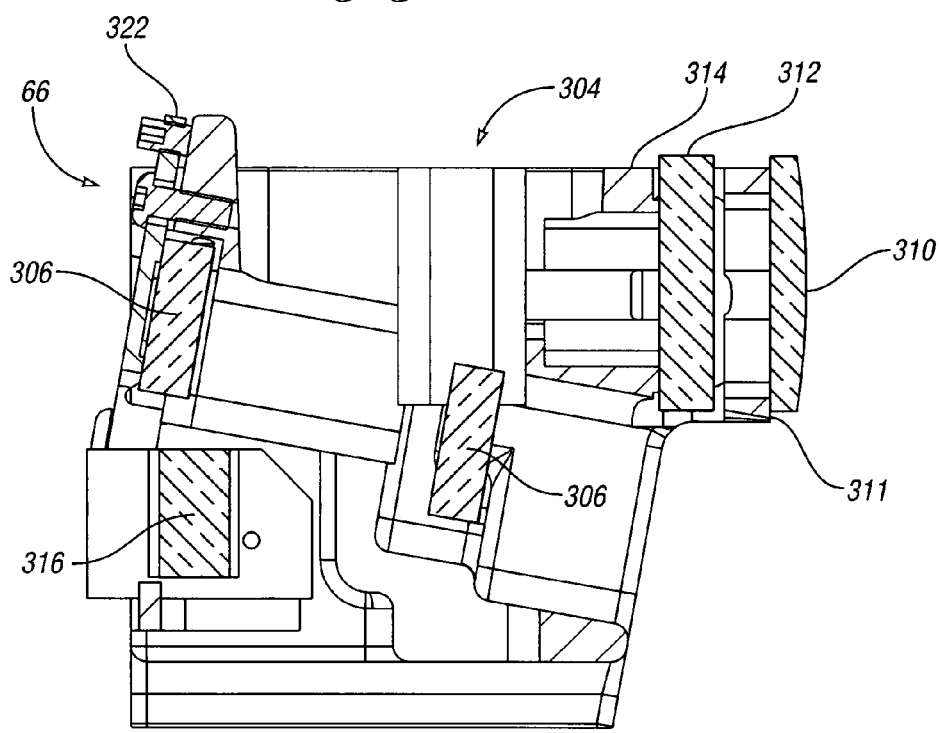
FIG. 43 is a sectional view of the transmitter module taken along lines 43-43 of FIG. 42.
Figure 44:
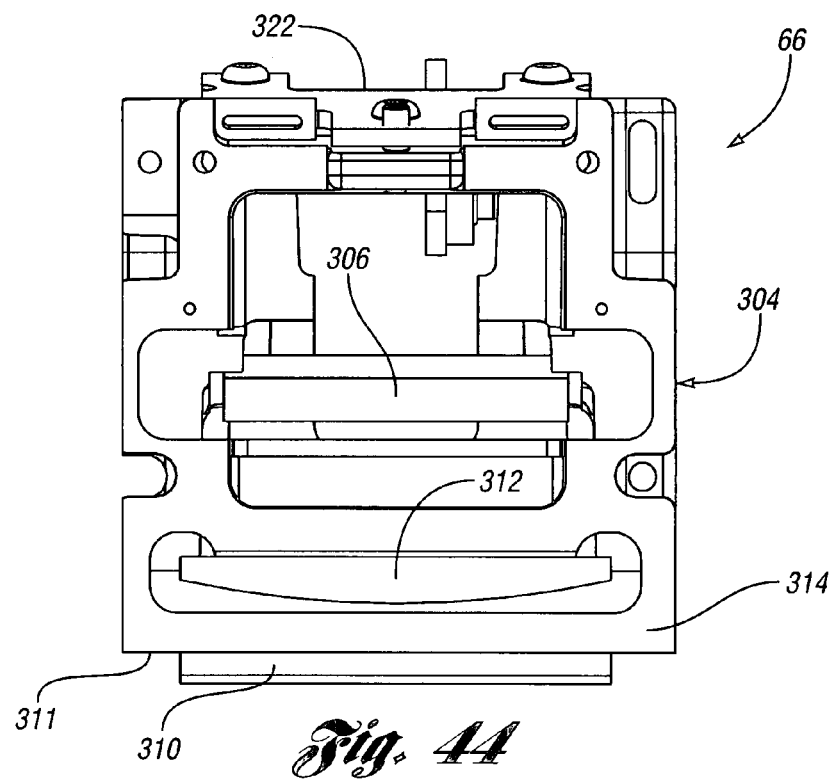
FIG. 44 is a top plan view of the assembled transmitter module.
Figure 45:
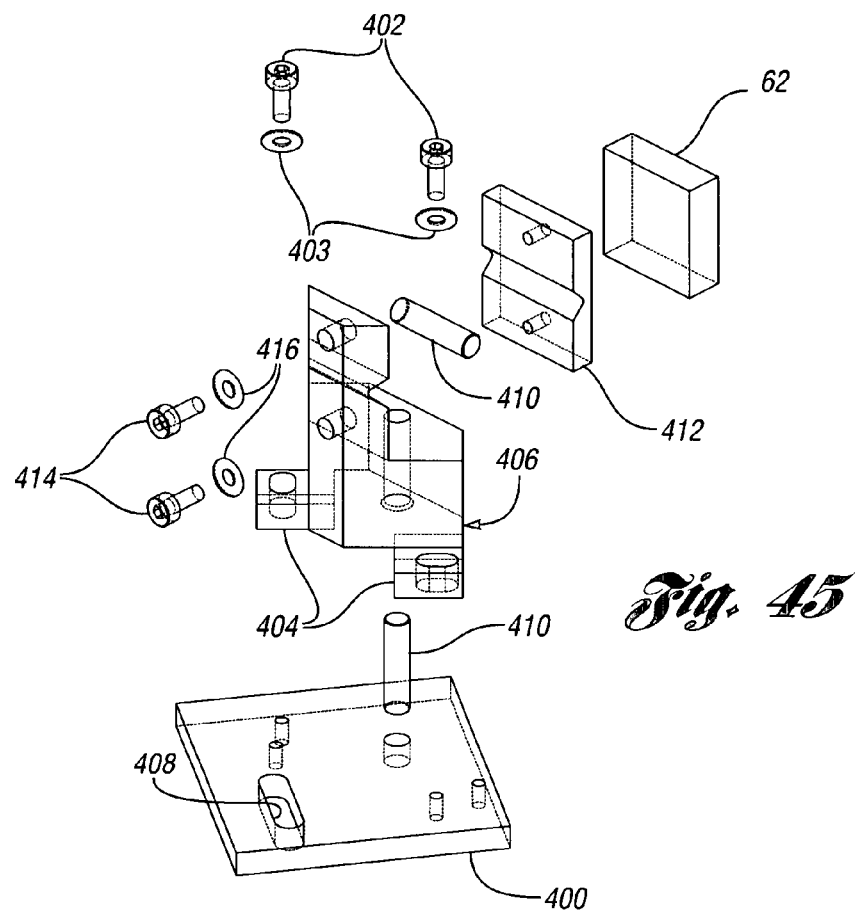
FIG. 45 is an exploded perspective view of a laser beam steering mirror assembly.
Figure 46A:
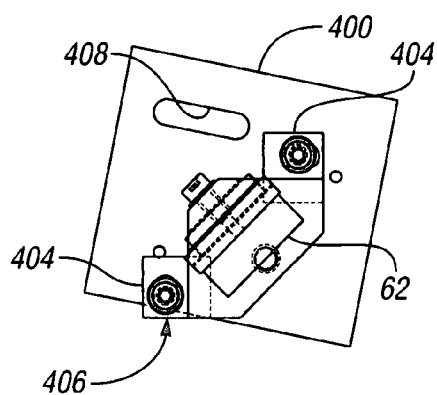
FIG. 46a-46d are top plan views of the assembly of FIG. 45 and having different angular portions for use in the optical head of FIG. 5.
Figure 46B:
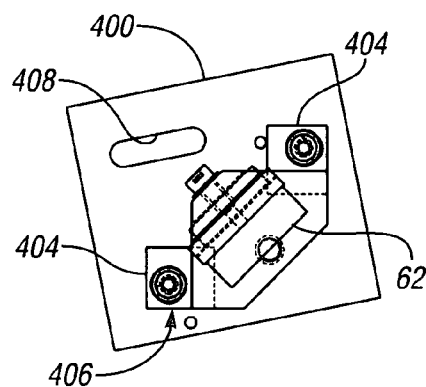
Figure 46C:
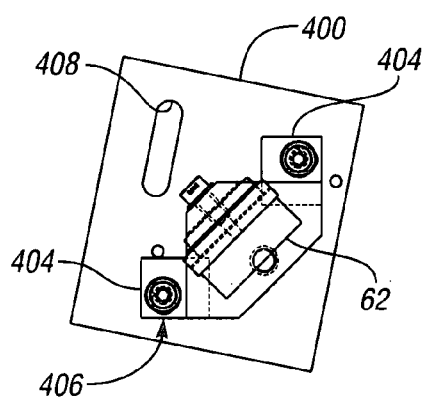
Figure 46D:
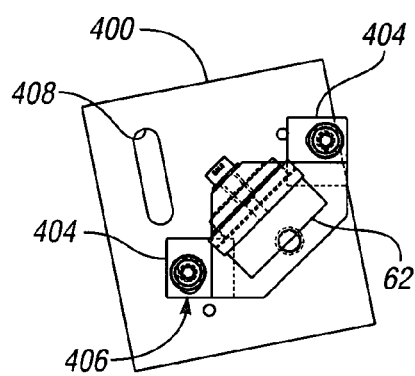

A rear one of the mirrors 306 is held within an adjustable mirror mount 322 which is mounted at a back reference surface 323 of the mount 304 (i.e., FIG. 39). The front one of the mirrors 306 is mounted internally within the mount 304 at an internal reference surface 325 as best shown in FIGS. 43 and 39. Comparing FIGS. 39 and 43 (sectional views of the mount 304 without and with the mirrors 306 and the lenses 306, 310 and 312, respectively), the rear mirror 306 is mounted with respect to the inclined reference surface 323 whereas the internally mounted mirror 306 is mounted within the module 304 with reference to the inclined reference surface 325.

The mirrors 306 are preferably made of BK-7 material whereas the lenses 310, 312 and 316 are made of SF-11 material. The lenses 310, 312 and 316 are optimized for a laser beam wavelength of 650 nm. Also, the nominal affective focal lengths for the lenses 310, 312 and 316 are 107 mm, 154 mm and 2.75 mm, respectively.

The following sequence of assembly steps for the transmitter module 66 are followed, which steps are described in detail in Appendix D:
1. Secure lens 316 to lens mount 318 using a UV adhesive
2. Secure lens 312, lens 310 and front mirror 306 to lens and mirror mount 304 using UV adhesive
3. Secure back mirror 306 to adjustable mirror mount 322 using UV adhesive
4. In sequence:
   position rear mirror 306 mounted to adjustable mirror mount 322 within lens and mirror mount 304 so that a reference laser beam entering the sub-assembly parallel to the mounting base and at a height of 0.984"±0.004" exits the mounting aperture at the front reference surface 311 of the mount 304 at a height of 1.679"±0.020" and remains parallel to the mounting base within 0.05°
   position lens 312 so that the reference laser beam deviates less than 0.03°
   position lens 316 rotationally perpendicular to the beam axis so that the beam is visually flat
   position lens 316 along the beam axis so that the beam divergence in the horizontal axis is within ±0.10 m radians
   position lens 312 rotationally perpendicular to the mounting surface of lens and mirror mount 304 so that the beam is parallel to the assembly mounting base within 0.25°
   position lens 310 so that the reference laser beam is 1.679" from the assembly mounting surface when measured at a distance of 10.55"
5. Completed assembly specifications
   beam tilt perpendicular to laser beam axis—less than 0.50°
   beam tilt parallel to laser beam axis—less than 0.10°
   beam height—1.679"±0.020"
   beam divergence—less than 0.25 m radians
6. Secure all fasteners and adjustable components using epoxy adhesive Referring now to FIGS. 45 and 46a through 46d, there is illustrated in detail the laser steering mirrors 62 and their associated component parts illustrated in FIG. 5. The various relative positions of the laser steering mirrors 62 as they are adjustably mounted at the top surface of the base plate 61 are illustrated in FIGS. 46a, 46b, 46c and 46d wherein each mirror 62 is mounted at a different angle with respect to its respective translation plate 400. In turn, each of the translation plates 400 is adjustably mounted to the plate 61 at its top surface by mounting screws (FIG. 5). Mounting screws 402 and their associated washers 403 secure flanges 404 of their mirror mounts, generally indicated at 406, to their translation plates 400. In turn, the mirror mounts 406 are located on their plates 400 at different angular positions, as illustrated in FIGS. 46a through 46d. Each plate 400 includes an elongated aperture 408 which allows the plates 400 to be adjustably positioned at precise angular positions on the top surface of the plate 61. Pins 410 are provided for precise mounting the mirror mounts 406 to their plates 400 and mirror mounting plates 412 to their respective mirror mounts 406. Screws 414 and their associated washers 416 are provided for securing the mount plates 412 to the mirror mounts 406. The mirrors 62 are secured to their mount plates 412 by an adhesive.

Figure 47:
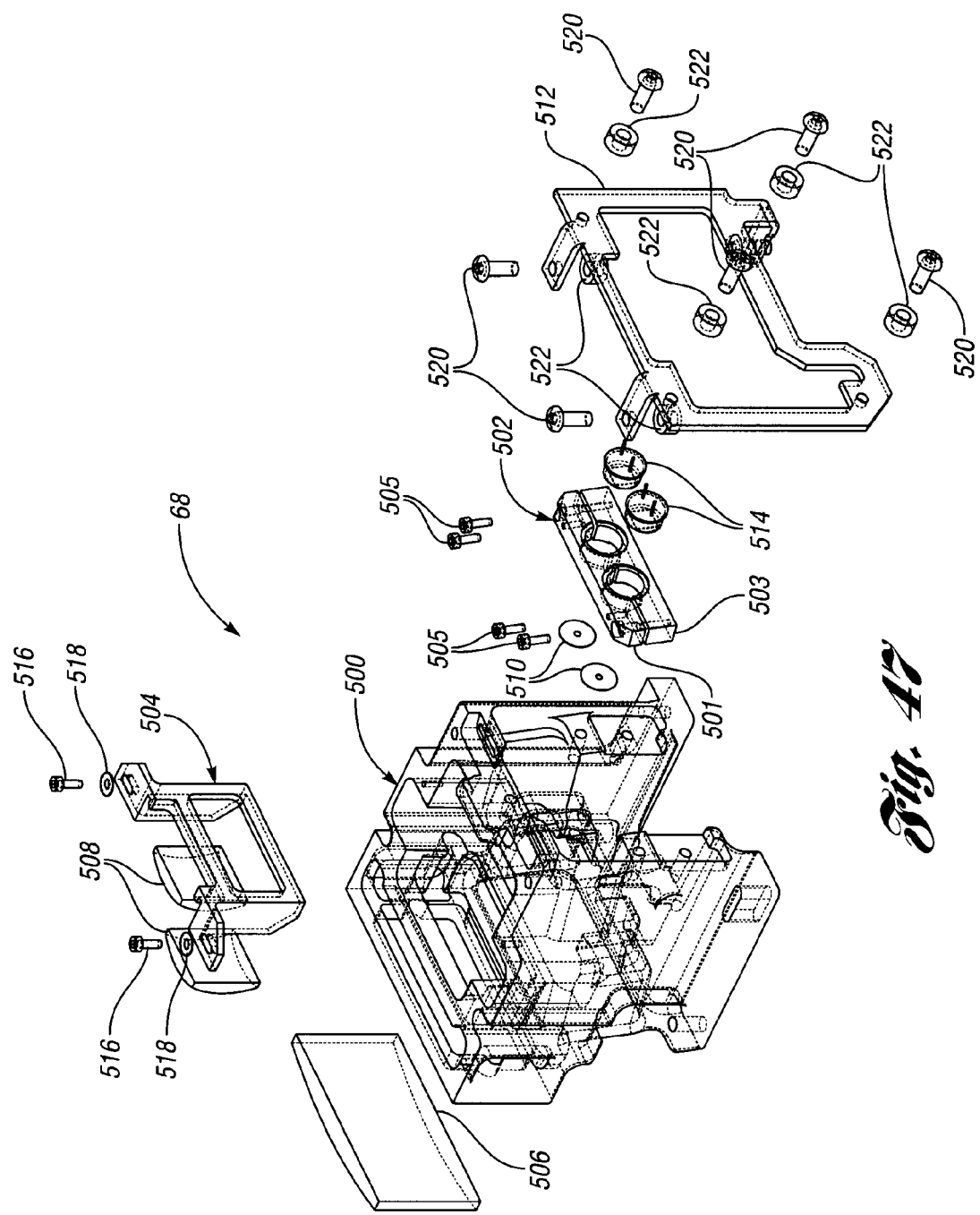
FIG. 47 is an exploded perspective view of a typical receiver module including its receiver mount and its supported set of optical components.

Referring now to FIG. 47, which is an exploded perspective view of one of the light plane receiver modules 68. There is illustrated in FIG. 47 a mirror and lens mount, generally indicated at 500. The mirror and lens mount 500 is substantially identical to the mirror and lens mount 304 of each of the light plane generator modules 66. The receiver module 68 also includes a photodetector mount, generally indicated at 502, a lens mount receiver pair, generally indicated at 504, and a cylindrical lens 506, which is substantially identical to the cylindrical lens 312 of the light plane generator module 66. The receiver module 68 further includes a pair of spherical lenses 508 which are fixably secured at a front surface of the lens mount 504 in spaced relationship by an adhesive. The receiver module 68 still further includes a pair of circular apertured elements 510 and a detector PCB assembly mount 512 on which a pair of photodetectors 514 are mounted in spaced relationship. The lenses 508 typically are designed to operate at a wavelength of 650 nanometers, are made of SF-11 material and have a nominal affective focal length of 25.8 mm.

The photodetector mount 502 includes upper and lower halves 501 and 503, respectively, which are secured together by screws 505.

Typically the lenses 508 are secured to the lens mount 504 with a UV adhesive. Then the lens mount 504 is secured to the mount 500 by screws 516 and their associated washers 518, as illustrated in FIG. 5. Typically, the lens 506 is adhesively secured to a front reference surface of the mount 500, as also illustrated in FIG. 5, by following the sequence of steps noted below.

The apertured elements 510 are secured within spaced holes in the photodetector mount 502 so that the elements 510 are intimate with or immediately adjacent to the supported detectors 514 and centered within the mount 500. The following sequence of assembly steps are followed which are described in detail in Appendix D:

Position lens 506 at the front reference surface of the mount 500 so a reference laser beam entering the subassembly is parallel to a bottom reference surface of the base of the mount 500 at a height of preferably 1.679"±0.004" and deviates less than 0.03°.

Position lens 506 rotationally perpendicular to its mounting surface of the mount 500 so that the reference beam frame is parallel to the mounting base within 0.25°.

Position the receiver lens pair 508 within the mount 500 along the beam axis so that the energy as measured using a reference pair of detectors is balanced within 2%; and Position by resulting detector assembly so that the energy measured using the mounted detectors 514 is balanced within 1%.

After the above-noted steps are performed, all the fasteners and adjusted components are secured using an epoxy adhesive.

The detector PCB assembly mount 512 is secured at the back surface of the mount 500 by screws 520 and their respective spacers 522.

Glossary

3-Point distance: Distance from a single point in one laser's sensor to a reference line produced by two points in the laser's other sensor.

3-Crest diameter: Diameter measurement produced from a statistical average or median of 3-point distances.

Align and focus instrument: An optical/mechanical fixture for manufacturing or assembling the light plane generator and light plane receiver modules to the required optical tolerances.

Base/slide unit: The physical base for the Laser Lab measurement hardware. The unit includes a relatively large, heavy triangular base and a vertical unit containing a motor, a slide, and a linear encoder.

Beam line: A set of optical, mechanical, and electrical components contained inside an optical head that create a light plane from a single laser beam and convert the shadowed light plane to electrical signals for transmission to the PC tower.

Calibrated part data: A data structure consisting of calibrated sensor data from (4) lasers, each having left and right sensors.

Calibrated sensor data: A data structure containing a vector of (stage position, height) measurements for one sensor.

Calibration cone: A precisely manufactured single piece of tool steel with a "cone-shaped" outline. The outline includes cylindrical and frustum-shaped outlines. The calibration cone or device is used within the system to convert sensor digitized raw signals to physical measurements.

Calibration data: The set of tables and parameters that are computed during the calibration analysis process from sensor raw data. This data set is also an input to the sensor data calibration process that converts sensor raw data to sensor calibrated height data.

Correlation detector: A signal processing algorithm that matches a pattern with a vector data set.

Diameter calibration: The process of creating calibration data sets for each sensor. Each data set allows analysis software to convert the sensor digitized raw signal to a calibrated sensor height. The process is typically a two stage process including sensor height calibration and final diameter correction.

Final diameter correction: A final correction to diameter measurements based on a system-level diameter gage pin calibration.

Flank angle: The angle between the thread's flank and the thread's axis.

Flank line—data extraction region: The region containing the central (70%) portion of sensor data for one flank line.

Inspection region: All the calibrated part data between two stage position limits, start and end positions.

Intermediate data: Data produced by signal processing of calibrated sensor data that is not saved in the template, but utilized in estimates of thread parameters.

Intermediate data—correlation crossing: A match point from the correlation between a pattern and (typically) sensor height data.

Intermediate data—flank line: The line fit to data within the flank line data extraction region.

Intermediate data—crest/root: Measurements of the locations (stage pos, height) of the crests and roots present in the thread form.

Intermediate data—thread 3-D cylinder: Measurement of the 3-D cylinder formed from the least squares fit of the thread crests. The cylinder has parameters that include its diameter, per point RMS distance between data and fit, and cylinder axis.

Intermediate data—wire position: Location of a virtual wire as determined from the positions of the left and right adjacent flank lines.

Intermediate data—wire position search interval: Region that contains two adjacent thread crests, a thread root and two thread flanks.

Laser number: The enumeration of the (4) lasers in the optical head. The lasers are numbered laser-1 through laser-4.

Light plane generator or transmitter module: Physical module with optical and mechanical components that converts a light beam generated by a laser into a plane of light having parallel light rays.

Light plane receiver module: Physical module with optical, mechanical, and electrical components that converts a plane of light having parallel light rays into left and right electrical signals.

Light plane split line: Imaginary line that splits a light plane into left and right parts or portions. The line is defined in the light plane receiver module and represents the response to a shadow in the light plane in the left/right receivers.

Left/right receiver (Rcvr): The receiver is a component of the light plane receiver module that converts light energy incident on its surface (i.e., image plane) into an electrical signal. The signal current is basically proportional to the amount of incident light.

Left/Right sensor digitized raw signal: The output of the light plane receiver electronics, after processing of the left or right receiver signals, preferably including current-to-voltage conversion, amplification, analog filtering, and digitization.

Light plane receiver electronics: System module that converts left and right electrical signals from the laser line receiver module into digitized left and right raw sensor signals, and stores the results in the PC memory.

Measurement trigger signal: Signal from linear encoder electronics transmitted to receiver electronics. One measurement trigger signal pulse causes all sensor signals to be sampled and stored.

Optical head: A container such as a sealed metal box containing (4) beam lines and supporting electronics.

Part holder: A mechanical subassembly mounted to the base/slide unit. The subassembly contains the part holder base on which the parts are received and retained while being scanned. The part holder also holds the calibration cone in a stable position so it can also be scanned.

PC tower: The PC tower is a chassis containing a computer, a set of control electronics modules, and a number of power supplies.

Sensor digitized raw signal: The output after processing of a left/right receiver signal by the light plane receiver electronics.

Sensor height: The distance from the laser plane split line to the light/dark shadow edge of a part, measured in the sensor light plane.

Sensor height calibration: The process of acquiring and analyzing a set of data that is used to convert a sensor digitized raw signal to a sensor height.

Sensor number: The enumeration of the (8) sensors in the optical head. The values range from laser-1 left (L1L) through laser-4 right (L4R).

Sensor raw data: The set of data generated by the Laser Lab sensor system during one scan of the calibration cone and the UUT.

Sensor calibrated height data: The Laser Lab sensor raw data set generated from one scan, converted to physical units and corrected for all known issues.

Shadow ray: The ray of light that just grazes the surface of the UUT.

Stage axis: The direction in 3-D space defined by the up/down movement of the optical head's mechanical stage.

Stage axis, sensor zero position: The position of the beginning of the calibration cone, as determined by analysis of the sensor digitized raw signal.

Stage axis, calibrated sensor position: The raw position of the stage axis, corrected to be 0 mm at the sensor zero position. The calibrated sensor positions are different between sensors, even between the left and right sensors for the same laser.

Stage axis, raw position: The stage axis raw position is the value of the linear encoder counter, maintained by the linear encoder electronics module. The zero position is set when the stage stops during a "home" command; the linear encoder electronics module senses a bottom trip signal, stops the motor, and then zeroes the encoder counter. This process produces a final resting physical stage position that varies by several hundred microns, depending on the length of the move, the stage speed, and other factors. This physical position is generally too uncertain for direct use in specifying positions on a part.

Thread model: An estimate for one cycle of the repeated thread form, learned at template edit time.

Thread parameter—functional diameter: Estimate of the diameter of a virtual nut with the nominal pitch diameter, that could contain the observed 3-D thread form with all its lead deviations and other deviations from perfect form.

Thread parameter—lead deviation: The maximum deviation of the lead position from the perfect helical form.

Thread parameter—major diameter: The diameter of a cylinder enclosing all the thread crests.

Thread parameter—minor diameter: The diameter of a cylinder through all the thread roots.

Thread parameter—pitch diameter: The diameter of a cylinder that intersects the perfect thread form midway between crest and root.

Thread parameter—pitch: The average or median axial distance between adjacent threads.

Upper tooling: A mechanical subassembly mounted to the base/slide unit. The upper tooling includes a long stainless steel rod that can be moved up and down to hold a variety of different-sized parts. This tooling also includes a spring-loaded part clamp that facilitates placement, retention and release of parts.

Unit under test (UUT): The part being measured.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

Appendix A

Split Laser—Diameter Bias Due to Beam Scattering

Summary
  scattering of light from a reflective cylinder leads to an underestimate of its diameter.
  the scattering from a cone section has a large underestimate than the cylinder.
  introducing a pin hole aperture in the laser receiver can limit this effect, by making the laser receiver telecentric, or sensitive to light from a narrow range of incident angles.

Scattering from a Perfectly Reflective Cylinder

Figure 23:
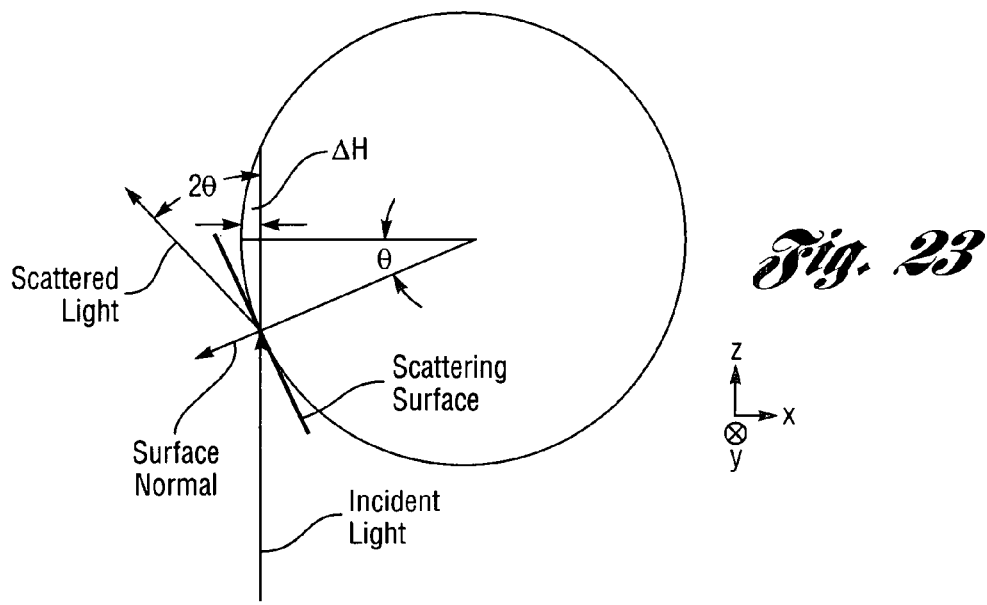
FIG. 23 is a top plan schematic view of a cylindrical part with a beam of light deflected at an angle $\theta_{refl}=2\theta$ by a perfectly reflecting surface of the part.

Scattering of light from a cylinder will cause a systematic underestimate of the cylinder's diameter in the split laser system. Light incident near the surface of the cylinder is scattered at a glancing angle as illustrated in FIG. 23. If the scattered light gets into the split laser detector, then the cylinder diameter appears systematically smaller. The effect is largest if the cylinder is perfectly reflective, and is absent if the cylinder is perfectly absorbing. The magnitude of this effect is calculated to set a limit on the systematic size underestimate.

The Scattering Angle

One can imagine a beam of light that hits the cylinder and is reflected. The beam's direction of travel would reach a depth of $\Delta H$ within the cylinder if the beam direction were continued on a straight line. The beam is deflected by an angle $\theta_{refl}=2\theta$ by the perfectly reflecting surface as shown in FIG. 23.

For a cylinder of diameter d the following relationships hold between the scattering angle, $\theta_{refl}=2\theta$, the depth $\Delta H$, and the diameter, d.

$$\Delta H = d(1-\cos\theta)$$

$$\Delta H \cong d(\theta^2/2) = d(\theta_{refl})^2/8$$

$$\theta_{refl} \cong 2\sqrt{2\Delta H/d}$$

For $\Delta H=0.0001"$, $d=0.5000"$, then $\theta \cong 2\sqrt{0.004}=0.04$ radian=2.3 degree.

For $\Delta H=0.001"$, $d=0.5000"$, then $\theta \cong 2\sqrt{0.004}=0.13$ radian=7.2 degree.

Effects on the Diameter Measurement

In the ideal case, with no scattering, the amount of light that reaches the detector is from line generator light rays that do not intersect the part. The light signal is then related to the orthographic projection of the part, perpendicular to the beam direction.

With scattering, light that would have been blocked may enter the detector.

The scattered light could fail to enter the detector due to one of the following effects:
  light absorption at the cylinder surface (such as by black coatings),
  scattering light may miss the entrance to the laser light receivers.

One can calculate an upper limit to the underestimate of light blockage by a perfectly reflecting cylinder. It is assumed that all light scattered through angles smaller than angle $\theta_{max}$ will be received in the laser light receiver. All light scattered through larger angles is lost and is not received in the laser light receiver.

The diameter blockage underestimate is:

Diameter Blockage Underestimate $\cong 2\Delta H \cong d(\theta_{max})^2/4$

| Blockage Underestimate | $\theta_{max}$ | Diameter |
|---|---|---|
| 0.00005" | 0.02 radian | 0.5000" |
| 0.00020" | 0.04 radian | 0.5000" |
| 0.00080" | 0.08 radian | 0.5000" |

Limiting Diameter Measurement Bias

Using Telecentric Ideas at the Laser Receiver

Figure 24:
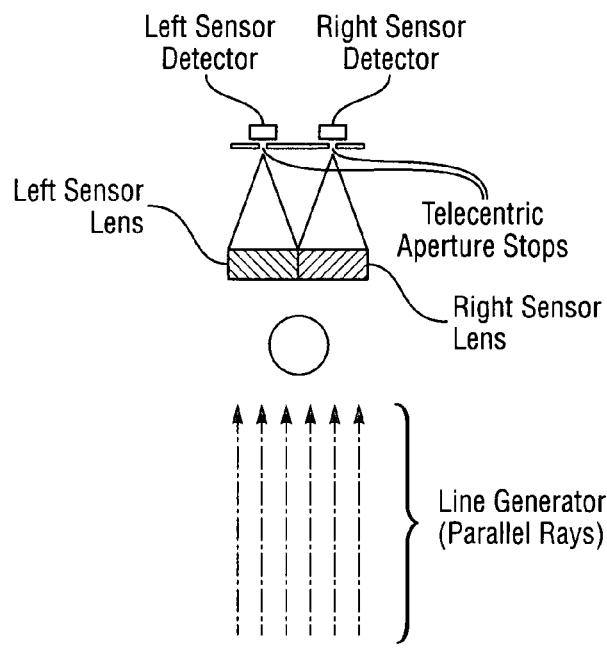
FIG. 24 is a top plan schematic view of a part which scatters light from a plane of light which scattered light is blocked by light plane receiver aperture slits.

As illustrated in FIG. 24, the simplest model of the laser receiver includes a focusing lens for each of the left and right sensors, and a laser diode to measure the laser light at each sensor's focusing lens' focal plane. The laser diodes are placed at the focus for a light source at infinite distance.

In this model, when a light ray is incident on the focusing lens at a different angle, then the light is focused at a slightly different place in the len's focal plane.

The change in position at the focal plane between light incident along the optical axis and light incident at an angle $\theta$, is $\Delta pos = f\tan(\theta) \approx f(\theta)$, where f is the focal length of the lens.

A pinhole aperture is added in front of the laser diode to make the laser receiver sensitive to light only in a small range of incident angles. Similar apertures are used in the construction of telecentric lenses. The pinhole aperture size is shown in the following table.

pin hole size=$2f\theta_{max}$

| Pinhole Diameter (mm) | $\theta_{max}$ | focal length |
|---|---|---|
| 2 mm | 0.01 radian | 100 mm |
| 1 mm | 0.01 radian | 50 mm |
| 2 mm | 0.02 radian | 50 mm |
| 0.5 mm | 0.01 radian | 25 mm |
| 1 mm | 0.02 radian | 25 mm |
| 2 mm | 0.04 radian | 25 mm |

Light Deflection from a Cone Section

Figure 25:
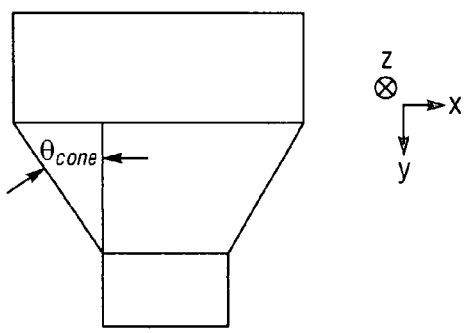
FIG. 25 illustrates a conical shape (i.e., frustum) utilized in the calibration fixture.

The deflection of light from a reflective cone is also of interest, since conical shapes (i.e., frustums) are utilized in the Laser Lab calibration fixture 40 as illustrated in FIG. 25.

The normal to the cone at the point where the incident beam is just tangent is:

$\hat{n} = [-\cos(\theta_{cone}), +\sin(\theta_{cone}), 0]$

The normal to the cone rotated an angle $\theta_{rot}$ about the y-axis (see FIG. 23):

$\hat{n} = [-\cos(\theta_{rot})\cos(\theta_{cone}), +\sin(\theta_{cone}) - \sin(\theta_{rot})\cos(\theta_{cone})]$.

The incident light's direction of travel is:

$\hat{l} = [0,0,1]$.

The incident light's direction of travel after reflection from a mirror is:

$$\hat{l}_{refl} = \hat{l} - 2\hat{n}(\hat{l} \cdot \hat{n})$$

$$-2\hat{n}(\hat{l} \cdot \hat{n}) =$$

$$2\hat{n}(\sin(\theta_{rot})\cos(\theta_{cone}) = 2\sin(\theta_{rot})\cos(\theta_{cone})[-\cos(\theta_{rot})\cos(\theta_{cone}),$$

$$+\sin(\theta_{cone}) - \sin(\theta_{rot})\cos(\theta_{cone})] = [-2\sin(\theta_{rot})$$

$$\cos(\theta_{rot})\cos^2(\theta_{cone}), +2\sin(\theta_{rot})\cos(\theta_{cone})\sin(\theta_{cone}),$$

$$-2\sin^2(\theta_{rot})\cos^2(\theta_{cone})] = [-\sin(2\theta_{rot})\cos^2(\theta_{cone}),$$

$$+\sin(\theta_{rot})\sin(2\theta_{cone}), -2\sin^2(\theta_{rot})\cos^2(\theta_{cone})]$$

$$\hat{l}_{refl} = [0,0,1] - 2\hat{n}(\hat{l} \cdot \hat{n}) = [-\sin(2\theta_{rot})\cos^2(\theta_{cone}),$$

$$+\sin(\theta_{rot})\sin(2\theta_{cone}),$$

$$1 - 2\sin^2(\theta_{rot})\cos^2(\theta_{cone})] = [-\sin(2\theta_{rot})\cos^2(\theta_{cone}),$$

$$+\sin(\theta_{rot})\sin(2\theta_{cone}), \cos(2\theta_{rot}) + 2\sin^2(\theta_{rot})\sin^2(\theta_{cone})]$$

The angle $\theta_{refl}$ between incident and reflected light beams can be computed.

$\cos(\theta_{refl}) = (\hat{l}_{refl} \cdot \hat{l}) = \cos(2\theta_{rot}) + 2\sin^2(\theta_{rot})\sin_2(\theta_{cone})$.

For a cylinder, ($\theta_{cone}=0$), one gets the expected result:

$\theta_{refl} = 2\theta_{rot}$

For small angles scattering angles, ($\theta_{rot} \ll 1$), and arbitrary cone angles one has:

$\cos(\theta_{refl}) = 1 - \sin^2(\theta_{rot})\cos^2(\theta_{cone})$ $1 - (\theta_{refl})^2/2 \approx 1 - 2(\theta_{rot})^2 \cos^2(\theta_{cone})$.

$\theta_{refl} \approx 2\theta_{rot}\cos(\theta_{cone})$

Practical Considerations in the Laser Lab System

The Laser Lab cone fixture 40 has cone sections (i.e., frustums) with cone angle $\theta_{cone}$=35 degrees and $\cos(\theta_{cone})$=0.820. What this means in practical terms is that the scattering angle on the cone sections is about 20% less than the scattering angles on the cylindrical sections. The approximate scaling developed in the previous sections indicates that the diameter underestimate would then be about 10% more than for the straight cylinder case.

Energy Absorption on the Cylinder

If the cylinder surface were coated with a light absorbing coating, then it might be that the reflected light would continue on in the same direction as the perfectly reflecting case, but with reduced intensity.

One can develop a model similar to the one noted above. In that model all light scattered between angles 0 and $\theta_{max}$ enters the split laser detector of FIG. 24. Suppose that a fraction $f_{absorb}$ of the scattered light, between angles 0 and $\theta_{max}$, is absorbed at the cylinder surface, and a fraction $(1 - f_{absorb})$ continues on to the split laser detector, then the new model is:

$2\Delta H \approx (1 - f_{absorb})d(\theta_{max})^2/4$.

Thus, the underestimate is improved by the factor $(1 - f_{absorb})$.

Appendix B

Summary

This Appendix describes in detail one embodiment of the Laser Lab calibration process.

Table of Contents
General Parameters . . . 88
Geometrical Parameters of the Calibration . . . 88
Cone Parameters . . . 88
General Parameters of the Calibration . . . 89
Cone Signal Processing . . . 89
Full Open Signal Level . . . 89
Rough Edge . . . 90
High Precision Edge Positions . . . 91
Laser Roll . . . 91
Data Binning—Cone Slope or Const Diameter Regions . . . 91
Calibration Model Analysis . . . 92
Sensor Blockage Table—Cone Slope Region Data . . . 92
Iteration Control . . . 92
Calibration . . . 92
Smooth Cone Description . . . 92
Cone Signal Processing . . . 94
Data Partitioning and Consistency Checks . . . 94
Rough Step Edge Positions . . . 94
Rough Slope Edge Positions . . . 95
Rough Edge Position Consistency Checks . . . 95
Sensor Data Partition Table . . . 96
Full Open Signal Level . . . 96
Full Open Signal Level—Consistency Checks . . . 96
High Precision Step Edge Positions . . . 96
High Precision Step Edge Positions—Consistency Checks . . . 97
Begin Cone Sensor Position Offsets . . . 98
Laser Roll Computation . . . 98
Consistency Checks . . . 99
Process Sensor Blockage Data . . . 99
Identify Cone Slope Data Regions . . . 100
Data Binning . . . 100
Data Averaging/Feature Generation . . . 100
Consistency Checks . . . 101

Process Cone Aspect Angle Data . . . 101
Identify Constant Diameter Regions . . . 101
Data Binning/Averaging/Consistency Checks . . . 101
Calibration Model Analysis . . . 102
Sensor Blockage Table and Cone Aspect Angle Calibration . . . 102
Cone Projection onto Sensor . . . 103
Computation of Sensor Blockage Table . . . 103
Sensor Blockage Table—Interpolation . . . 105
Sensor Level Interpolation Type—"Linear" . . . 105
Computation of Cone Tilt Angle . . . 105
Step Edge Position Changes due to Laser Roll Angle . . . 107
Cone 3-D Location Analysis . . . 107
Travel Z-Axis to Cone Z-Axis Scaling . . . 109
Iteration Control . . . 109
Consistency Checks . . . 109
Analysis and Error Propagation . . . 110
Effect of Sensor Blockage Table Errors due to Roll Angle on Diameter Bias due to Position Offsets . . . 110
Effect of Roll Angle Errors on Sensor Blockage Table . . . 111
Effect of Step Edge Location Errors on Roll Angle . . . 111
Effect of Multiple Scan Calibration on System Diameter Bias . . . 112
Glossary . . . 112

General Parameters
  Geometrical Parameters of the Calibration
  For cone parameters, reference drawing FIG. 4a.
  Sampling Interval

| | |
|---|---|
| 0.004 mm (fixed) | Specified by the encoder. The electronics generates (8) encoder trigger pulses, one per each sensor, from each encoder pulse. |

Cone Parameters

| | Start Diameter |
|---|---|
| 3.175 mm | Diameter of the face at the beginning of the cone. |
| | Const Diameter |
| 19.05 mm | Diameter of the two const diameter regions. |
| | Max Diameter |
| 38.100 mm | Diameter of the cone at the first step edge. |
| | Steps |
| 3.810 mm | Height of each step. |
| 1.500 mm | Width of each step. |
| 5 | Number of steps. |
| | Inclination Angle |
| 34.005 degrees | Cone slope angle. |

Boundary Positions—Cone Height Model

| Distance | Height | Description |
|---|---|---|
| 0.000 | 0.000 | Begin cone, bottom of step. |
| 0.000 | 1.587 | Begin cone, top of step. Begin const diam-0 region. |
| 3.810 | 1.587 | End const diam-0 region. Begin const slope-1 region. |
| 15.578 | 9.525 | End const slope-1 region, Begin const diam-1 region. |
| 18.923 | 9.525 | End const diam-1 region. Begin const slope-2 region. |
| 33.020 | 19.050 | End const slope-2 region. Begin max diam region. |
| 35.888 | 19.050 | End max diam region, begin step-1. |
| 35.888 | 17.145 | End step-1. |
| 37.379 | 17.145 | Begin step-2. |
| 37.379 | 15.240 | End step-2. |
| 38.877 | 15.240 | Begin step-3. |
| 38.877 | 13.335 | End step-3. |
| 40.378 | 13.335 | Begin step-4. |
| 40.378 | 11.430 | End step-4. |
| 41.877 | 11.430 | Begin step-5. |
| 41.877 | 9.525 | End step-5. Begin const diam-2 region. |
| 51.118 | 9.525 | End const diam-2 region. |

General Parameters of the Calibration
  Cone Signal Processing

| Full Open Signal Level | |
|---|---|
| 500 samples | RegionSize |
| 0.4 mm | GuardRegion ensure full open signal is not contaminated by scan startup. |
| 100 samples | MaxSignalVariance signal variance > 0.2% (100/50000) is diagnostic of poor laser sensor signal quality. |
| 45000 | MinSignalLevel |
| 64000 | MaxSignalLevel. signal levels outside this band are diagnostic of laser adjustment problems. |
| Rough Edge | |
| 0.4 mm | Step Size typical beam "sigma" is 15 samples or 60 um. 0.4 mm is about 6-7 sigma. |
| 0.4 mm | Smooth Size typical beam "sigma" is 15 samples or 60 um. 0.4 mm covers 6-7 sigma. |
| 200 levels | Step Threshold value large enough to minimize false edge detections. |
| −1500 levels | Expected Begin Cone Step Height. |
| +1000 levels | Expected Standard Step Height. |
| 7000 levels | Standard Step Height Tolerance. |
| 0.5 | Cone Slope Threshold units of (Step Size divided by Sampling Interval), or samples. This is a threshold on a double finite difference, using Step Size. |
| 2 | Expected Cone Slope Height. |
| 3 | Cone Slope Height Tolerance. units of (Step Size divided by Sampling Interval) or samples. |
| 10 mm | Expected Begin Cone Offset. |
| 10 mm | Begin Cone Step Position Tolerance. |
| 1 mm | Standard Step Position Tolerance. tolerances are for the relative measurement of step to begin cone step. |
| 1 mm | Standard Slope Position Tolerance. tolerances are for the relative measurement of step to begin cone step. |
| High Precision Edge Positions | |
| 0.1 mm | MaxPosDev maximum deviation of position from expected position. |
| 3.0 mm | MaxHeightDev maximum deviation of step height from expected value. |
| 1000 levels | Expected Height. |
| 100 levels | MaxRmsDev maximum averaged RMS(fit-data) for the step edge. |
| 70% | LineFitCentralRegion percentage of central data used for transition line fit. |

-continued

| | | |
|---|---|---|
| 0.4 mm | LineFitRegionSize | |
| | size of region before and after step used for line fits. | |
| 0.4 mm | LineFitGuardRegion | |
| | size of guard region between before/after step line fit and transition region. | |

Laser Roll

| | | |
|---|---|---|
| 0.100 mm | MaxRmsDeltaStepPos | |
| | step position delta RMS average larger than this value is diagnostic of laser beam or calibration device problems. | |

Data Binning - Cone Slope or Const Diameter Regions

| | | |
|---|---|---|
| 0.200 mm | GuardRegion | |
| | minimum distance, diameter data bin to region boundary. | |
| 0.200 mm | RegionBinSize | |
| | size of diameter data bin. | |
| 50 levels | MaxDataBinSigma | |
| | maximum data bin order statistic "sigma" estimator. | |
| 25 levels | MaxDataBinLinDev | |
| | maximum data bin deviation from neighbor linear estimator. | |
| 1 | Fit order (0 constant, 1 linear). | |

Calibration Model Analysis

Sensor Blockage Table - Cone Slope Region Data

| | | |
|---|---|---|
| 0.01 mm | SensorMaxInterpolationError | |
| | maximum interpolation error, due to "shape" of table. | |
| "Linear" | SensorInterpolationType | |
| | specify type of Sensor Blockage Table interpolation. | |
| "Linear" | ZeroHeightExtrapolationMethod | |
| | method to extrapolate Sensor Blockage table. | |
| 10 | ZeroHeightExtrapolationPoints | |
| | number of points in the extrapolation data set. | |
| "Linear" | MaxHeightExtrapolationMethod | |
| | method to extrapolate Sensor Blockage table. | |
| 10 | MaxHeightExtrapolationPoints | |
| | number of points in the extrapolation data set. | |

Iteration Control

| | | |
|---|---|---|
| 4 | MaxIterations | |
| | maximum number of Sensor Blockage Table iterations. | |

Calibration

Smooth Cone Description

FIG. 26 shows a schematic outline of the sensor signal produced by the smooth cone. The different regions of the signal are labeled and explained below.

FIG. 26: Cone Outline—One Sensor's Signal

The signal is plotted with full open sensor level shown at the bottom of the figure and fully blocked sensor level shown at the top of the figure.

Full Open Region—beginning of scan to beginning of cone.
 establish the full open level.
 establish the exact position of the beginning of the cone.
Cone Slope Data—two constant slope regions separated by a const diameter step.
 establish the sensor blockage table, the correspondence between sensor level and known diameters.
Const Diameter Data—two constant diameter data regions, 0.750" diameter.
 establish the center line of the cone.
 establish the position of the cone center line, relative to the stage travel axis.
Steps—Roll Angle Data—five constant height, constant width steps.
 establish the angle of the laser light plane, relative to the cone center line.
Support Bracket—no data, all light blocked.
Part Support Cylinder—constant diameter fixed support.
 top of this cylinder plus height of part support cap may establish part base position.
Part Support Cap—constant diameter cap.
 provides base for part.
 center position may vary slightly, caps are not fixed, there are several for different types of parts, the insertion is easy for operators to change.
 height and diameter are more precise than the center position.

Cone Signal Processing

In this section the processing and analysis are described that occur prior to creating a sensor blockage calibration table and determining the cone tilt angle.

In this section, the raw sensor data is processed and yields features in the (stage position, sensor level) space.

In the Laser Lab system, the conversion between stage position encoder count and stage position is simple and requires no calibration. The stage encoder count is multiplied by the Sampling Interval (0.004 mm) to produce the stage position.

In this section stage positions may be specified interchangeably using encoder counts or position values.

Data Partitioning and Consistency Checks

The first step is to partition the data into regions for more detailed processing. With the smooth cone calibration design the partition can be accomplished with a combination of the positions of the step edges and known positions of features on the calibration cone.

Rough Step Edge Positions

The following step edge positions should be identified in the data. The edges will be identified with a low precision edge finder, using finite difference detection, with smoothing.

| Step | Description |
|---|---|
| Beginning of Cone | Required. |
| Roll Angle Steps 1 through 5 | " |

Rough Slope Edge Positions

The following slope edge (2-nd derivative) positions should be identified in the data. The edges will be identified with a low precision edge finder, using finite difference detection, with smoothing.

| Step | Description |
|---|---|
| Beginning of Const Diam-1 | Required. |
| End of Const Diam-1 | " |
| Beginning of Const Diam-2 | Required. |
| End of Const Diam-2 | " |

Rough Edge Position Consistency Checks c-1: begin cone step edge exists as first step edge near expected position.

"near" has large tolerance, Begin Cone Step Position Tolerance.

c-2: required step edges exist near expected positions.

Expected positions are relative to begin cone step edge.

"near" has moderate tolerance, Standard Step Position Tolerance.

c-2: no other significant edge steps exist in calibration cone regions.

The part region may also have step edges.

c-3: required slope edges exist near expected positions.

Expected positions are relative to begin cone step edge.

"near" has moderate tolerance, Standard Slope Position Tolerance.

If either of checks 1, 2, 3 fail, the calibration process is stopped and diagnostic and logging messages are generated on the computer or PC.

Sensor Data Partition Table

The sensor data partition table gives the rough stage position of boundaries between the calibration data regions, on a per sensor basis. The table is used by downstream functions to provide rough starting points for find location modules.

Full Open Signal Level

Figure 27:
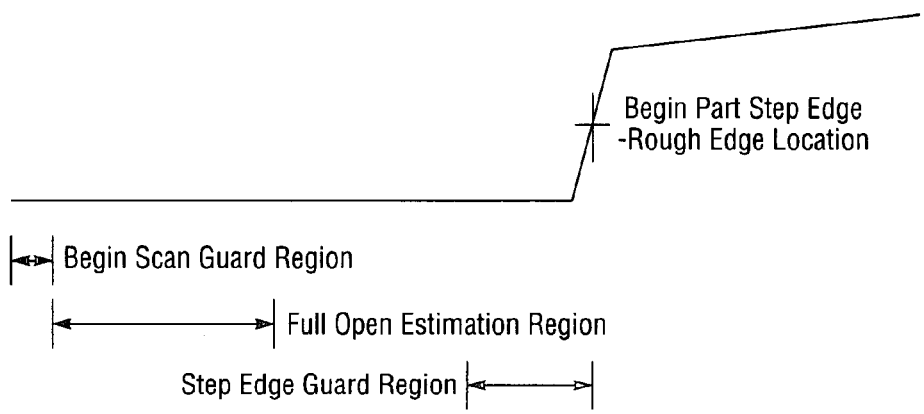
FIG. 27 is a sketch which illustrates a full open signal level computed from data in the full open estimation region.

The full open signal level is computed from data in the full open estimation region, shown in FIG. 27. The region's size is specified as well as the size of two guard regions, for begin part and for begin scan.

The median and the order statistic corresponding to "sigma" are computed, from the sample data within the full open estimation region.

Full Open Signal Level—Consistency Checks c-1: The full open estimation region must fit between the two guard regions.

c-2: The "sigma" order statistic must be less than the MaxSignalVariance parameter.

If these checks fail, the calibration fails and diagnostic and logging messages are generated on the computer or PC.

High Precision Step Edge Positions

High precision step edge position processing uses the rough edge step positions as initial locations to find high precision edge parameters for 7 step edges. The step edges are the begin part edge, the part support cylinder end step, and the 5 steps in the roll angle data. For each step edge, 4 parameters are computed, the step position, step height, the beam width, and a step quality measure.

Figure 28:
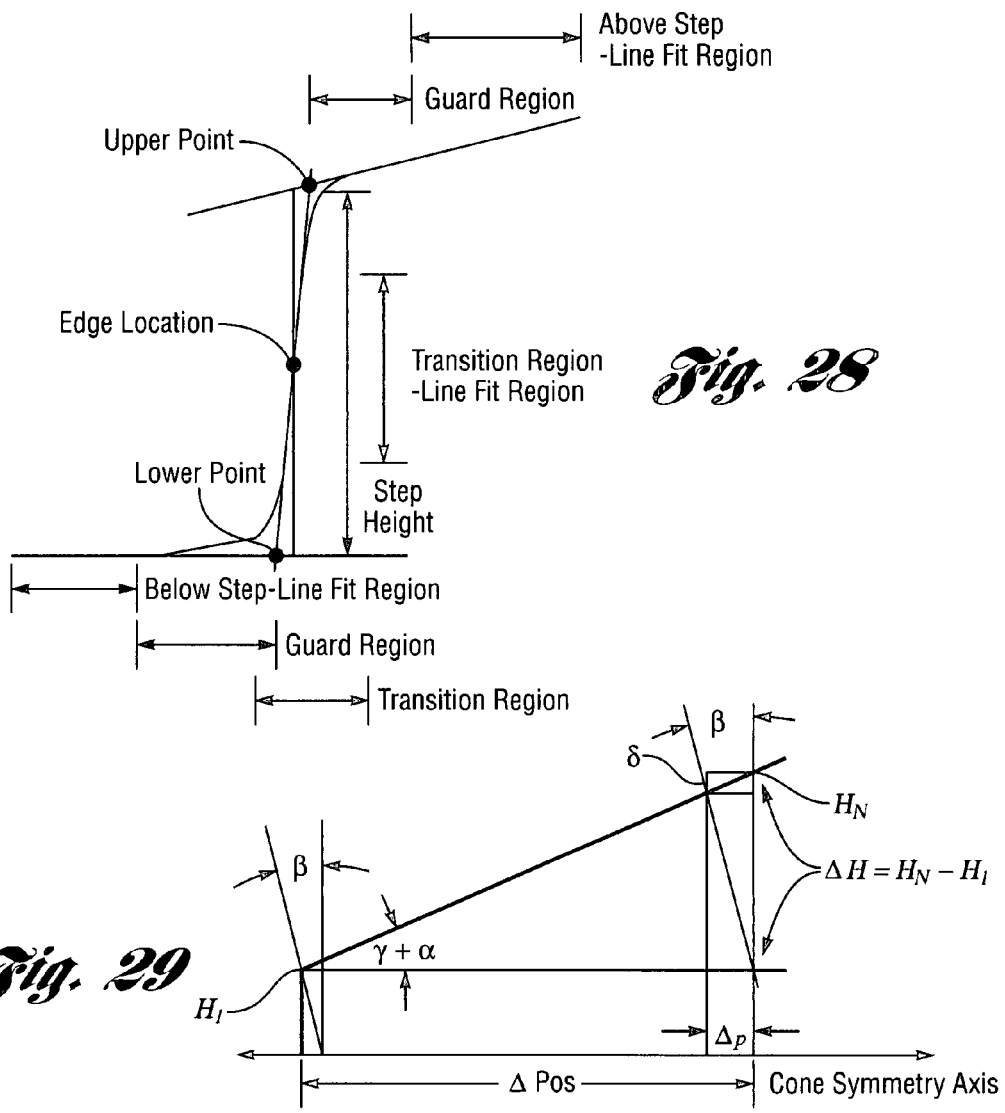
FIG. 28 is a graph which shows the data regions of FIG. 27.

The high precision edge detector uses three line fits to the step edge data, one before the step edge, one after the step edge, and one in the step edge transition region. A fixed size guard region, LineFitRegionSize, keeps non-linear data out of the before/after step line fit regions. The central LineFitCentralRegion percent of the transition region data is used for the transition region line fit. FIG. 28 shows these data regions.

The fit degree in the before/after part regions can be adjusted to be either const (degree-1) or linear (degree-2). For example the begin cone step edge requires before step fit degree-1 and after step fit degree-2. The first step edge requires before step fit degree-2 and after step fit degree-1. Steps 2 . . . 5 require both before/after step fits to be degree-1.

For each step a feature is generated, containing:
transition region midpoint {position, sensor level} =(Up+Lp)/2.
beam width estimator=0.4 (Step Size)/(transtion region slope).
before/after part line fit parameters.
step height=sensor level(Up)−sensor level(Lp).

RMS(data-line): per sample value, before part/transition/after part.

RMS(data-line) average=quadrature average of before part/transition/after part RMS(data-line) values.

High Precision Step Edge Positions—Consistency Checks c-1: all high precision step edges found, and within MaxPosDev distance of expected positions.

c-2: all step edges have heights within MaxHeightDev of expected heights.

c-3: the RMS(data-fit) average is less than MaxRmsDev.

If these checks fail, the calibration fails, diagnostic and logging messages are generated on the computer or PC.

Begin Cone Sensor Position Offsets

The set of high precision step edge positions at the begin cone step edge defines a position offset for each sensor.

The position scale is defined separately for each laser sensor. The position offset defines the 0-position for feature processing.

Laser Roll Computation

Laser roll is computed from the high precision step edge positions found in the roll angle data region.

The measurements and parameters utilized are the following.

StepPos(laser,sensor,i)=high precision step edge position, for i-th step.

Diam(i)=diameter of i-th step, defined to the midpoint of the step.

The difference between StepPos(laser, Left, i) and StepPos(laser, Right, i)

$\Delta$stepPos(laser, $i$)=StepPos(laser,Right,$i$)−StepPos(laser,Left,$i$), is related to the roll angle of the laser line, $\beta$. $\beta$ is positive when the Left sensor edge position is less than the Right sensor edge position. $\beta$ would be viewed as a counter clockwise rotation if the left sensor height is plotted as a positive number and the right sensor height is plotted as a negative number:

$\Delta$stepPos(laser,$i$)=sin($\beta$)Diam($i$).

The 5 equations relating $\Delta$stepPos(laser,i) to Diam(i), can be expressed as the matrix vector equation below:

$A\sin(\beta)=b$.

The data can be reduced with a least squares solution of the matrix vector equation, producing a single parameter estimator, $\beta_{est}$ $$\sin(\beta_{est}) = (A^T A)^{-1}(A^T b),$$

where $$b = \begin{pmatrix} \Delta StepPos(\text{laser}, 1) \\ \ldots \\ \Delta StepPos(\text{laser}, 5) \end{pmatrix}, \quad A = \begin{pmatrix} Diam(1) \\ \ldots \\ Diam(5) \end{pmatrix}$$

$$A^T A = \sum_i (Diam(i))^2$$

$$A^T b = \sum_i \Delta StepPos(\text{laser}, i) Diam(i)$$

Consistency Checks c-1: Verify that the RMS distance per data point between the data, $\{\Delta\text{AstepPos}(\text{laser},i)\}$, and the values predicted from the fit, $\{\sin(\beta_{est})\text{Diam}(i)\}$, is less than MaxDeltaStepPos-Variance.

Process Sensor Blockage Data

Raw sensor readings are processed in the cone slope region to produce a set of (sensor level, stage position) features. Typically each feature is based on a small region (10-500 samples) of data. The features are only generated in regions of valid data, for example they are kept away from step edges by a guard region.

Identify Cone Slope Data Regions

The first cone slope data region lies between the begin cone step edge and the beginning of a const diameter data angle region. The second region starts at the end of the same const diameter cone aspect angle region and extends to the position of the first roll angle step.

Approximate per sensor boundaries of the cone slope data regions are available from the Sensor Data Partition Table, computed in Data Partitioning and Consistency Checks step.

Data Binning

Data is only binned further than GuardRegion counts from the cone slope region boundaries, to prevent systematic diameter calibration offsets.

The regions are divided into the number of bins specified by the RegionBinSize and the number of sample positions in the cone slope region. If the number of available sample positions is not divided by RegionBinSize, then extra samples are added to the guard regions.

The data bins are not overlapping.

Data Averaging/Feature Generation

Sensor data observations within the bin are processed, forming estimates of sensor levels and variance within the bin.

Position data within the bin are processed to form a bin position average.

The data within a bin are fit to a first order linear model.

For each data bin, a feature is generated, containing:

bin position average.

bin const, first order linear fit terms.

bin fit value at bin average position.

bin RMS(fit-data) estimate.

Consistency Checks c-1: Each data bin's RMS(fit-data) estimator should be less than MaxDataBinSigma.

c-2: Deviation of each data bin's fit value from the value predicted by linear estimation using two adjacent bins (left and right) should be less than MaxDataBinLinDev. The end bins are tested using extrapolation from two left or two right bins.

Process Cone Aspect Angle Data

The cone's const diameter regions are processed similarly to the cone slope regions.

Identify Constant Diameter Regions

Two constant diameter data regions are processed, see FIG. 27, using the Sensor Data Partition Table.

Data Binning/Averaging/Consistency Checks

Data binning, averaging, feature generation, and consistency checks are the same as for the diameter calibration data regions.

Calibration Model Analysis

Sensor Blockage Table and Cone Aspect Angle Calibration

Cone signal processing produces a laser roll angle estimate and tables of sensor data at specified stage positions, for cone slope and cone constant diameter regions.

What is actually required is the projection of the cone 40 onto the light beam, as a function of the stage position. This projection depends on two angles, the laser roll angle $\beta$, and the cone tilt angle $\alpha$, the angle between the stage travel axis and the cone symmetry axis.

Each of the angles is defined per laser, the full set of laser and cone angles is $\{B_i, \alpha_i\}$, where the laser index-1 is in the interval $(1 \ldots 4)$.

The laser roll angle is known, but the cone tilt angle must be calculated. Since the cone tilt angle is small, typically less than 1-degree, an iterative process can be successfully defined.

Initially one can assume that cone tilt angle $\alpha$ is equal to zero. With this assumption one can use the cone model to generate the expected projection of the cone onto the sensor as a function of stage position. The set of cone projections paired with corresponding sensor responses is used to make the Sensor Blockage Table. After construction, the table gives the amount of material blocking the sensor, as a function of the expected sensor response.

The sensor blockage table is then utilized to process the constant diameter region data, producing an estimate of the cone tilt angle $\alpha$.

With the cone tilt angle estimate $\alpha$, the expected cone projections onto the sensor and the sensor blockage table are recalculated.

The process is repeated until there is negligible change in the cone tilt angle and the sensor blockage table estimates.

Cone Projection onto Sensor

Figure 29:
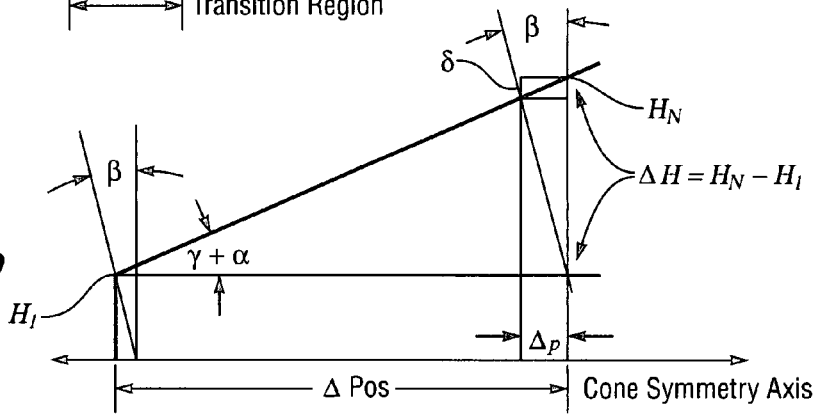
FIG. 29 is a sketch which illustrates cone projection geometry.

FIG. 29 illustrates cone projection geometry wherein bold lines indicate the cone outline and wherein:

$H_1$ is the radius of the start of the cone.

$H_N$ is the radius at distance-N along the cone axis.

$\beta$ is the laser roll angle.

$\alpha$ is the cone tilt angle.

$\gamma$ is the inclination angle of the cone.

$\Delta p$ is the position offset due to laser roll.

$\delta$ is the change in radius due to laser roll.

Using the spatial relationships shown in FIG. 29, one can calculate the change in radius due to laser roll, $\delta$.

$$(\Delta H - \delta)\tan(\beta) = \Delta p$$

$$\Delta p \tan(\gamma + \alpha) = \delta$$

$$\Delta H \tan(\beta) = \Delta p \tan(\gamma + \alpha)\tan(\beta) + \Delta p$$

$$\Delta p = \Delta H \tan(\beta)/(1 + \tan(\gamma + \alpha)\tan(\beta))$$

Finally, one can obtain the change in projection as a function of the laser roll angle, the cone inclination angle, and the projected cone aspect angle.

$$\delta = \Delta H \tan(\beta) \left( \frac{\tan(\gamma + \alpha)}{1 + \tan(\gamma + \alpha)\tan(\beta)} \right)$$

Computation of Sensor Blockage Table

Signal processing of the cone slope data regions produces a list of features, one for each sensor data bin. The feature specifies the stage position and the average sensor level within the data bin:

{SensorBlockage$_i$}={StagePosition$_i$,SensorLevel$_i$}.

The {SensorBlockage$_i$} feature is processed to create a calibrated sensor blockage feature:

{CalibratedSensorBlockage$_i$}={SensorLevel$_i$, StagePositionOffset$_i$,SensorHeight$_i$}.

The StagePosition of the SensorBlockage data bin and the StagePosition of the begin cone step edge are used to compute the stage position offset from the beginning of the cone:

StagePositionOffset$_i$=StagePosition$_i$−StagePosition (Begin Cone).

Then the height difference between the begin cone step edge and the stage position is computed:

Δh$i$=ConeHeight(StagePositionOffset$_i$)−ConeHeight (BeginCone).

The correction to ΔH$_i$ uses estimates of angles α, β and γ to compute the change in the cone projection, as seen by the sensor:

δ$_i$=δ$_i$(ΔH$_i$,α,β,γ),

SensorHeight$_i$=ΔH$_i$−δ$_i$.

The following steps summarize the computation:
sort {SensorBlockage$_i$} features by increasing StagePosition.
compute {CalibratedSensorBlockage$_i$}.
install the {CalibratedSensorBlockage$_i$} features in the Sensor Blockage Table.
install min,max SensorLevel limits in Sensor Blockage Table.
compute interpolation error estimates.

Sensor Blockage Table—Interpolation

The Sensor Blockage Table is analyzed by an interpolating function. The interpolating function calculates CalibratedSensorBlockage as a function of SensorLevel.

Min,max SensorLevel limits are utilized to specify the region of valid input for the interpolation function.

Configuration file parameter SensorLevelInterpolationType is utilized to select different interpolation methods at run time.

Sensor Level Interpolation Type—"Linear"

Linear nearest neighbor interpolation.

The interpolation error estimate compares the sensor height, SensorHeight$_i$=Sh$_i$ at stage position offset, StagePositionOffset$_i$=SP$_i$, with the interpolated sensor height derived from positions (i+1) and (i−1).

InterpolationErrorEst$_i$=(SH$_{i+1}$−SH$_{i-1}$)(SP$_i$−SP$_{i-1}$)/(SP$_{i+1}$−Sp$_{i-1}$)−SH$_i$, InterpolationErrorEst$_i$=η SH$_{i+1}$+(1−η)SH$_{i-1}$−SH$_i$, where η=(SP$_i$−Sp$_{i-1}$)/SP$_{i+1}$−Sp$_{i-1}$).

Computation of Cone Tilt Angle

Signal processing of the cone's constant diameter data regions produces a list of features, one for each sensor data bin. The feature specifies the stage position and the average sensor level within the data bin:

{SensorBlockage$_i$}={StagePosition$_i$,SensorLevel$_i$}.

The Sensor Blockage Table is used to compute features from SB features.

The calibrated constant data region features are utilized to compute a linear fit to the sensor height data as a function of StagePositionOffset$_i$=SP$_i$.

Left and Right sensor data are fit simultaneously for each laser, since the cone tilt angle α affects both. Tilt angle α positive causes the sensor heights to increase in the Left sensor and decrease in the Right sensor.

$$\begin{pmatrix} +SP_1^L & 1 & 0 \\ \cdots & \cdots & \cdots \\ +SP_{NL}^L & 1 & 0 \\ -SP_1^R & 0 & 1 \\ \cdots & \cdots & \cdots \\ -SP_{NR}^R & 0 & 1 \end{pmatrix} \begin{pmatrix} \tan(\alpha) \\ Offset^L \\ Offset^R \end{pmatrix} = \begin{pmatrix} SH_1^L \\ \cdots \\ SH_{NL}^L \\ SH_1^R \\ \cdots \\ SH_{NR}^R \end{pmatrix}$$

This equation can be expressed in matrix form:

$$A \begin{pmatrix} \tan(\alpha) \\ Offset^L \\ Offset^R \end{pmatrix} = b.$$

The least squares solution is:

$$\begin{pmatrix} \tan(\alpha) \\ Offset^L \\ Offset^R \end{pmatrix} = (A^T A)^{-1} A^T b.$$

The $A^T A$ and Atb have a simple form:

$$A^T A = \begin{pmatrix} \left[\sum_j (SP_j^L)^2 + \sum_k (SP_k^R)^2\right] & +\sum_j SP_j^L & -\sum_k SP_k^R \\ +\sum_j SP_j^L & \left[N_L = \sum_j 1\right] & 0 \\ -\sum_k SP_k^R & 0 & \left[N_R = \sum_k 1\right] \end{pmatrix}$$

$$A^T b = \begin{pmatrix} +\sum_j (SP_j^L SH_j^L) - \sum_k (SP_k^R SH_k^R) \\ +\sum_j SH_j^L \\ +\sum_k SH_k^R \end{pmatrix}$$

Step Edge Position Changes Due to Laser Roll Angle

The laser roll angle widens the step profile, and also biases the positon.

Cone 3-D Location Analysis

The 3-D cone direction unit vector, $\vec{\alpha}$, is observed in each of the 4 laser systems as the cone tilt angle. The projection of the cone unit vector, $\vec{\alpha}$, into the laser system "I" is ($\alpha_{ix}$, $\alpha_{iy}$, $\alpha_{iz}$).

Figure 30:
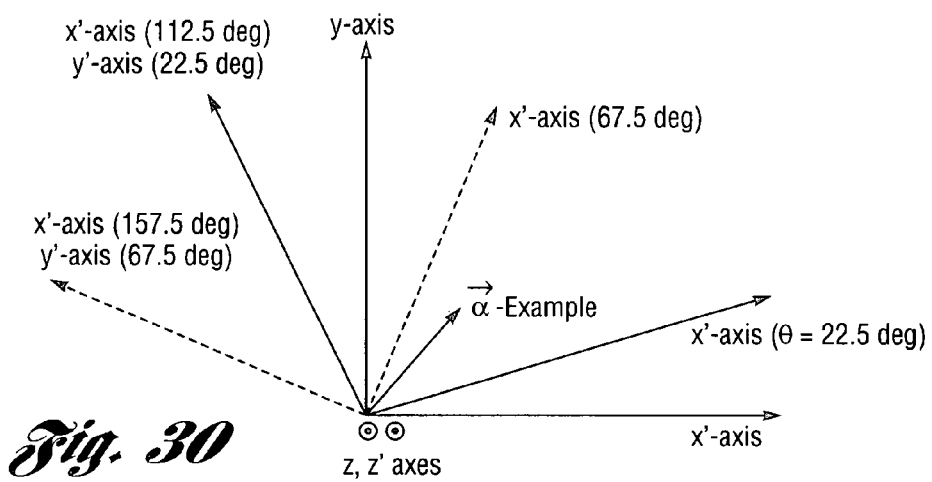
FIG. 30 is a sketch of $\alpha_1, \alpha_2, \alpha_3, \alpha_4$ which are the projections of $\vec{\alpha}$ on the y'-axis for the $\theta=22.5, 67.5, 112.5, 157.5$ degree laser sensor systems; the positive y'-axis is the right sensor and the negative y'-axis is the left sensor direction.

In FIG. 30, $\alpha_1$, $\alpha_2$, $\alpha_3$, $\alpha_4$ are the projections of $\vec{\alpha}$ on the y'-axis for the θ=22.5, 67.5, 112.5, 157.5 degree laser sensor systems. The positive y'-axis is the Right sensor and the negative y'-axis is the Left sensor direction.

The x,y components of the cone unit vector, $\vec{\alpha}$, are projected into laser system "i" with the following equation (the z component along the stage axis is unchanged):

$$\begin{pmatrix} \alpha_{nx} \\ \alpha_{ny} \end{pmatrix} = \begin{pmatrix} +\cos\theta_n & +\sin\theta_n \\ -\sin\theta_n & -\cos\theta_n \end{pmatrix} \begin{pmatrix} \alpha_x \\ \alpha_y \end{pmatrix}$$

The "y" relation is the only one used, since one only measures the $\alpha_{iy}$, $\alpha_{iz}$ components, the sensor does not measure $\alpha_{ix}$.

$$\alpha_{ny} = -\alpha_x \sin\theta_n + \alpha_y \cos\theta_n.$$

Using measurements in all 4 laser systems one can solve for the two components ($\alpha_x$, $\alpha_y$) of the cone unit vector, $\vec{\alpha}$, by solving the following linear equation:

$$\begin{pmatrix} a_{1y} \\ \alpha_{2y} \\ \alpha_{3y} \\ \alpha_{4y} \end{pmatrix} = \begin{pmatrix} -\sin\theta_1 & +\cos\theta_1 \\ -\sin\theta_2 & +\cos\theta_2 \\ -\sin\theta_3 & +\cos\theta_3 \\ -\sin\theta_4 & +\cos\theta_4 \end{pmatrix} \begin{pmatrix} \alpha_x \\ \alpha_y \end{pmatrix}.$$

These equations can be solved by the least squares method:

$$\begin{pmatrix} \alpha_x \\ \alpha_y \end{pmatrix} = (A^T A)^{-1} A^T b$$

where $$A^T A = \begin{pmatrix} +\sum_i (\sin\theta_i)^2 & -\sum_i \sin\theta_i \cos\theta_i \\ -\sum_i \sin\theta_i \cos\theta_i & +\sum_i (\cos\theta_i)^2 \end{pmatrix}$$

$$A^T b = \begin{pmatrix} -\sum_i \alpha_{iy} \sin\theta_i \\ +\sum_i \alpha_{iy} \cos\theta_i \end{pmatrix}$$

Travel Z-Axis to Cone Z-Axis Scaling

The distance along the travel axis is different from the distance along the cone axis, to second order in the angle between the cone axis and the travel axis.

$$\Delta pos(\text{cone} - \text{axis}) = \frac{\Delta pos(\text{travel} - \text{axis})}{\left(\alpha_z = \sqrt{1 - \alpha_x^2 - \alpha_y^2}\right)}$$

Iteration Control

Calibration model analysis is an iterative process. The number of iterations computed is MaxIterations. After computing the last iteration the Iteration Control stopping criteria is evaluated to determine if a valid Sensor Blockage Table was constructed. (See consistency checks c-3 and c-4 below.)

Consistency Checks c-1: Sorting {SensorBlockage$_i$} features by increasing StagePosition should produce a SensorLevel list sorted in decreasing order. This ensures that one can produce a Sensor Blockage Table that predicts a unique sensor blocking height at every valid SensorLevel.

c-2: The maximum absolute value of the interpolation error is less than SensorLevelMaxInterpolationError.

c-3: The number of iterations is less than or equal to MaxIterations.

c-4: The change in Sensor Blockage Table projection between the last two iterations $\Delta\delta_i = \delta_i^{(n)} - \delta_i^{(n-1)}$ is less than MaxSensorProjectionChange.

c-5: The maximum absolute deviation of {SensorHeight$_i$} from the value predicted in the cone angle fit is less than MaxRmsHeightDev.

c-6: The maximum absolute deviation of the four cone tilt angles {$\alpha_i$} from values predicted by the fit to the 3-D unit vector $\vec{\alpha}$ is less than MaxRmsConeAngleDev.

Analysis and Error Propagation

In this section one can see how known errors in the elementary data items, such as step edge positions and median sensor values, affect the system measurements.

Effect of Sensor Blockage Table Errors Due to Roll Angle on Diameter Bias Due to Position Offsets Suppose that during calibration there was a roll angle error. Then the left sensor actual height would be overestimated and the right sensor actual height would be underestimated and systematic diameter measurement errors would occur. In this situation, the placement offset of the center of a cylindrical object from the center of the calibration axis would cause a systematic offset in the measured diameter.

Roll angle that is too large causes a underestimate of the correct projection of the cone for the left sensor and an overestimate for the right sensor.

$$H_L = H_L^0 (1 - \epsilon)$$

$$H_R = H_R^0 (1 + \epsilon)$$

The measured diameter can then be shown to have a systematic offset that is proportional to the roll angle error.

$$D = H_L + H_R = H_L^0 (1 - \epsilon) + H_R^0 (1 - \epsilon)$$

$$D = (H_L^0 + H_R^0) - (H_L^0 - H_R^0)\epsilon$$

$D = D^0 + \epsilon(\text{CtrPosition})$, where the center position is defined as $$\text{CtrPosition} = (H_L^0 - H_R^0).$$

The relative error in the diameter measurement, due to the roll angle error is:

$$\frac{\delta D}{D} = \delta(\tan(\beta))\tan(\gamma)\left(\frac{\text{CtrPosition}}{D}\right).$$

Effect of Roll Angle Errors on Sensor Blockage Table

Roll angle errors couple with the cone slope to systematically (example) overestimate the left sensor actual height and underestimate the right sensor actual height, in the Sensor Blockage Table.

$$H_L = H_L^0 (1 - \tan(\beta)\tan(\gamma))$$

For a small roll angle:

$$\delta H = \pm H^0 \tan(\gamma) \delta(\tan(\beta))$$

For H=0.500", $\gamma$=35°, $\delta$=0.0001", one should have $\delta\beta \leq 0.3$ mrad=0.016 degree.

Effect of Step Edge Location Errors on Roll Angle

A simple method to find the roll angle finds the position of two step edges, and computes the angle from the difference in step positions.

tan(β)=(ΔStepPos)/Diameter

δ(tan(β))=δ(ΔStepPos)/Diameter

The difference in two uncorrelated step positions has approximately 40% greater uncertainty than a single step position.

δ(tan(β))=δ(StepPos)√2/Diameter

Step positions have σ≈0.005 mm, and at a Diameter=1.400", this works out to σ(tan(β))≈0.2 mrad.

Effect of Multiple Scan Calibration on System Diameter Bias

The system diameter bias has an error distribution that is similar to the repeatability distribution for a diameter measurement.

Multiple scans for calibration reduces the bias.

Glossary

Cone tilt angles $\{\alpha_i\}$: 3-D cone tilt angle projected into each laser's coordinate system.

3-D cone tilt angle $\vec{\alpha}$: Symmetry axis of cone relative to stage travel axis.

Laser roll angle β: Angle of laser light plane, relative to cone symmetry axis.

Sensor Blockage Table: Table giving size of object blocking the sensor, as a function of the raw sensor signal.

Appendix C

In general, this appendix describes how to fit a cylinder to a set of points. The set of points could be determined in any manner. The application within Laser Lab is the fitting of a cylinder to the set of "thread crest" locations. This cylinder is used to estimate the thread region's major diameter. The data for a thread crest cylinder measurement is a set of (stage z coordinate, sensor height) pairs. These data points are the observed locations of the thread crests. For a 6-pitch thread inspection region, the number of data points per thread is 4 (lasers) * 2 (sensors) * 2 (flanks) * 6 (pitches) =96 (data points).

One would then like to fit all the data points to a simple linear model of the thread crest cylinder in space with 5 free parameters:

the cylinder radius, R.
the slope of the cylinder center line, in x and y, ($a_x$, $a_y$).
the (x,y) center of the cylinder center line, at the beginning of the inspection interval, ($b_x$, $b_y$).

The 8 data sets one has to work with are:

$\{(z_i(l, s), h_i(l, s))\}$, where
l=laser label, varying from 1 . . . 4,
s=sensor label, L or R, and
i=data index, varying from 1 . . . N(l,s).

For example, the data set for the laser-2, right sensor is $\{(z_i(2, R), h_i(2, R))\}$.

To fit one laser's data, one can develop a linear matrix equation. The parameters are:

a(l)=slope of cylinder line in laser-l coordinates.
b(l)=intercept of cylinder line in laser-l coordinates.
r=radius of cylinder.

$$Z(l)\begin{pmatrix} a(l) \\ b(l) \end{pmatrix} = \begin{pmatrix} z_1(l, L) & 1 \\ \cdots & \\ z_{N(l,L)}(l, L) & 1 \\ z_1(l, R) & 1 \\ \cdots & \\ z_{N(l,R)}(l, R) & 1 \end{pmatrix} \begin{pmatrix} a(l) \\ b(l) \end{pmatrix} = \begin{pmatrix} h_1(l, L) \\ \cdots \\ h_{N(l,L)}(l, L) \\ h_1(l, R) \\ \cdots \\ h_{N(l,R)}(l, R) \end{pmatrix} + \begin{pmatrix} 1 \\ \cdots \\ 1 \\ -1 \\ \cdots \\ -1 \end{pmatrix} r$$

The one laser equation can be expressed in block form.

$$Z(l)\begin{pmatrix} a(l) \\ b(l) \end{pmatrix} = h(l) + s(l)r.$$

The new vector s(l), is a column of +/−1 values, with +1 for the left sensor values and −1 for the right sensor values.

$$s(l)\begin{pmatrix} 1_1 \\ \cdots \\ 1_{N(l,L)} \\ -1_1 \\ \cdots \\ -1_{N(l,R)} \end{pmatrix}$$

One can develop a block matrix equation for a fit of all 4 lasers' data to 9 parameters. The parameters are:
a(1), a(2), a(3), a(4),
b(1), b(2), b(3), b(4),
r.

The radius parameter is shared by all 4 lasers, reducing the parameter count to 9 from 12.

$$Z\begin{pmatrix} a(1) \\ b(1) \\ a(2) \\ b(2) \\ a(3) \\ b(3) \\ a(4) \\ b(4) \\ r \end{pmatrix} = \begin{pmatrix} Z(1) & 0 & 0 & 0 & s(1) \\ 0 & Z(2) & 0 & 0 & s(2) \\ 0 & 0 & Z(3) & 0 & s(3) \\ 0 & 0 & 0 & Z(4) & s(4) \end{pmatrix} \begin{pmatrix} a(1) \\ b(1) \\ a(2) \\ b(2) \\ a(3) \\ b(3) \\ a(4) \\ b(4) \\ r \end{pmatrix} = \begin{pmatrix} h(1) \\ h(2) \\ h(3) \\ h(4) \end{pmatrix} = H$$

Note: Z specifies the matrix containing data from all 4 lasers, and Z(l) specifies the data matrix containing data from just one laser.

The new 4 laser equation can be solved by standard least squares techniques. We will show the solution to develop the structure of the $Z^T Z$ and $Z^T H$ matrices. We don't actually solve for this set of 9 parameters in practice. In the next section, we will transform the equation to eliminate the dependencies among the a(l) and b(l) parameters, and reduce the number of unknown parameters to 5.

$Z \; (a(1) \; b(1) \; a(2) \; b(2) \; a(3) \; b(3) \; a(4) \; b(4) \; r^T) = H$ $(a(1) \; b(1) \; a(2) \; b(2) \; a(3) \; b(3) \; a(4) \; b(4) \; r^T) = (Z^T Z)^{-1}(Z^T H)$

-continued $$(Z^T Z) = \begin{pmatrix} Z^T(1)Z(1) & 0 & 0 & 0 & Z^T(1)s(1) \\ 0 & Z^T(2)Z(2) & 0 & 0 & Z^T(2)s(2) \\ 0 & 0 & Z^T(3)Z(3) & 0 & Z^T(3)s(3) \\ 0 & 0 & 0 & Z^T(4)Z(4) & Z^T(4)s(3) \\ (Z^T(1)s(1))^T & (Z^T(2)s(2))^T & (Z^T(3)s(3))^T & (Z^T(4)s(4))^T & \sum_{l=1}^{4} s^T(l)s(l) \end{pmatrix}$$

$$Z^T H = \begin{pmatrix} Z^T(1)h(1) \\ Z^T(2)h(2) \\ Z^T(3)h(3) \\ Z^T(4)h(4) \\ \sum_{l=1}^{4} s^T(l)h(l) \end{pmatrix}$$

One now determines the numerical results for the important submatrices.

First, the $Z^T(l)Z(l)$ submatrix for laser l.

$$Z^T(l)Z(l) = \begin{pmatrix} \sum_{i=1}^{N(l,L)} z_i(l,L)^2 + \sum_{i=1}^{N(l,R)} z_i(l,R)^2 & \sum_{i=1}^{N(l,L)} z_i(l,L) + \sum_{i=1}^{N(l,R)} z_i(l,R) \\ \sum_{i=1}^{N(l,L)} z_i(l,L) + \sum_{i=1}^{N(l,R)} z_i(l,R) & N(l,L) + N(l,R) \end{pmatrix}$$

The result is quite simple, a matrix containing the accumulated sensor positions, the accumulated sensor positions squared, and the number of measurements for laser l. For this case, you don't have to sum separately for L and R sensors.

$$Z^T(l)Z(l) = \begin{pmatrix} \sum_i (z_i)^2 & \sum_i z_i \\ \sum_i z_i & N(l) \end{pmatrix}$$

Second, the $Z^T(l)i(l)$ vector for laser −1.

$$Z^T(l)s(l) = \begin{pmatrix} \sum_{i=1}^{N(l,L)} z_i(l,L) - \sum_{j=1}^{N(l,R)} z_j(l,R) \\ N(l,L) - N(l,R) \end{pmatrix}$$

This is also simple, containing the difference between left and right positions and the difference between the number of left and right data items. Separate L and R sensor sums are required here.

Third, the vector $Z^T(l)h(l)$.

This vector contains the correlation between heights and stage coordinates and the accumulated sum of sensor heights.

$$Z^T(l)h(l) = \begin{pmatrix} \sum_{i=1}^{N(l,L)} h_i(l,L)z_i(l,L) + \sum_{i=1}^{N(l,R)} h_i(l,R)z_i(l,R) \\ \sum_{i=1}^{N(l,L)} h_i(l,L) + \sum_{i=1}^{N(l,R)} h_i(l,R) \end{pmatrix}$$

Fourth, the value $$\sum_{l=1}^{4} s^T(l)h(l).$$

This is the accumulated height difference between L and R sensors.

$$\sum_{l=1}^{4} s^T(l)h(l) = \sum_{l=1}^{4} \left\{ \sum_{i=1}^{N(l,L)} h_i(l,L) - \sum_{i=1}^{N(l,R)} h_i(l,R) \right\}$$

Finally, the value $\sum_{l=1}^{4} s^T(l)s(l).$

This is the difference between the number of left and right data points.

$$\sum_{l=1}^{5} s^T(l)s(l) = \sum_{l=1}^{4} \{N(l,R) + N(l,L)\} = N(L) + N(R) = N$$

Implementation—Unique Accumulated Values

A look back at the required terms shows there are only 5 different terms that each need to be accumulated for each set of laser and sensor indices. This makes a total of 40 unique values.

$$sSqZ(l,s) = \sum_{i=1}^{N(l,s)} (z_i(l,s))^2.$$

$$sZ(l,s) = \sum_{i=1}^{N(l,s)} z_i(l,s).$$

$$N(l,s) = \sum_{i=1}^{N(l,s)} 1.$$

$$sHZ(l,s) = \sum_{i=1}^{N(l,s)} h_i(l,s)z_i(l,s).$$

$$sH(l,s) = \sum_{i=1}^{N(l,s)} h_i(l,s).$$

Sums and differences of terms can be expressed in a simple notation.

If the sensor argument is suppressed, then the sum of L and R sensors is indicated as:

$sSqZ(l)=sSqZ(l,L)+sSqZ(l,R).$

If the laser argument is suppressed, then the sum over all lasers is indicated as:

$$sH(L) - sH(R) = \sum_{l=1}^{4} \{sH(l, L) - sH(l, R)\}.$$

The symbol Δ indicates a left sensor minus right sensor difference as:

$$\Delta N(l) = N(l,L) - N(l,R),$$

$$\Delta N = N(L) - N(R),$$

$$\Delta sZ(l) = sZ(l,L) - sZ(l,R).$$

With these accumulated values $$Z^T(l)Z(l) = \begin{pmatrix} sSqZ(l) & sZ(l) \\ sZ(l) & N(l) \end{pmatrix},$$

$$Z^T(l)s(l) = \begin{pmatrix} sZ(l,L) - sZ(l,R) \\ N(l,L) - N(l,R) \end{pmatrix} = \begin{pmatrix} \Delta sZ(l) \\ \Delta N(l) \end{pmatrix},$$

$$Z^T(l)h(l) = \begin{pmatrix} sHZ(l) \\ sH(l) \end{pmatrix},$$

$$\sum_{l=1}^{4} s^T(l)h(l) = sH(L) - sH(R) = \Delta sH,$$

$$\sum_{l=1}^{4} s^T(l)s(l) = N(L) + N(R) = N.$$

Projection of 3-D Coordinates to Laser Coordinates

The parameters a(i), b(i) specified as 8 parameters of the above 9-parameter fit are actually projections of the 3-D thread axis parameters $a_x$, $a_y$, $b_x$, $b_y$. A projection matrix, P, defines the mapping from the 5-parameter fit to the 9-parameter fit. The angles $a_i$ are the angles of the laser beams with respect to the stage (x,y) axes. For example, laser-1 is incident at 22.5 degrees, laser-2 at 67.5 degrees, laser-3 at 112.5 degrees, and laser-4 at 157.4 degrees.

$$\begin{pmatrix} a(1) \\ b(1) \\ a(2) \\ b(2) \\ a(3) \\ b(3) \\ a(4) \\ b(4) \\ r \end{pmatrix} = P \begin{pmatrix} a_x \\ a_y \\ b_x \\ b_y \\ r \end{pmatrix} = \begin{pmatrix} -\sin(\alpha_1) & \cos(\alpha_1) & 0 & 0 & 0 \\ 0 & 0 & -\sin(\alpha_1) & \cos(\alpha_1) & 0 \\ -\sin(\alpha_2) & \cos(\alpha_2) & 0 & 0 & 0 \\ 0 & 0 & -\sin(\alpha_2) & \cos(\alpha_2) & 0 \\ -\sin(\alpha_3) & \cos(\alpha_3) & 0 & 0 & 0 \\ 0 & 0 & -\sin(\alpha_3) & \cos(\alpha_3) & 0 \\ -\sin(\alpha_4) & \cos(\alpha_4) & 0 & 0 & 0 \\ 0 & 0 & -\sin(\alpha_4) & \cos(\alpha_4) & 0 \\ 0 & 0 & 0 & 0 & 1 \end{pmatrix} \begin{pmatrix} a_x \\ a_y \\ b_x \\ b_y \\ r \end{pmatrix}$$

Using the projection matrix we can reduce the previous matrix vector equation from a 9-dimension problem to a 5-dimension problem.

$$Z \begin{pmatrix} a(1) \\ b(1) \\ a(2) \\ b(2) \\ a(3) \\ b(3) \\ a(4) \\ b(4) \\ r \end{pmatrix} = ZP \begin{pmatrix} a_x \\ a_y \\ b_x \\ b_y \\ r \end{pmatrix} = H$$

For just one laser, the equation is quite simple.

$z_i(l, s) \, a(l) + b(l) + \delta(s) r = h_i(l, s)$, where l ≡ laser index,
s ≡ sensor index,
i ≡ data index,
$a(l) = -\sin(a_l) a_x + \cos(a_l) a_y$, $b(l) = -\sin(\alpha_l) b_x + \cos(\alpha l) b_y$, and $\delta(s) = (+1)$ for $(s == \text{Left})$
$= (-1)$ for $(s == \text{Right})$.

This is the least squares solution:

$$(a_x a_y b_x b_y r)^T = (P^T(Z^TZ)P)^{-1}(P^TZ^T)H.$$

The vector $(P^TZ^T)H$ can be computed in the simplified value notation. It is just the linear combination of sumHZ(1) or sumH(1) terms weighted by $\cos(\alpha_l)$ or $\sin(\alpha_l)$ factors.

$$P^T(Z^T H) = \begin{pmatrix} -\sin(\alpha_1) & 0 & -\sin(\alpha_2) & 0 & -\sin(\alpha_3) & 0 & -\sin(\alpha_4) & 0 & 0 \\ \cos(\alpha_1) & 0 & \cos(\alpha_2) & 0 & \cos(\alpha_3) & 0 & \cos(\alpha_4) & 0 & 0 \\ 0 & -\sin(\alpha_1) & 0 & -\sin(\alpha_2) & 0 & -\sin(\alpha_3) & 0 & -\sin(\alpha_4) & 0 \\ 0 & \cos(\alpha_1) & 0 & \cos(\alpha_2) & 0 & \cos(\alpha_3) & 0 & \cos(\alpha_4) & 0 \\ 0 & 0 & 0 & 0 & 0 & 0 & 0 & 0 & 1 \end{pmatrix} \begin{pmatrix} sHZ(1) \\ sH(1) \\ sHZ(2) \\ sH(2) \\ sHZ(3) \\ sH(3) \\ sHZ(4) \\ sH(4) \\ \Delta sH \end{pmatrix}$$

$$P^T(Z^T H) = \begin{pmatrix} -\sum_{l=1}^{4} \sin(\alpha_l) sHZ(l) \\ +\sum_{l=1}^{4} \cos(\alpha_l) sHZ(l) \\ -\sum_{l=1}^{4} \sin(\alpha_l) sH(l) \\ +\sum_{l=1}^{4} \cos(\alpha_l) sH(l) \\ \Delta sH \end{pmatrix}$$

The matrix $(P^T Z^T ZP)$ also can be computed in the simplified value notation.

$$(P^T(Z^T Z)P) = P^T \begin{pmatrix} sSqZ(1) & sZ(1) & 0 & 0 & 0 & 0 & 0 & 0 & \Delta sZ(1) \\ sZ(1) & N(1) & 0 & 0 & 0 & 0 & 0 & 0 & \Delta N(1) \\ 0 & 0 & sSqZ(2) & sZ(2) & 0 & 0 & 0 & 0 & \Delta sZ(2) \\ 0 & 0 & sZ(2) & N(2) & 0 & 0 & 0 & 0 & \Delta N(2) \\ 0 & 0 & 0 & 0 & sSqZ(3) & sZ(3) & 0 & 0 & \Delta sZ(3) \\ 0 & 0 & 0 & 0 & sZ(3) & N(3) & 0 & 0 & \Delta N(3) \\ 0 & 0 & 0 & 0 & 0 & 0 & sSqZ(4) & sZ(4) & \Delta sZ(4) \\ 0 & 0 & 0 & 0 & 0 & 0 & sZ(4) & N(4) & \Delta N(4) \\ \Delta sZ(1) & \Delta N(1) & \Delta sZ(2) & \Delta N(2) & \Delta sZ(3) & \Delta sZ(4) & \Delta sZ(4) & \Delta N(4) & N \end{pmatrix} \begin{pmatrix} -\sin(\alpha_1) & \cos(\alpha_1) & 0 & 0 & 0 \\ 0 & 0 & -\sin(\alpha_1) & \cos(\alpha_1) & 0 \\ -\sin(\alpha_2) & \cos(\alpha_2) & 0 & 0 & 0 \\ 0 & 0 & -\sin(\alpha_2) & \cos(\alpha_2) & 0 \\ -\sin(\alpha_3) & \cos(\alpha_3) & 0 & 0 & 0 \\ 0 & 0 & -\sin(\alpha_3) & \cos(\alpha_3) & 0 \\ -\sin(\alpha_4) & \cos(\alpha_4) & 0 & 0 & 0 \\ 0 & 0 & -\sin(\alpha_4) & \cos(\alpha_4) & 0 \\ 0 & 0 & 0 & 0 & 1 \end{pmatrix}$$

intermediate result:

$$(P^T(Z^T Z)P) = P^T \begin{pmatrix} -\sin(\alpha_1)sSqZ(1) & \cos(\alpha_1)sSqZ(1) & -\sin(\alpha_1)sZ(1) & \cos(\alpha_1)sZ(1) & \Delta sZ(1) \\ -\sin(\alpha_1)sZ(1) & \cos(\alpha_1)sZ(1) & -\sin(\alpha_1)N(1) & \cos(\alpha_1)N(1) & \Delta N(1) \\ -\sin(\alpha_2)sSqZ(2) & \cos(\alpha_2)sSqZ(2) & -\sin(\alpha_2)sZ(2) & \cos(\alpha_2)sZ(2) & \Delta sZ(2) \\ -\sin(\alpha_2)sZ(2) & \cos(\alpha_2)sZ(2) & -\sin(\alpha_2)N(2) & \cos(\alpha_2)N(2) & \Delta N(2) \\ -\sin(\alpha_3)sSqZ(3) & \cos(\alpha_3)sSqZ(3) & -\sin(\alpha_3)sZ(3) & \cos(\alpha_3)sZ(3) & \Delta sZ(3) \\ -\sin(\alpha_3)sZ(3) & \cos(\alpha_3)sZ(3) & -\sin(\alpha_3)N(3) & \cos(\alpha_3)N(3) & \Delta N(3) \\ -\sin(\alpha_4)sSqZ(4) & \cos(\alpha_4)sSqZ(4) & -\sin(\alpha_4)sZ(4) & \cos(\alpha_4)sZ(4) & \Delta sZ(4) \\ -\sin(\alpha_4)sZ(4) & \cos(\alpha_4)sZ(4) & -\sin(\alpha_4)N(4) & \cos(\alpha_4)N(4) & \Delta N(4) \\ -\sum_{l=1}^{4}\sin(\alpha_1)\Delta sZ(l) & -\sum_{l=1}^{4}\cos(\alpha_1)\Delta sZ(l) & -\sum_{l=1}^{4}\sin(\alpha_1)\Delta N(l) & \sum_{l=1}^{4}\cos(\alpha_1)\Delta N(l) & N \end{pmatrix}$$

The final result is a 5×5 matrix with the sin( ) and cos( ) terms mixing the data from individual lasers.

$$(P^T(Z^TZ)P) = \begin{pmatrix} +\sum_{i=1}^{4}\sin^2(\alpha_1)sSqZ(l) & -\sum_{i=1}^{4}\sin(\alpha_1)\cos(\alpha_1)sSqZ(l) & +\sum_{i=1}^{4}\sin^2(\alpha_1)sZ(l) & -\sum_{i=1}^{4}\sin(\alpha_1)\cos(\alpha_1)sZ(l) & -\sum_{i=1}^{4}\sin(\alpha_1)\Delta sZ(l) \\ -\sum_{i=1}^{4}\sin(\alpha_1)\cos(\alpha_1)sSqZ(l) & +\sum_{i=1}^{4}\cos^2(\alpha_1)sSqZ(l) & -\sum_{i=1}^{4}\sin(\alpha_1)\cos(\alpha_1)sZ(l) & +\sum_{i=1}^{4}\cos^2(\alpha_1)sZ(l) & +\sum_{i=1}^{4}\cos(\alpha_1)\Delta sZ(l) \\ +\sum_{i=1}^{4}\sin^2(\alpha_1)sZ(l) & -\sum_{i=1}^{4}\sin(\alpha_1)\cos(\alpha_1)sZ(l) & +\sum_{i=1}^{4}\sin^2(\alpha_1)N(l) & -\sum_{i=1}^{4}\sin(\alpha_1)\cos(\alpha_1)N(l) & -\sum_{i=1}^{4}\sin(\alpha_1)\Delta N(l) \\ -\sum_{i=1}^{4}\sin(\alpha_1)\cos(\alpha_1)sZ(l) & +\sum_{i=1}^{4}\cos^2(\alpha_1)sZ(l) & -\sum_{i=1}^{4}\sin(\alpha_1)\cos(\alpha_1)N(l) & +\sum_{i=1}^{4}\cos^2(\alpha_1)N(l) & +\sum_{i=1}^{4}\cos(\alpha_1)\Delta N(l) \\ -\sum_{i=1}^{4}\sin(\alpha_1)\Delta sZ(l) & +\sum_{i=1}^{4}\cos(\alpha_1)\Delta sZ(l) & -\sum_{i=1}^{4}\sin(\alpha_1)\Delta N(l) & +\sum_{i=1}^{4}\cos(\alpha_1)\Delta N(l) & N \end{pmatrix}$$

One can define a set of 4-element vectors to make the previous results look more compact.

$\overrightarrow{\sin} = (\sin(\alpha_1)\sin(\alpha_2)\sin(\alpha_3)\sin(\alpha_4))$ $\overrightarrow{\cos} = (\cos(\alpha_1)\cos(\alpha_2)\cos(\alpha_3)\cos(\alpha_4))$ $\overrightarrow{(\sin\cos)} = (\sin(\alpha_1)\cos(\alpha_1)\sin(\alpha_2)\cos(\alpha_2)\sin(\alpha_3)\cos(\alpha_3)\sin(\alpha_4)\cos(\alpha_4))$ $\overrightarrow{(\sin)^2} = (\sin^2(\alpha_1)\sin^2(\alpha_2)\sin^2(\alpha_3)\sin^2(\alpha_4))$ $\overrightarrow{(\cos)^2} = (\cos^2(\alpha_1)\cos^2(\alpha_2)\cos^2(\alpha_3)\cos^2(\alpha_4))$ $\overrightarrow{sSqZ} = (sSqZ(1)sSqZ(2)sSqZ(3)sSqZ(4))$ $\overrightarrow{sZ} = (sZ(1)sZ(2)sZ(3)sZ(4))$ $\overrightarrow{sH} = (sH(1)sH(2)sH(3)sH(4))$ $\overrightarrow{sHZ} = (sHZ(1)sHZ(2)sHZ(3)sHZ(4))$ $\overrightarrow{N} = (N(1)N(2)N(3)N(4))$ $\overrightarrow{\Delta N} = (\Delta N(1)\Delta N(2)\Delta N(3)\Delta N(4))$ $\Delta sH = (\Delta sH(1)\Delta sH(2)\Delta sH(3)\Delta sH(4))$ $\Delta sZ = (\Delta sZ(1)\Delta sZ(2)\Delta sZ(3)\Delta sZ(4))$ The final results are below.

Every term is the dot product of a geometrical vector representing the incident angles of each of the 4 lasers and a data vector representing what is observed in each of the 4 lasers. There are 15 independent numbers to be calculated for $(P^T(Z^TZ)P)$ and 5 for $P^T(Z^TH)$.

$$P^T(Z^TH) = \begin{pmatrix} -\overrightarrow{\sin} \cdot \overrightarrow{sHZ} \\ +\overrightarrow{\cos} \cdot \overrightarrow{sHZ} \\ -\overrightarrow{\sin} \cdot \overrightarrow{sH} \\ +\overrightarrow{\cos} \cdot \overrightarrow{sH} \\ +\Delta sH \end{pmatrix}$$

$$(P^T(Z^TZ)P) = \begin{pmatrix} +\overrightarrow{(\sin)^2} \cdot \overrightarrow{sSqZ} & -\overrightarrow{(\sin\cos)} \cdot \overrightarrow{sSqZ} & +\overrightarrow{(\sin)^2} \cdot \overrightarrow{sZ} & -\overrightarrow{(\sin\cos)} \cdot \overrightarrow{sZ} & -\overrightarrow{\sin} \cdot \overrightarrow{\Delta sZ} \\ -\overrightarrow{(\sin\cos)} \cdot \overrightarrow{sSqZ} & +\overrightarrow{(\cos)^2} \cdot \overrightarrow{sSqZ} & -\overrightarrow{(\sin\cos)} \cdot \overrightarrow{sZ} & +\overrightarrow{(\cos)^2} \cdot \overrightarrow{sZ} & +\overrightarrow{\cos} \cdot \overrightarrow{\Delta sZ} \\ +\overrightarrow{(\sin)^2} \cdot \overrightarrow{sZ} & -\overrightarrow{(\sin\cos)} \cdot \overrightarrow{sZ} & +\overrightarrow{(\sin)^2} \cdot \overrightarrow{N} & -\overrightarrow{(\sin\cos)} \cdot \overrightarrow{N} & -\overrightarrow{\sin} \cdot \overrightarrow{\Delta N} \\ -\overrightarrow{(\sin\cos)} \cdot \overrightarrow{sZ} & +\overrightarrow{(\cos)^2} \cdot \overrightarrow{sZ} & -\overrightarrow{(\sin\cos)} \cdot \overrightarrow{N} & +\overrightarrow{(\cos)^2} \cdot \overrightarrow{N} & +\overrightarrow{\cos} \cdot \overrightarrow{\Delta N} \\ -\overrightarrow{\sin} \cdot \overrightarrow{\Delta sZ} & +\overrightarrow{\cos} \cdot \overrightarrow{\Delta sZ} & +\overrightarrow{\sin} \cdot \overrightarrow{\Delta N} & +\overrightarrow{\cos} \cdot \overrightarrow{\Delta N} & +N \end{pmatrix}$$

Simple Cases

Suppose the cylinder is exactly aligned with the z-axis, and the data is exactly centered above and below each sensor's center line. Then in each sensor, the left sensor will have a measurement points of type (x, h) and the right sensor will have measurements of type (x,−h). This will mean that the sHZ and sH terms will be zero. The term $\Delta sH$ will be a sum of +h and −(−h) terms or $\Delta sH \approx Nh$.

The solution equation would then read:

$$(P^T(Z^TZ)P)\begin{pmatrix} a_x \\ a_y \\ b_x \\ b_y \\ r \end{pmatrix} = \begin{pmatrix} \ldots & \ldots & \ldots & \ldots & 0 \\ \ldots & \ldots & \ldots & \ldots & 0 \\ \ldots & \ldots & \ldots & \ldots & 0 \\ \ldots & \ldots & \ldots & \ldots & 0 \\ 0 & 0 & 0 & 0 & N \end{pmatrix}\begin{pmatrix} a_x \\ a_y \\ b_x \\ b_y \\ r \end{pmatrix}$$

-continued $$= P^T(Z^T H)$$

$$= \begin{pmatrix} -\vec{\sin} \cdot \overrightarrow{sHZ} \\ +\vec{\cos} \cdot \overrightarrow{sHZ} \\ -\vec{\sin} \cdot \overrightarrow{sH} \\ +\vec{\cos} \cdot \overrightarrow{sH} \\ +\Delta sH \end{pmatrix} = \begin{pmatrix} 0 \\ 0 \\ 0 \\ 0 \\ Nh \end{pmatrix}$$

This has the solution $a_x = a_y = b_x = b_y = 0$, $r = Nh/N = h$.

Appendix D

The method of assembly and alignment of the optical and mechanical components of the light plane generator receiver and light plane generator modules is executed utilizing the alignment fixture 100 of FIG. 31. The alignment fixture includes an optical rail, modified breadboards 120, 151 and 180, and a plurality of custom and commercially available opto-mechanical positioning devices. A detector assembly generally indicated at 159 and located on breadboard 151 replicates the function of a light plane receiver module.

The alignment fixture 100 further includes a references laser 118, aligned such that the center line of its light beam is horizontally parallel to the reference breadboards 120 and 151 and lens and mirror mount 304 interfaces. Preferably, the laser 118 is a spatially filtered solid state laser such as the 40001 available from LumenFlow Corp. of Middleville, Mich.

Also shown supported on the breadboard 120 is a reference prism (i.e., rhomboid prism) assembly 122, the use of which is detailed herein. As it is the method of assembly that is important to proper functioning modules, this disclosure emphasizes the interfacing components of the fixture while focusing on the detailed steps of the method to produce the modules.

Alignment fixture 100 of FIG. 31 includes a rail and a plurality of stage assemblies, generally indicated at 102, which, in turn, includes a rail assembly, generally indicated at 104. The rail assembly 104 includes a rail 106 which is supported by pairs of bench legs 108. The alignment fixture 100 also includes a set of rail carriages 110 slidably mounted on the rail 106.

The alignment fixture 100 further includes a transmitter stage assembly, generally indicated at 112. The transmitter stage assembly 112 includes an L1 (i.e., first lens) manipulator stage assembly, generally indicated at 113, an L2 (i.e., second lens) manipulator stage assembly 114 and an L3 (i.e., third lens) manipulator stage assembly 116.

Each of the assemblies 113, 114 and 116 are supported together with the laser 118 and its support bracket 119 on the breadboard or substrate 120.

Also shown supported on the breadboard 120 is the reference prism (i.e., rhomboid prism) assembly 122, an alignment aperture 124, a filter mount 126 and a post holder 128.

The precision rhomboid prism assembly 122 is important to the assembly of the modules, calibration of the align and focus instrument, and to assembly of the optical head.

The assembly 122 includes two metal plates, two dowel pins, and a rhomboid prism.

The rhomboid prism assembly 122 is the gage that establishes the height difference between the height of laser light entering the transmitter (through lens 316) (preferably, 0.984") and the height of laser light exiting the transmitter (through lens 310) (preferably, 1.679").

The height is set by:
precisely machined dowel pin positions; and
the precise shape of the rhomboid.

The rhomboid prism has the property that a straight beam of light entering the prism exists the prism in a straight line and in a path exactly parallel to the beam path of the entry beam. The height difference between the entry and exit beams is set by the rotational angle of the prism, relative to the entry beam.

The alignment fixture 100 also includes a clamp post assembly 130 with a kinematic ball also supported on the breadboard 120.

The alignment fixture 100 further includes a relay telescope assembly, generally indicated at 132, which, in turn, includes a relay doublet assembly 134 and an IR doublet 136. The relay telescope 132 is mounted on its carriage 110 by a scope mount 138.

Mounted on the rail 106 is another carriage 110 on which a post 140 is supported at one end of the fixture 100. The post 140 supports a filter or target holder 142. In turn, the holder 142 supports a target 210.

The alignment fixture 100 also includes a receiver stage assembly 150 which, in turn, includes the breadboard or substrate 151. The receiver stage assembly 150 includes an alignment assembly 152 including an alignment aperture 154.

The receiver stage assembly 150 further includes an optical rail 156 supported on the breadboard 151. The detector assembly, generally indicated at 159, is adjustably mounted on the rail 156. The detector assembly 159 includes electronic boards 157, together with the sensor mount with an aperture 155. The receiver stage assembly 150 further includes a filter mount 160 and a vertical slit 162.

The receiver stage assembly 150 also includes a manipulator bracket 164 and an assembly 166 having a kinematic ball 168 mounted at a distal end thereof.

The receiver stage assembly 150 further includes an L4 (i.e., fourth lens) manipulator stage assembly 170.

The L1 manipulator stage assembly 113 includes the breadboard 180 on which an x-y stage assembly 184, together with a kinematic base 186 are mounted. Adjustment screws 182 are provided to adjust the position of the stage assembly 184. Clamping arms 188 are mounted at a distal end of the stage assembly 113.

FIGS. 31 and 37 taken together illustrate: a clamp for lens 310 attached to screw 116; a screw attached to clamp 114 below plate 120; a rotational screw to rod attached to clamp 188; lower two screw holes of 322 establish a rotational adjustment axis for 322; and upper one screw hole of 322 establishes control of rotation about 322 adjustment axis.

Overview of the Transmitter Alignment Process

The alignment of the transmitter module's optical components is important to the operation of the Laser Lab system. The alignment is accomplished with the align and focus (i.e., A&F) instrument or fixture 100.

The transmitter module is mounted in the A&F instrument 100, using reference surfaces "A", "B", and "C" of the module. Reference surface "A" mounts flat to base plate 120, which has been aligned parallel to the laser beam used in the A&F instrument 100, generated by the laser 118. Reference surface "C" is made flush to two kinematic mounts that have been aligned parallel to the laser beam 118. Reference surface "B" is flush to one kinematic mount and establishes the correct position along the beam line of the laser 118.

Mirror-2 is mounted to reference surface "E" on module 304. Mirror-1 is mounted to plate 322 which is mounted to reference surface "F".

In the alignment process the optical components are configured to meet system requirements using the process previously detailed. During the alignment process the A&F instrument 100 holds the parts in place with a set of clamps and piece holders. When the alignment process is completed, the optical components are fixed to the surfaces of module 304 with a glue that permanently holds them in place.

The following is a list of transmitter optical module components and their adjustments that are fixed in the align and focus instrument 100:

first cylindrical lens 316: plate 318 is clamped in A&F part 188. 188 can be moved in three directions: linearly parallel to laser beam and linearly perpendicular to laser beam (with screws 182), and rotated about the axis of the rod holding clamp 188.

second cylindrical lens 312: linearly perpendicular to laser beam with screw below plate 120, attached to 114. The lens can also be rotated within clamp 114.

third cylindrical lens 310: linearly perpendicular to laser beam, in up-down relation to plate 120, by screw 116. The lens can also be rotated within clamp attached to screw 116.

adjustable mirror mount 322: radial adjustment about axis established by lower two screws mounting 322 to 304. Adjustment controlled by top screw of 322.

Thus, there are a total of eight independent adjustment parameters for the transmitter module. Each parameter is optimized in the alignment process, and fixed with glue before removal of the module 66 from the A&F instrument 100.

Figure 32:
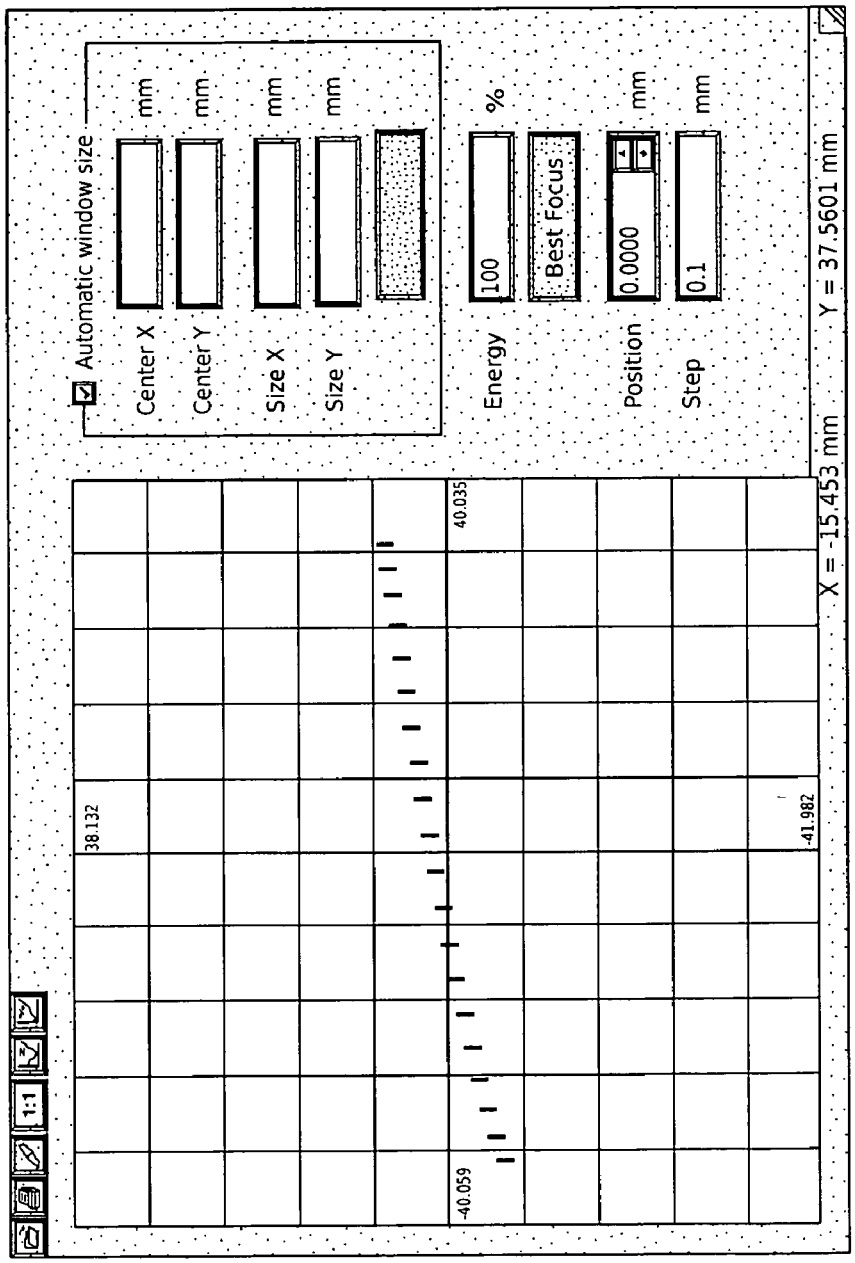
FIG. 32 is a graph illustrating a relatively non-level laser beam profile.
Figure 33:
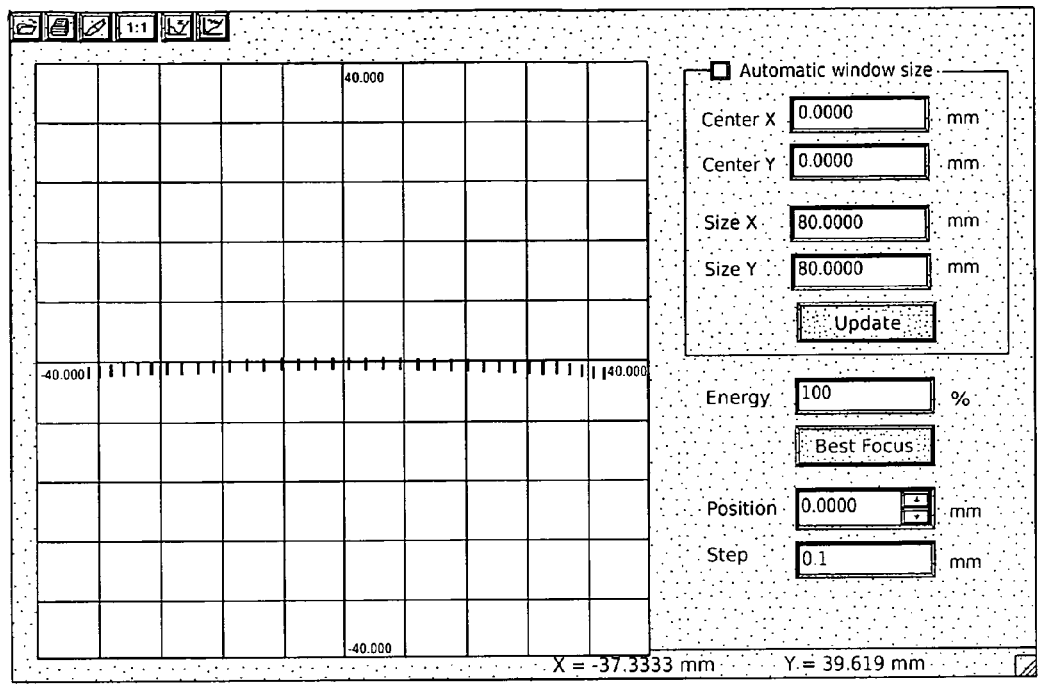
FIG. 33 is a graph illustrating a relatively flat laser beam profile.
Figure 34:
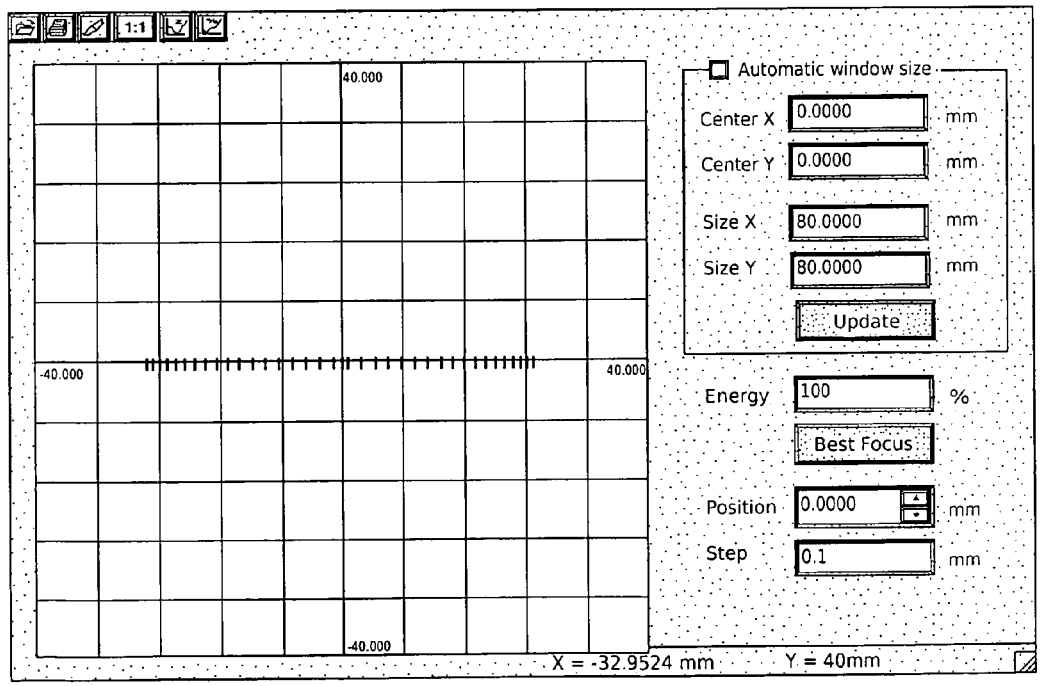
FIG. 34 is a graph illustrating a relatively collimated laser beam profile.

1.0 Produce light plane generator module assembly:
1.1 Install machined lens and mirror mount 304 to breadboard 120. Place an alignment aperture in the reference laser beam path so that the laser beam passes through the aperture without creating distortion.
1.2 Install lens 312 within the mount 304 and align so that the beam passes through the aperture and is coincident with the laser beam axis. Remove the aperture from the beam path.
1.3 Assemble L1 sub-assembly 320 components, cylinder lens 316, L1 lens mount plate 318 and lens mount base 319. Assemble sub-assembly 320 to mount 304.
1.4 Adjust rotational position of lens 312 about the laser beam axis so that beam profile is level (FIG. 32).
1.5 Adjust rotational position of lens 316 about the one degree of freedom provided so that the beam profile is flat (FIG. 33).
1.6 Adjust position of lens 316 along laser beam axis so that beam width is visually equal at a distance greater than or equal to 216" and at 4" distance from exit aperture of machined lens and mirror mount 304.
1.7 Adjust the horizontal position of lens 316 so that power distribution is visually balanced within the beam profile.
1.8 Re-adjust the horizontal position of lens 312 so that beam is centered along the laser beam axis.
1.9 Re-adjust position of lens 316 along laser beam axis so that full angle laser beam divergence is less than 0.25 m radians.

$$\theta=(d2-d1)/(l2-l1)$$

where θ is beam divergence in radians; d1 is the horizontal beam width at distance 1; d2 is the horizontal beam width at distance 2; l1 is the distance from the output aperture of machined lens and mirror mount 304 to the beam measurement point at distance 1; l2 is the distance from the output aperture of machined lens and mirror mount 304 to the beam measurement point at distance 2.

Figure 35:
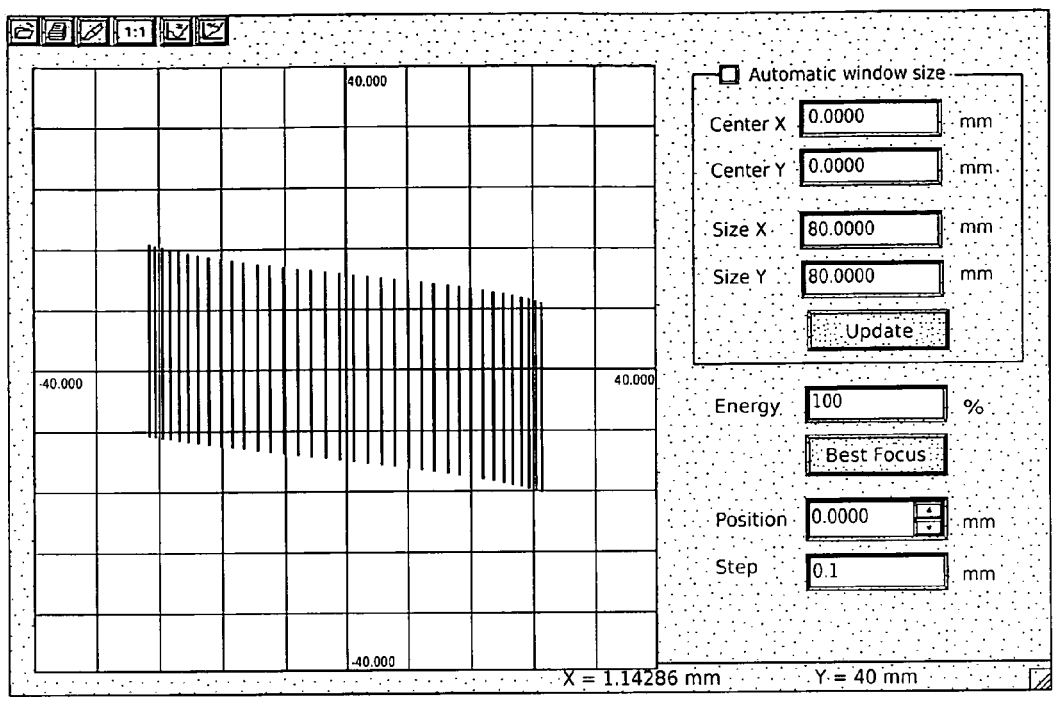
FIG. 35 is a graph illustrating a distorted, generally rectangular laser beam profile.
Figure 36:
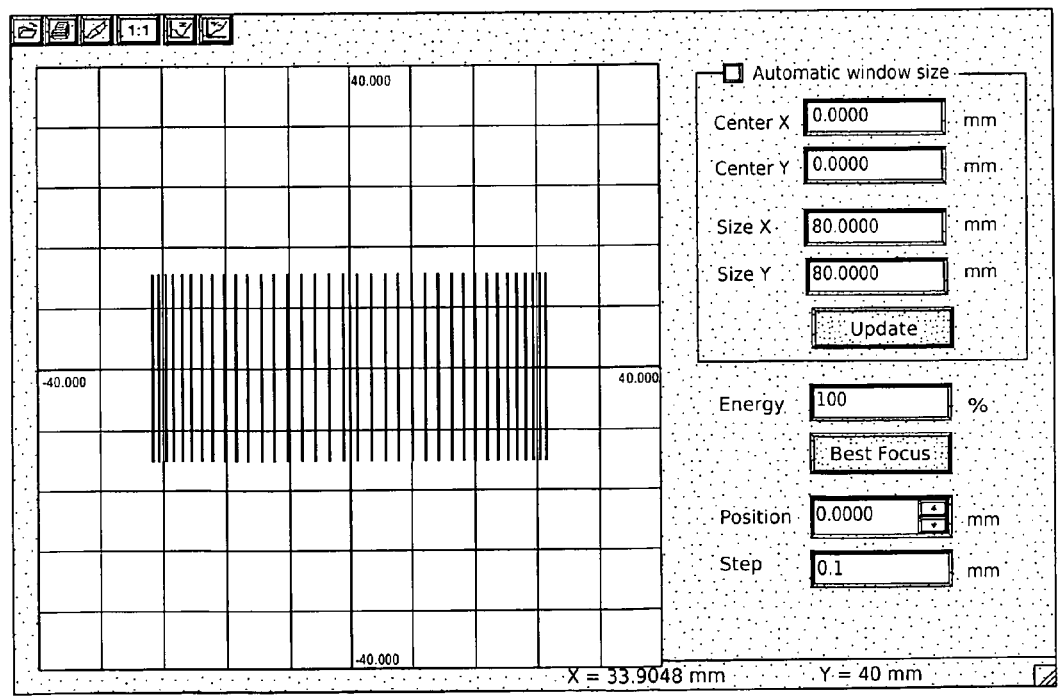
FIG. 36 is a graph illustrating a non-distorted, generally rectangular laser beam profile.

1.10 Assemble lens 310 to machined lens and mirror mount 304. Ensure lens 310 is intimate with machined lens and mirror mount 304.
1.11 Place a 150 μm slit aperture in laser beam path with slit parallel to machined lens and mirror mount 304 mounting surface at a height of 1.679"±0.002". Adjust vertical position of lens 304 so that beam passes through slit opening. Alignment is optimum when the maximum amount of light passes through aperture. Remove slit aperture from beam path.
1.12 Adjust position of lens 310 rotationally so that beam profile is not distorted (i.e., unlike FIG. 35) and generally forms a rectangle (i.e., like FIG. 36).
1.13 Place the detector assembly 159 of the alignment fixture 100 in the laser beam path. Adjust lens 312 so that the attenuated beam profile is aligned with the laser beam axis.
1.14 Adjust lens 316 position horizontally so that output power is distributed equally ±5 mV across laser beam profile as measured using detector assembly 159 and dual trace oscilloscope readout.
1.15 Verify collimation, beam height, distortion, power distribution and beam pointing. Correct as necessary. Apply and cure adhesives to fixedly mount optical components to the mount 304.
1.16 Remove assembled light plane generator module from alignment fixture 100.

2.0 Produce light plane receiver module assembly:
2.1 Install reference rhomboid prism 122 to breadboard 120 to establish laser beam offset height parallel to machined lens and mirror mount 500 of 1.679".
2.2 Install machined lens and mirror mount 500 to breadboard 151.
2.3 Assemble lens 506 to machined lens and mirror mount 500. Ensure lens 506 is intimate with machined lens and mirror mount 500.
2.4 Align lens 506 so that the beam is coincident with the laser beam axis.
2.5 Place a cylinder lens 316 in the beam path utilizing the cylinder lens holder provided within alignment fixture 100 positioned so that the laser plane output is parallel to the mounting surface of machined lens and mirror mount 500.
2.6 Assemble L5 sub-assembly components, receiver spherical lens 508 (two) and lens mount plate 504 to machined lens and mirror mount 500 by screws 516 (FIG. 47).
2.7 Place a target card with a line scribed at 1.679"±0.002" at back surface of machined lens and mirror mount 500.
2.8 Adjust lens pair vertically so that laser beam strikes scribe line.
2.9 Adjust horizontal position of lens pair 508 so that laser beam strikes pair center seam such that resulting spots are visually equal in brightness. Remove target card.
2.10 Assemble aperture elements 510 and Hamamatsu photodetectors 514 to detector mount 502 using screws 505.
2.11 Assemble detector mount 502 to machined lens and mirror mount 500 using screws 505.
2.12 Adjust position of detector mount 502 horizontally so that beams are focused onto detectors 514 without clipping aperture element 510 edges.

2.13 Remove rhomboid prism 122 and cylinder lens 316 from fixture. Install a selected light plane generator module to breadboard 120.

2.14 Adjust horizontal position of lens pair 508 so that output power is distributed equally ±5 mV across laser beam profile as measured using Hamamatsu photodetectors 514 output and dual trace oscilloscope readout.

2.15 Verify that beams are focused onto detectors 514 without clipping aperture element 510 edges.

2.16 Apply and cure adhesives to fixedly mount optical components to the mount 500.

2.17 Remove assembled light plane generator module and light plane receiver module pair from alignment fixture 100.

What is claimed is:

1. A method of optically inspecting parts, the method comprising:

supporting a part having a width along a measurement axis;

scanning the part with an array of planes of radiation wherein each of the planes have a width greater than the width of the part so that the part occludes each of the planes of radiation to create a corresponding array of unobstructed left and right planar portions of the planes of radiation passing by and not blocked by the supported part wherein each of the unobstructed left and right planar portions contains an amount of radiation which is representative of a respective geometric dimension of the part;

measuring the amount of radiation present in each of the unobstructed left and right planar portions to obtain measurement signals;

processing the measurement signals to obtain raw data;

providing calibration data; and processing the calibration data and the raw data to obtain measurements of the part without the need to measure radiation blocked or reflected by the supported part.

2. The method as claimed in claim 1, wherein the step of scanning includes the step of linearly moving the array of planes of radiation relative to the part.

3. The method as claimed in claim 1, wherein the number of left and right planar portions is twice the number of the planes of radiation.

4. The method as claimed in claim 1, wherein each of the planes of radiation scans the part from a different azimuthal direction relative to the axis.

5. The method as claimed in claim 4, wherein the planes of radiation have a substantially uniform azimuthal spacing relative to the axis.

6. The method as claimed in claim 1, wherein none of the planes of radiation are coplanar.

7. The method as claimed in claim 1, wherein the planes of radiation are equally spaced.

8. The method as claimed in claim 1, wherein the radiation is laser radiation.

9. The method as claimed in claim 8, wherein the laser radiation is visible.

10. The method as claimed in claim 1, wherein adjacent pairs of unobstructed left and right planar portions created from the same planes of radiation are coplanar.

11. A system for optically inspecting parts, the system comprising:

a support for supporting a part having a width along a measurement axis;

a head apparatus including a plurality of radiation sources for directing an array of planes of radiation at the part wherein each of the planes has a width greater than the width of the part so that the part occludes each of the planes of radiation to create a corresponding array of unobstructed left and right planar portions of the planes of radiation passing by and not blocked by the supported part wherein each of the unobstructed left and right planar portions contains an amount of radiation which is representative of a respective geometric dimension of the part, the head apparatus further including a plurality of receiver modules for measuring the amount of radiation present in each of the unobstructed left and right planar portions to obtain measurement signals;

a movable stage subsystem coupled to the head apparatus for translating the head apparatus relative to the part so that the planes of radiation scan the part supported by the support;

a signal processor for processing the measurement signals to obtain raw data;

a storage for storing calibration data; and a data processor for processing the raw data and the calibration data to obtain measurements of the part without the need to measure radiation blocked or reflected by the supported part.

12. The system as claimed in claim 11, wherein the stage subsystem linearly moves the head apparatus relative to the device.

13. The system as claimed in claim 11, wherein the number of left and right planar portions is twice the number of the planes of radiation.

14. The system as claimed in claim 11, wherein each of the planes of radiation scans the part from a different azimuthal direction relative to the axis.

15. The system as claimed in claim 14, wherein the planes of radiation have a substantially uniform azimuthal spacing relative to the axis.

16. The system as claimed in claim 11, wherein none of the planes of radiation are coplanar.

17. The system as claimed in claim 11, wherein the planes of radiation are equally spaced.

18. The system as claimed in claim 11, wherein the radiation is laser radiation.

19. The system as claimed in claim 18, wherein the laser radiation is visible.

20. The system as claimed in claim 11, wherein adjacent pairs of unobstructed left and right planar portions created from the same planes of radiation are coplanar.

21. The method as claimed in claim 1, wherein the step of providing includes the step of:

supporting a calibration device having a central axis and a plurality of regions which are rotationally symmetric about the central axis;

scanning the device with the array of planes of radiation so that the device occludes each of the planes of radiation to create a corresponding array of unobstructed planar portions of the planes of radiation wherein each of the unobstructed planar portions contains an amount of radiation which is representative of a respective geometric dimension of the device;

measuring the amount of radiation present in each of the unobstructed planar portions to obtain device measurement signals; and processing the device measurement signals to obtain the calibration data.

22. The method as claimed in claim 21, wherein the axes are substantially coaxial.

23. A system for optically inspecting parts, the system comprising:

a support structure for supporting both a calibration device having a central axis and a width and a part having a width along a measurement axis at spaced locations;

a head apparatus including a plurality of radiation sources for successively directing an array of planes of radiation at the device and the part wherein each of the planes has a width greater than the width of the part and greater than the width of the device so that the device and the part occlude each of the planes of radiation to create a corresponding array of unobstructed left and right planar portions of the planes of radiation passing by and not obstructed by either the supported device or the supported part wherein each of the unobstructed planar left and right portions contains an amount of radiation which is representative of a respective geometric dimension of either the device or the part, the head apparatus further including a plurality of receiver modules for measuring the amount of radiation present in each of the unobstructed left and right planar portions to obtain device and part measurement signals;

a movable stage subsystem coupled to the head apparatus for translating the head apparatus relative to the device and the part so that the planes of radiation scan the device and the part supported by the support structure;

a signal processor for processing the measurement signals to obtain raw data and calibration data; and a data processor for processing the raw data and the calibration data to obtain measurements of the part without the need to measure radiation blocked or reflected by either the supported device or the supported part.

24. The system as claimed in claim 23, wherein the axes are substantially coaxial.

25. The system as claimed in claim 11 wherein each of the receiver modules includes a camera.

26. The system as claimed in claim 25 wherein each of the cameras is a line scan camera.

27. The system as claimed in claim 23 wherein each of the receiver modules includes a camera.

28. The system as claimed in claim 27 wherein each of the cameras is a line scan camera.

* * * * *